United States Patent [19]

López et al.

[11] Patent Number: 5,708,714
[45] Date of Patent: Jan. 13, 1998

[54] METHOD FOR SHARING SECRET INFORMATION AND PERFORMING CERTIFICATION IN A COMMUNICATION SYSTEM THAT HAS A PLURALITY OF INFORMATION PROCESSING APPARATUSES

[75] Inventors: José Manuel Cerecedo López, Madrid, Spain; Keiichi Iwamura, Kawasaki, Japan

[73] Assignee: Canon Kabushiki Kaisha, Tokyo, Japan

[21] Appl. No.: 507,524

[22] Filed: Jul. 26, 1995

[51] Int. Cl.$^6$ .................. H04L 9/00; H04L 9/32
[52] U.S. Cl. .................. 380/25; 380/23; 380/30
[58] Field of Search .................. 380/23, 25, 24, 380/30

[56] References Cited

U.S. PATENT DOCUMENTS

| | | | |
|---|---|---|---|
| 5,276,737 | 1/1994 | Micali | 380/25 |
| 5,313,530 | 5/1994 | Iwamura | 380/28 |
| 5,432,850 | 7/1995 | Rothenberg | 380/23 |
| 5,469,507 | 11/1995 | Canetti et al. | 380/30 |
| 5,553,145 | 9/1996 | Micali | 380/25 |

OTHER PUBLICATIONS

"Completeness Theorems for Non–Cryptographic Fault–Tolerant Distributed Computation" by M.Ben–OR et al.; Proceedings of the Twentieth Annual ACM Symposium on Theory of Computing, Chicago, Ill. May 2–4,1988; pp. 1–10.

"Verifiable Secret Sharing and Multiparty Protocols with Honest Majority" by T. Rabin et al.; Proceedings of the Twenty First Annual ACM Symposium on Theory of Computing; Seattle, Washington, May 15–17, 1989; pp. 73–85.

"How to Share a Secret" by A. Shamir; Communications of the ACM, Nov. 1979 vol. 22, No. 11 pp. 612–613.

"A Method for Obtaining Digital Signatures and Public Key Cryptosystems" by R.L.Rivest et al.; Communications of the ACM; Feb. 1978, vol. 21, No. 2 pp. 120–126.

"How to Prove Yourself: Practical Solutions to Identification and Signature Problems" by A.Fiat et al. Advances in Cryptology CRYPTO '86; pp. 186–194.

(List continued on next page.)

*Primary Examiner*—Thomas H. Tarcza
*Assistant Examiner*—Carmen D. White
*Attorney, Agent, or Firm*—Fitzpatrick, Cella, Harper & Scinto

[57] ABSTRACT

The object of the present invention is to perform verifiable secret sharing by a practical amount of calculation and a practical amount of communication. In addition, by using this process, a shared digital signature is generated, or a shared authentication server is provided.

In a communication system where a plurality of information processing apparatuses are connected across secret communication channels and a broadcast communication channel, an information processing apparatus d generates a secret matrix from secret information s, 11, . . . , lk, extracts the first information segments for individual apparatuses i, and secretly transmits it to each apparatus i. The information processing apparatus d performs hash function on the secret matrix and broadcasts the output value. Each information processing apparatus i generates and broadcasts a random number, while the information processing apparatus d generates and broadcasts the second information segment from a partial array in consonance with the random number value. Each information processing apparatus i generates the third information segment in consonance with the first information segment and the random number, and verifies that the secret information has been correctly shared by comparing the third information segment with the second. By employing this secret information sharing method, apparatuses that belong to a group of signers cooperatively generate a signature, and a plurality of apparatuses that constitute authentication servers cooperatively provide authentication.

31 Claims, 30 Drawing Sheets

OTHER PUBLICATIONS

"Efficient Identification and Signatures For Smart Cards" by C.P. Schnoor; Advances in Cryptology CRYPTO '89; pp. 240–251.

"One Way Has Functions and DES" by R.C. Merkle; Advances in Cryptology CRYPTO '89; pp. 428–446.

"The MD4 Message Digest Algorithm" by R.L.Rivest; Advances In Cryptology-CRYPTO'90 pp. 303–311.

"Efficient Multiparty Protocols Using Circuit Randomization" by D. Beaver; Advances in Cryptology-CRYPTO '91; pp. 420–432.

"Shared Generation of Authenticators and Signatures" by Y.Desmedt et al.; Advances in Cryptology-CRYPTO '91; pp. 457–460.

"Secure Multiparty Protocols and Zero-Knowledge Proof Systems Tolerating a Faulty Minority" by D. Beaver; Journal of Cryptology (1991) 4:75–122 pp. 75–122.

"Threshold, cryptosystems" by Y. Desmedt et al.; Advances in Cryptology crypto '89; pp. 307–315.

"A Public Key Cryptosystem and a Signature Scheme Based On Discrete Logarithms" by T. Elgamal; IEEE; Jul., 1985 vol. IT–31 No. 4 pp. 469–471.

"Secure Communication using Remote Procedure Calls" by A. Birrell; Transactions on Computer Systems; Feb. 1985; vol. 3 No. 1 pp. 1–14.

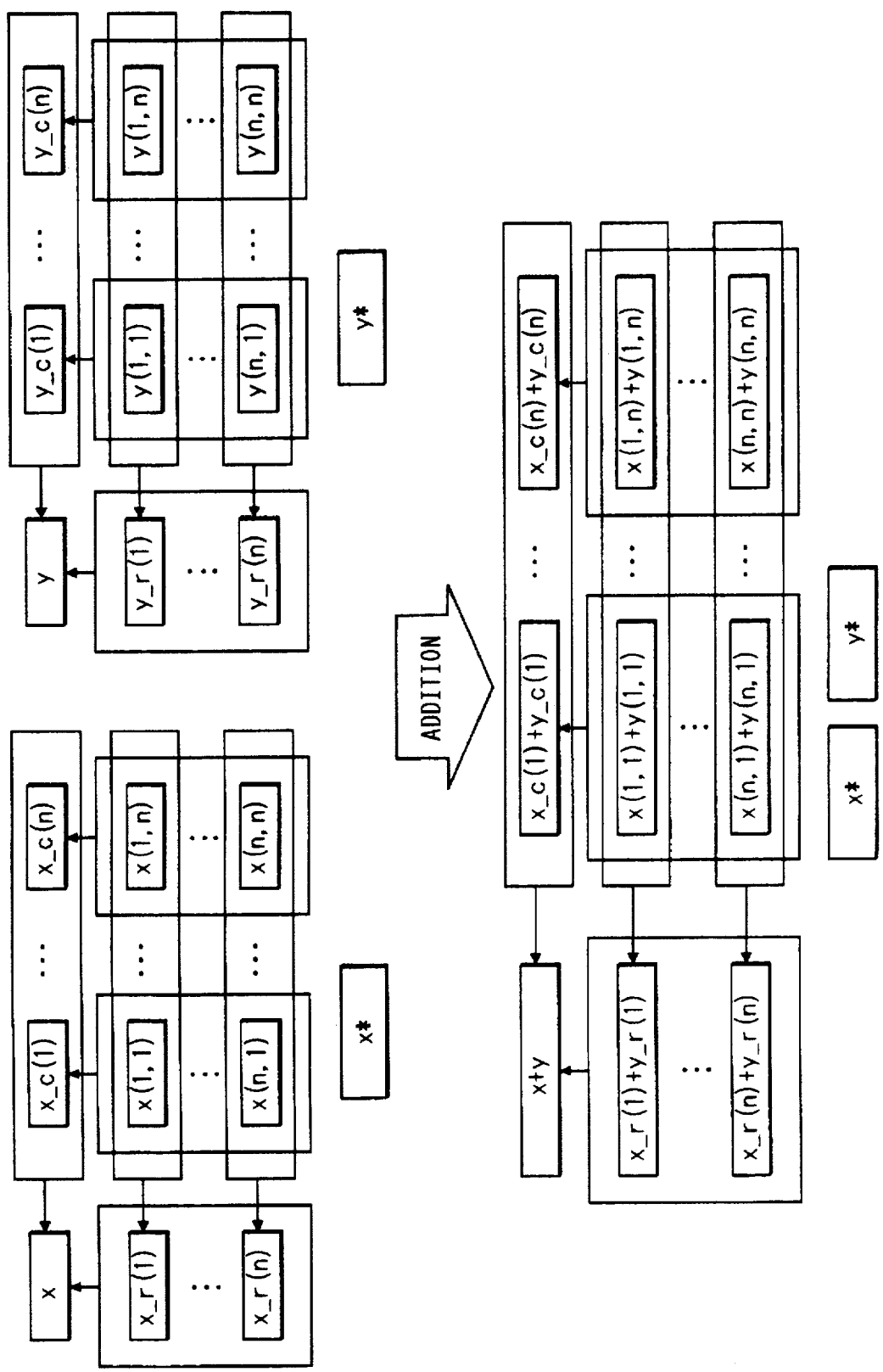

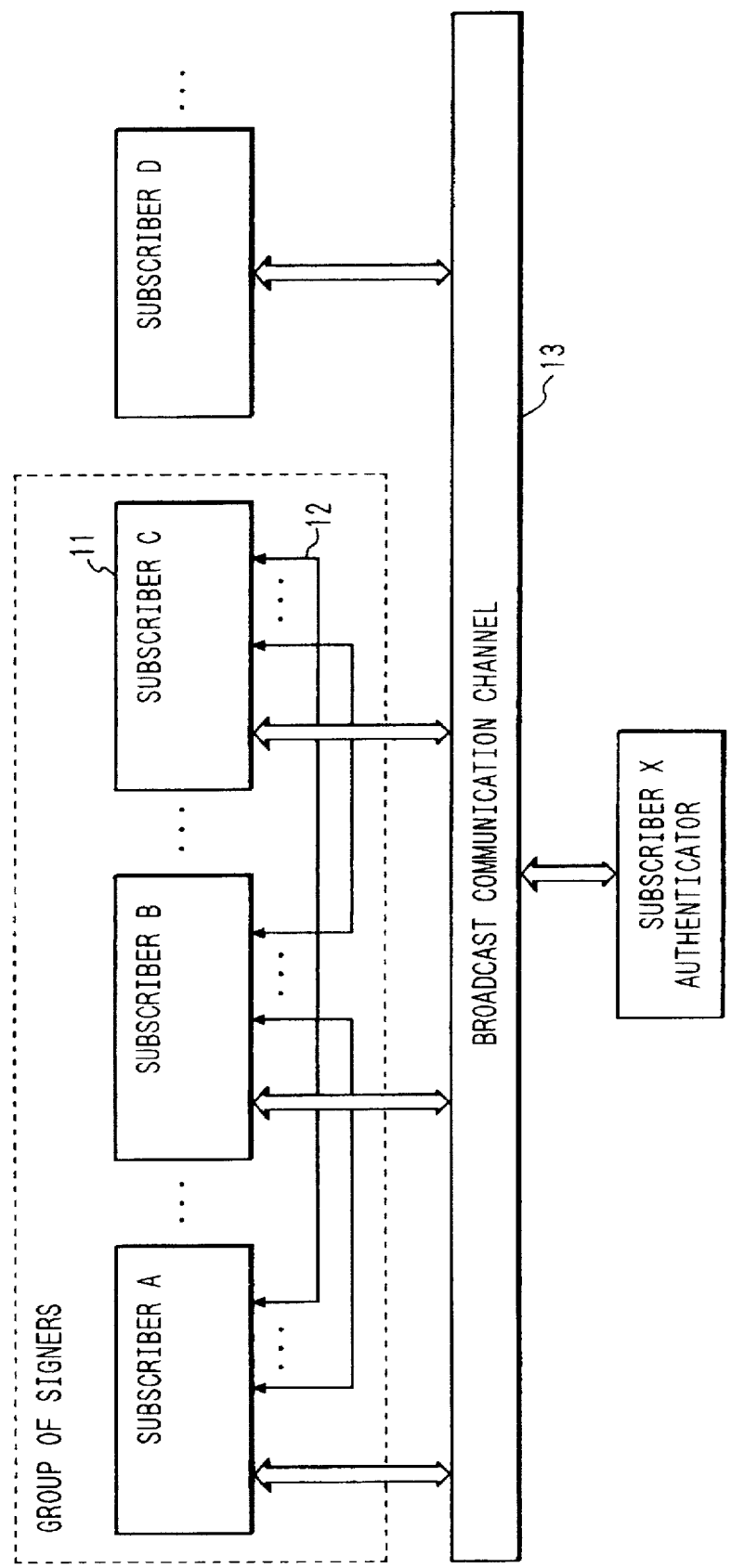

$z = ax + by \mod N$ $z = x^a * y^b \mod N$

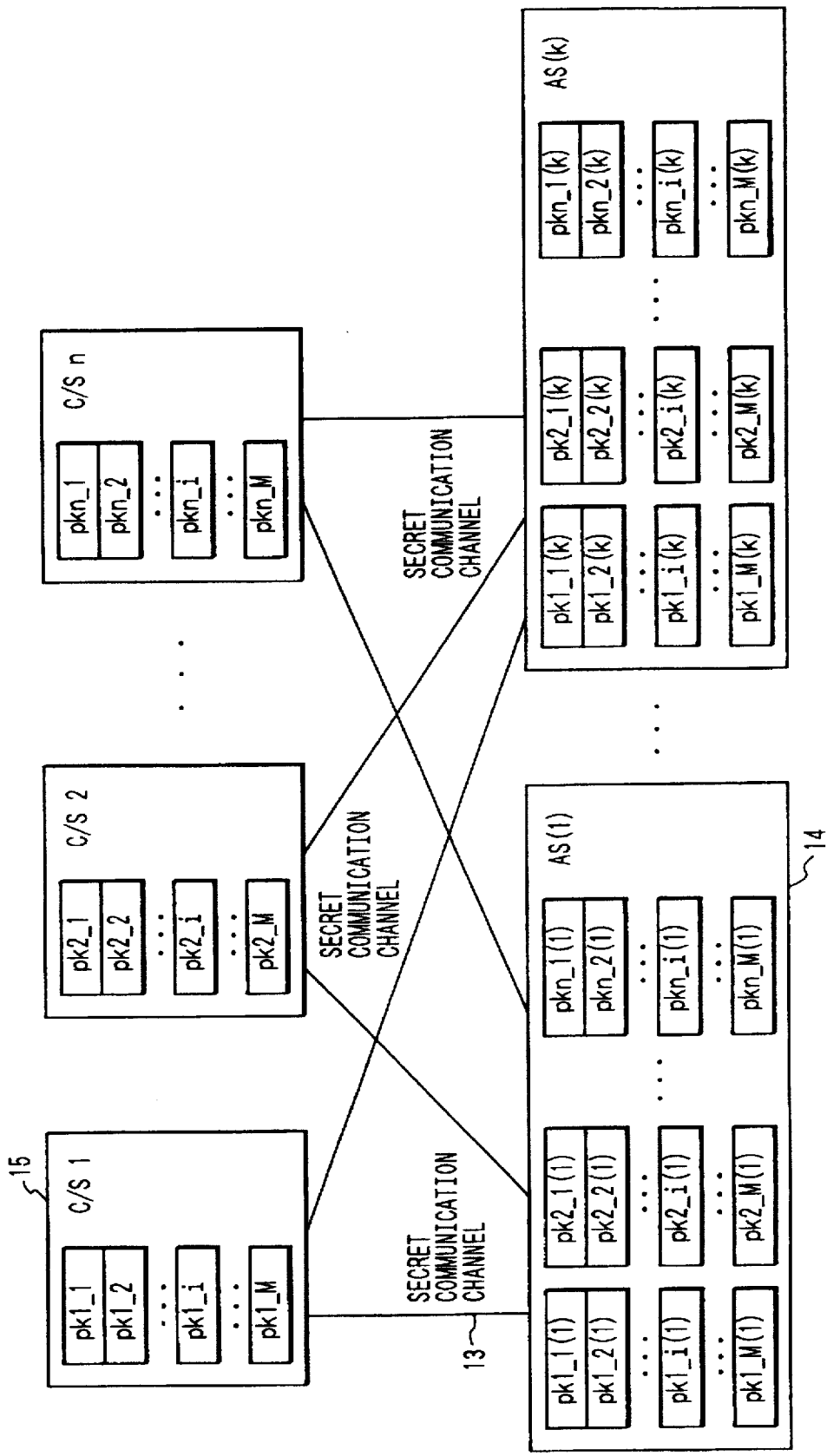

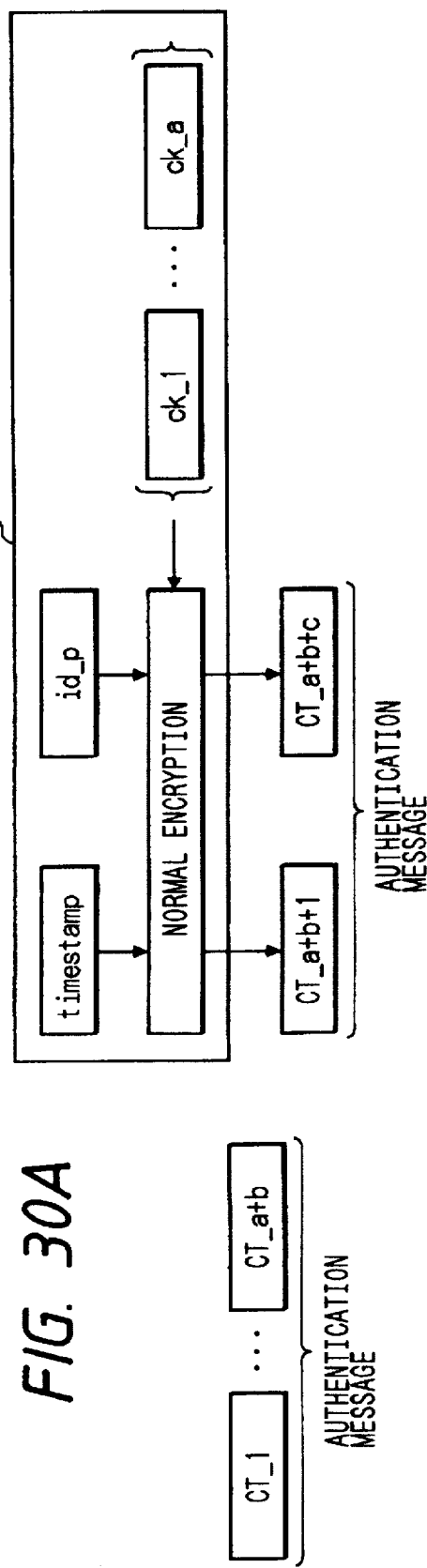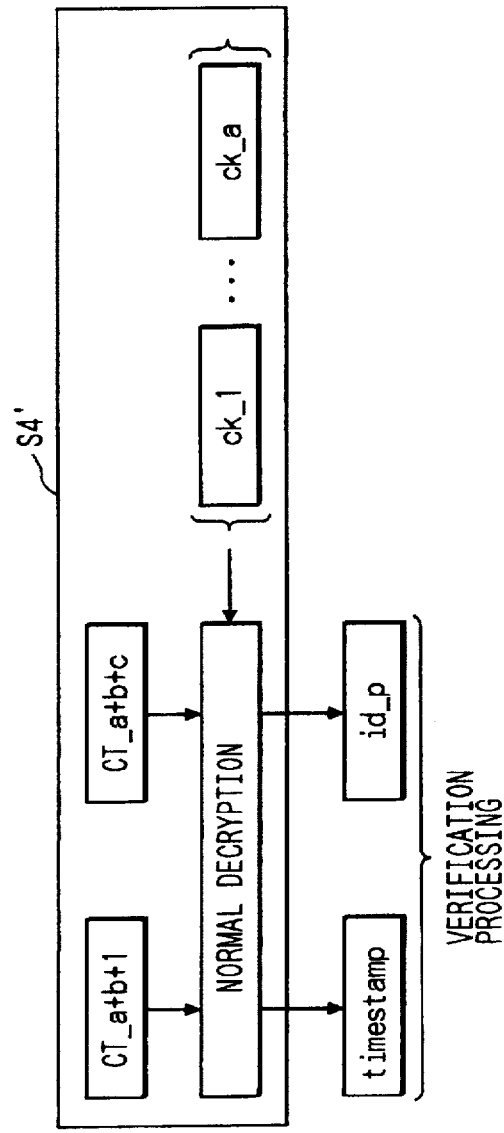
FIG. 30A
FIG. 30B

METHOD FOR SHARING SECRET INFORMATION AND PERFORMING CERTIFICATION IN A COMMUNICATION SYSTEM THAT HAS A PLURALITY OF INFORMATION PROCESSING APPARATUSES

BACKGROUND OF THE INVENTION

1. Field of the Invention

The present invention relates to a method whereby secret information, which, is carried in one of the information processing apparatuses (hereafter referred to as a "subscriber") that are joined together by communication paths in a communication system, can be shared among the subscribers, and to a communication system that employs such a method. Further, the present invention relates to a method for sharing or generating a digital signature for a group that is composed of several of a plurality of subscribers, and to a communication system that employs such a method. In addition, the present invention pertains to a method for sharing, with a plurality of subscribers, a certification function by which a receiver of information can verify that the information has been transmitted from a correct transmitter (has not been altered by another apparatus along the way), and to a communication system that employs such a method.

2. Related Background Art

A conventional a coding technique that generates increased redundancy data is one of the known techniques that improve the reliability of information communication systems.

Error correction codes in particular, by which errors that have occurred along a communication path can either be detected or corrected, are frequently employed to efficiently implement highly reliable communication systems.

In addition, A. Shamir proved that a coding technique that increases redundancy by sharing confidential information is effective as a means, in a communication system, for improving reliability while at the same time providing protection for secret information (see "How to Share a Secret", communications of the ACM, Vol. 22, 11, 1979).

In a communication system that consists of a plurality of subscribers, the protection of shared secret information (i.e, secret information that is held and shared by all the subscribers) does not have to rely on only the physical security that is provided at a single specific subscriber, and it is possible to increase reliability (fault tolerance can be achieved) such as is described by the following two definitions.

One is that reliability which ensures that secret information is protected and is not leaked even when it shared; this is called fault tolerance for secrecy. The other is that reliability which ensures that output will be correct even if an unauthorized act is performed on the shared information; this is called fault tolerance for propriety. It should be noted that physical safety implies that information which a certain subscriber holds is not leaked to any other subscriber, and that calculations which a certain subscriber is performing can not be controlled by any other subscriber.

More specifically, the sharing and the holding of certain secret information x by all the subscribers means that individual subscribers i generate information segments, which together correspond to the secret information x, and distribute the generated information segments to the other subscribers in order to satisfy the following requirements (a) and (b).

(a) Information segments that are obtained from t+1 subscribers are required to decrypt secret information x. Hereafter, t+1, the number of the subscribers that is necessary required to decrypt the secret information, is called a threshold value.

(b) When the number of the partial information segments that are obtained from subscribers is below the threshold value (t or fewer), no data that is related to secret information can be obtained.

A conventional, fundamental secret sharing system was proposed by A. Shamir ("How to Share a Secret", communications of the ACM, Vol. 22, 11, 1979) and was accomplished as follows.

To secretly share information from a certain source subscriber with a plurality of subscribers, a polynomial f(x) of degree n, whose constant term is the above described secret information, is selected at random, and values of a polynomial, f(i) (i=1, . . . , n), that correspond to n different values are distributed to the subscribers. The values of the polynomial, f(i), that are distributed to individual subscribers are the above described information segments. Thus, the secret information can be decrypted by interpolating the polynomial that employs t+1 information segments (t or fewer information segments are too few to obtain any information that is related to the secret information).

A system that shares a secret in the above described manner is called a threshold scheme, and is assumed to be capable of achieving the aforementioned fault tolerance for secrecy. It should be noted that the original secret information can not be decrypted with only the above definition when there is an incorrect information segment among the shared information segments of the secret information x that are collected from t+1 or more subscribers. That is, it is found that the fault tolerance for right of access to shared secret information is not warranted. To fully increase the reliability in the above described sharing system, therefore, fault tolerance both for secrecy and for right of access must be considered.

A verifiable secret sharing method that was proposed as a secret sharing method that can cope with a subscriber that occurs any error is defined by adding to the above threshold scheme requirements (a) and (b) the following requirements (c) and (d).

(c) Even when incorrect information segments are mixed with correct information segments, as long as there are t+1 correct information segments that is sufficient for the decryption of the original secret information.

(d) When all the subscribers have received the information segments concerning the secret, they can verify that the information segments are the correct ones for the decryption of the specific secret information x.

M. Ben-Or, S. Goldwasser, and A. Wigderson described a conventional error correction coding technique that can satisfactorily provide, for a communication that has a secret communication channel, a verifiable secret sharing system (when threshold value t satisfies t<n/3) that can cope with subscribers that have any errors as long as the number of such subscribers is smaller than one third of the total subscribers (see "Completeness Theorems for Non-Cryptographic Fault-Tolerant Distributed Computation", ACM STOC 1988).

Further, additional requirements are necessary in order to create a verifiable secret sharing system that can cope with subscribers that have any errors as long as they are fewer than half of the total subscribers. Assuming that all the subscribers have broadcast communication channels, with which they can verify that all the subscribers have received the same message, the following two methods are known.

(1) A method for employing a technique called "Cut and Choose", which is used in a zero-knowledge proof system (see "Cryptology And Information Security", by Tsujii and Kasahara, Shokodo, 1990), to share original secret s by employing the fundamental secret sharing system that was proposed by A. Shamir, and to further share distributed information segments s_i (i=1, . . . , n).

More specifically, all the information segments that are distributed by the verifiable secret sharing system can be regarded as partial matrixes that are so generated as to be secret portions that correspond to secret information segments s_i. By using the "Cut and Choose" technique, verification according to the requirement (d) is statistically performed, so that the probability that errors will occur in the determination output indicates whether or not the correct sharing for decrypting secret information is performed. As the error probability can be reduced by a parameter that is set for safety, it can be ignored. A method proposed by T. Rabin and M. Ben-Or (see "Verifiable Secret Sharing and Multi-party Protocols with Honest Majority", ACM STOC, 1989) is a specific example.

(2) A method for using a one-way function that is a non-dialogue type and has a special algebraic property.

For the safety of the thus constructed secret sharing system, a cryptographic assumption must be required such that it is difficult to acquire the inverse element of any one-way function that satisfies its algebraic property (a practical method for calculating the inverse element does not exist). A specific example has been proposed by P. Feldman (see "A Practical Scheme for Non-Interactive Verifiable Secret Sharing", IEEE FOCS, 1987).

In addition, as is described by T. Rabin, M. Ben-Or (see "Verifiable Secret Sharing and Multiparty Protocols with Honest Majority", ACM STOC, 1989), D. Beaver (see "Secure Multiparty Protocols and Zero-Knowledge Proof Systems Tolerating a Faulty Minority", Journal of Cryptology, 1991, 4, pp. 75–122; "Efficient Multiparty Protocols Using Circuit Randomization", Advances in Cryptology-Crypto '91, 1992), and M. Franklin and S. Haber (see "Joint Encryption and Message-Efficient Secure Computation", Advances in Cryptology-Crypto '93, 1994) a circuit that safely performs a sharing computation in a given finite set can be provided by employing the above described verifiable secret sharing method.

As for the above dialogue method (1), however, it is known that the amount of communication that is required to share one bit is on the order of $n^3k^2$ (where $a^b$ denotes $a^b$) for n secret portions when a parameter for safety is represented by k (normally a value of 100 is used), and that this method is not efficient.

As for the non-dialogue cryptological method (2), calculation for the one-way function of a special order must be performed n times for the n secret portions. Especially when the secret sharing process is employed as a partial process for safely executing a sharing calculation, the number of secret sharing processes that must be performed is increased (e.g., is on the order of $n^2$ for sharing multiplication). The total number of calculations will be impractically huge.

As is described above, in the conventional technique, the dialoque method (1) requires a great amount of communication, while the cryptological method (2) requires a huge number of calculations.

In most of the conventional communication systems, information is transmitted in data block units, which are called packets. Even when a packet is transmitted to a designated destination, all the apparatuses (subscribers) that constitute a communication system can receive that packets. Further, since a plurality of apparatuses are connected via the same communication channel, it is difficult to specify the transmission source of a packet. Therefore, such a communication system tends to lay itself open to attack, such as by "wiretapping", a process whereby a packet that is transmitted to a different destination is wrongfully acquired, and by "deception", wherein a certain apparatus improperly assumes the identity of another apparatus.

Let's discuss how security for the above communication system may be provided which ensures that transmitted information is provided only to the subscriber that is selected as the designated transmission destination and that there is no unauthorized access (information is kept secret). A cryptology technique (Ikeno and Koyama, "Current Cryptology Theory", pp. 224–225, IEEE) is one of the known useful techniques.

It is also known that the cryptological technique is effective for implementing not only the function for keeping information secret, but also a function for verifying received information and a function, called a "digital signature", for verifying for a third person that the received information has been transmitted from a designated apparatus. By performing cryptographic communication with a signature that employs a digital signature, wiretapping and deception can be prevented.

Especially widely known is a verification and digital signature method using the RSA cryptosystem, which is one of public-key cryptosystems (for an example, see "A Method For Obtaining Digital Signatures and Public-Key Cryptosystems", R. Rivest, A. Shamir, and L. Adleman, Communications of the ACM, 21, 2, 1978, pp. 120–125, or see U.S. Pat. No. 4,405,828).

As another digital signature method that uses a public-key cryptosystem other than the RSA cryptosystem, well known is a method that was proposed by A. Fiat and A. Shamir (see "How to Prove Yourself: Practical Solutions to Identification and Signature Problems", Advances in Cryptology—Crypro '87, Lecture Notes In Computer Science, 263, Springer-Verlag, 1988, pp. 186–194, or see U.S. Pat. No. 4,748,668). According to this method, the following processes are performed to provide efficient identification and a digital signature for a given message.

(1) An apparatus that computes a digital signature for a given message, or an apparatus that serves as a reliable center for a communication system, selects an element a at random from among $\{1, \ldots, N-1\}$ (where N is a product of two prime numbers, p and q), and the selected element a is regarded as secret information for the apparatus that computes a signature.

(2) The apparatus that has selected the secret element a computes $a^1$ mod N (it should be noted that 1 satisfies gcd(1, lambda(N))=1 wherein lambda(N)=1 cm(p-1, q-1), gcd(a, b) denotes the greatest common divisor, and 1 cm(a, b) denotes the least common multiple), and employs the result as public information for verifying a digital signature that is generated by the apparatus.

(3) In the process performed by the apparatus to generate a digital signature for a given message m, $R=r^1$ mod N, which is acquired by using a secret element r that is selected at random from among $\{1, \ldots, N-1\}$, and Rlm, which is a value that is obtained by continuing the given, public message m, are regarded as the inputs, and e=h(Rlm) is calculated by using a predetermined function h. Thereafter, $s=r*a^e$ (mod N) is calculated by using the above values as the inputs. The obtained results s and R are employed as a digital signature for the given message.

(4) To verify the digital signature (s, R) for the given message m, $s^1$ mod N and $R*(a^1)^{(h(R|m))}$ mod N are calculated and the digital signature is confirmed when the results are equal.

According to a method proposed by C. P. Schnorr for efficient identification and for acquiring a digital signature for a given message (see "Efficient Identification and Signatures For Smart Cards", Advances In Cryptology—Crypro '89, Lecture Notes In Computer Science, 435, Springer-Verlag, 1990, pp. 239–252, or see U.S. Pat. No. 4,995,082), the following processes are performed.

(1) An apparatus that computes a digital signature for a given message, or an apparatus that serves as a reliable center for a communication system, selects an element a at random from among $\{11, \ldots, p\}$ (where p is a prime number), and the selected element a is regarded as secret information for the apparatus that computes a signature.

(2) The apparatus that has selected the secret element a computes $g^{-a}$ mod q (wherein q is such a prime number that p is a divisor of q−1 and the number of digits of element g that belongs to finite set GF(q) is p), and employs the result as public information for verifying a digital signature that is generated by the apparatus.

(3) In the process that is performed by the apparatus to generate a digital signature for a given message m, $R=g^r$ mod q, which is acquired by using a secret element r that is selected at random from among, $\{1, \ldots, p\}$, and R|m, which is a value that is obtained by continuing the given, public message m, are regarded as the inputs, and $e=h(R|m)$ is calculated by using a predetermined function h. Thereafter, $s=r+a*e$ (mod p) is calculated by using the above values as the inputs. The obtained results s and R are employed as a digital signature for the given message.

(4) To verify the digital signature (s, R) for the given message m, $h(g^s((g^{(-a)})^{(h(R|m))}) \pmod{q}|m(R|m))$ is calculated (it should be noted that $x^y$ represents $x^y$), and the digital signature is confirmed when this result and e are equal.

According to a method proposed by T. ElGamal for efficient identification and for acquiring a digital signature for a given message (see "A Public-Key Cryptosystem And A Signature Scheme Based On Discrete Logarithms", IEEE Transactions On Information Theory, IT-31, 4, 1985, pp. 469–472, American National Standard X9.30-199x, digital Signature Algorithm, February 1992), the following processes are performed.

(1) An apparatus that computes a digital signature for a given message, or an apparatus that serves as a reliable center for a communication system, selects an element a at random from among $\{1, \ldots, p\}$ (where p is a prime number), and the selected element a is regarded as secret information for the apparatus that computes a signature.

(2) The apparatus that has selected the secret element a computes $g^{(-a)}$ mod q (wherein q is such a prime number that p is a divisor of q−1 and the number of digits of element g that belongs to finite set GF(q) is p), and employs the result as public information for verifying a digital signature that is generated by the apparatus.

(3) In the process that is performed by the apparatus to generate a digital signature for a given message m, by employing $R=g^r$ mod q, which is acquired by using a secret element r that is selected at random from among $\{1, \ldots, p\}$, and $e=h(m)$, which is a value that is obtained by a predetermined function h while the given, public message m is regarded as the input, $s=(e+R*a)*r^{-1}$ mod p is calculated. The obtained results s and R are employed as a digital signature for the given message.

(4) To verify the digital signature (s, R) for the given message m, $(g^{(-a)})^R(g^r)^s$ and $g^m$ (mod q) are calculated, and the digital signature is confirmed when these results are equal.

On the other hand, for the above described information communication system that maintains secrecy and achieves verification, Y. Desmedt and Y. Frankel proposed, as a means for increasing reliability while keeping information secret, a method for sharing secret information and for sharing the computation of a digital signature for a given message among a plurality of computers that are connected by a communication path (these computers are hereafter referred to as a "group of signers", each computer that belongs to that group is referred to as a "subscriber", and the number of subscribers in a group is represented as n) (see "Threshold Cryptosystems", Advances in Cryptology—Crypro '89, 435, Springer-Verlag, 1990, pp. 307–315; and "Shared Generation Of Authenticators And Signatures", Advances In Cryptology—Crypro '91, 576, Springer-Verlag, 1992, pp. 457–469).

The fundamental portion of this sharing digital signature method is to share secret information in a communication system that consists of the above described plurality of subscribers so as to satisfy the previously mentioned requirements (a) and (b).

The sharing-type digital signature method, proposed by Y. Desmedt and Y. Frankel, that employs the RSA cryptosystem based on the secret sharing method satisfies the following requirements (I) and (II).

(I) The cooperation of t+1 subscribers is sufficient to generate a digital signature of a group of signers for a given message.

(II) A digital signature for a given message can not be generated when the number of subscribers is less than a threshold value (i.e., t or smaller).

With only the requirements (I) and (II), however, when a digital signature generation process is shared, it is happened that the generation of a signature can not be performed if there is an unfair subscriber among the cooperated t+1 or more subscribers.

On the other hand, it is known that a method for generating a digital signature for every subscriber that has any type of errors can be provided based on a verifiable secret sharing system that is defined by the previous requirements (a) through (d). In other words, a sharing digital signature system that satisfies the following requirements can be realized.

(I') A digital signature for a given message can be generated as long as t+1 fair subscribers cooperate even if an unfair subscriber is present among the fair subscribers.

(II) A digital signature for a given message can not be generated with the number of subscribers less than a threshold value (i.e., t or smaller).

It is known that a sharing and generation system for the various previously described digital signature methods can be designed by a sharing and computation circuit that employs the above verifiable secret sharing method.

It is known that the amount of communications and the amount of computations, which are required for the sharing digital signature system that satisfies the above requirements (I) and (II), are practical. However, as is described above, when a subscriber who participates in the signature sharing and generation process performs an unfair matter, a signature may not be generated.

On the other hand, as for the sharing digital signature system that employs the verifiable secret sharing method and the sharing and computation circuit and satisfies the requirements (I') and (II), as described above, it is known that the required amount of communications is unpractical according to the dialogue type verifiable secret sharing method (1) and that the required amount of computations is unpractical according to the non-dialogue type verifiable secret sharing method (2).

As is described above, the enormous amount of communications is required for the sharing digital signature system that is based on the dialogue type verifiable secret sharing method (1) by employing the conventional technique, while the enormous amount of calculations is required for the sharing digital signature system that is based on the non-dialogue verifiable secret sharing method (2) by employing the conventional technique.

As another countermeasure for reducing the danger from wiretapping and deception, there is a well known authentication method for a network called kerberos (see "UNIX Security", by S. Garfinkel and G. Spafford/Edited And Translated By Hide Yamaguchi, ASCII, pp. 349–357 and pp. 535–542, 1993), which employs a common-key cryptosystem that requires a small number of computations.

Specific authentication protocols for kerberos will now be explained that are based on authentication protocols by Needham and Schroeder (see R. N. Needham and M. D. Schroeder: "Using Encryption for Authentication In Large Network Of Computers", CACM 21, 12, pp. 993–999, December 1978) and Secure RPC (Remote Procedure Call) protocols by Birrell (see A. D. Birrell: "Secure Communications Using Remote Procedure Calls", ACM Transaction Computer Systems, Vol. 3, No. 1, pp. 1–14, February 1985).

Generally, in kerberos, there is an authentication server that manages secret information (which is the equivalent of a secret key) for all the apparatuses in the communication system. The authentication server commonly uses secret key pki with the individual apparatuses i, as is shown in FIG. 31A. Hereafter, a person who requests a certification is called a testifier, and a person who provides a testifier an authentication is called an authenticator.

As is shown in FIG. 31B, when testifier A asks authenticator B for a certification, A transmits data 161, which has the form {A, B, R}, to an authentication server. It should be noted that A and B are public identification information items that specify the testifier A and the authenticator B7 such as an apparatus or a user name, and R is a randomly selected number.

Upon the receipt of the data 161, the authentication server returns data 162, which has the form {authentication element, R, B, CK}^pkA, to A. It should be noted that {M}^k denotes data that are obtained by coding message M using key k, the authentication element is data 163, which is constituted by {T, A, CK}^pkB, using time stamp T, and CK denotes a common key that is generated by the authentication server and that is hereafter employed for common key cryptological communication between A and B.

A secret common key for common key cryptological communication between a testifier and an authenticator is hereafter called a conversation key. The authentication server therefore serves as a delivery server for a conversation server. Finally, the testifier A sends the previously described authentication element 163 to the authenticator B. The authenticator B compounds the received authentication element 163 with its secret master key pkB to authenticate A, and then performs cryptological communication by using the common conversation key CK.

It is therefore possible for the danger from wiretapping and from deception to be reduced by authentication protocols that employ kerberos.

According to the public key cryptological method, however, computation of the residue of a power series of an integer that is 512 bits or greater must be performed, so that the number of computations is enormous.

Further, since in the protocols for kerberos in the common key method an authentication server manages secret information for all the apparatuses that constitute a communication system, an included authentication server that for physical reasons is fully reliable is also required (likewise, for the public-key cryptological method, a concentration control center that manages all public keys is required). Therefore, to ensure security, an authentication server must be strictly controlled by locating it in a locked room that no one is allowed to enter without permission. In addition, when the authentication server can not be relied on because of the occurrence of a failure or the commission of an unauthorized act, fault tolerance is so reduced that the security of the complete system breaks down.

SUMMARY OF THE INVENTION

It is an object of the present invention to provide a verifiable secret sharing method by which both the amount of computation and the amount of communication that are required constitute a practical order of magnitude when compared with those required for the dialogue type system (1) and the cryptosystem (2) described above.

The present invention is so positioned that it lies in the middle between the dialogue type system (1) and the non-dialogue type system (2), employs a verifiable secret sharing method by which both the amount of computation and the amount of communication required constitute a practical order of magnitude, and proposes a shared digital signature system (a system that may not generate a signature when the number of subscribers that perform unauthorized acts is equal to or greater than a threshold value, but can identify such subscribers), which is positioned between the requirement (I) (a system that may not generate a signature when there is a subscriber who performs an unauthorized act) and the requirement (I') (a system that can generate a signature even when the number of subscribers who perform unauthorized acts is equal to or lower than a specific threshold value).

It is another objective of the present invention to overcome the above described problems of reliability for an authentication server, so that a sharing authentication server that employs a plurality of apparatuses to share and manage secret information is proposed.

Requests for the sharing authentication server are as follows:

(1) For testifiers and authenticators, the sharing authentication protocols perform the same authentication function as the authentication protocols that are provided by conventional centralized management.

(2) For testifiers and authenticators, the sharing authentication protocols ensure the same interface (data format) as the authentication protocols that are provided by conventional centralized management.

(3) For testifiers and authenticators, the sharing and authentication protocols are implemented by performing the same amount of computation as is required for the authentication protocols provided by conventional centralized management.

(4) The above described requests are satisfied except when more than half of the apparatuses that constitute the sharing authentication server are not reliable.

According to one aspect, the present invention that achieves these objectives relates to a secret information processing method for a communication system, wherein a plurality of information processing apparatuses are connected by secret communication channels, across which each of the apparatuses exchanges information with other of the apparatuses while keeping the information secret from any remaining apparatuses, and by broadcast communication channels, across which the apparatuses commonly exchange information with all other included apparatuses, the secret information processing method comprising the steps of:

generating from secret information, by employing for such generation a first apparatus that is a member of the plurality of apparatuses and that possesses the secret information, a secret array for a number of second apparatuses;

extracting first information segments from the secret array for the second apparatuses by employing the first apparatus, and transmitting the first information segments across the secret communication channels to the second apparatuses;

performing a predetermined function on a part of the secret array by employing the first apparatus, and broadcasting an obtained output value across the broadcast communication channels;

generating random numbers by employing the second apparatuses, and broadcasting the random numbers across the broadcast communication channels;

generating, from the secret array and in consonance with the random numbers that are broadcast, second information segments for the second apparatuses by employing the first apparatus, and broadcasting the second information segments across the broadcast communication channels;

generating, by employing the second apparatuses, third information segments, which are generated as the second information segments for the second apparatuses by employing the first apparatus, that are in consonance with the first information segments that are received and the random numbers that are generated by the second apparatuses; and comparing, by employing the second apparatuses, the third information segments with the second information segments for the second apparatuses that are broadcast, and verifying that the secret information is shared by the first apparatus.

According to another aspect, the present invention that achieves these objectives relates to a signature generation method for a communication system, wherein a plurality of apparatuses are connected by secret communication channels across which the apparatuses exchange information with other apparatuses while keeping the information secret from any remaining apparatuses, and by broadcast communication channels, across which each of the apparatuses commonly exchanges information with all other apparatuses, the signature generation method comprising the steps of:

randomly selecting first secret information by employing each of the apparatuses that belongs to a group of signers, and secretly sharing the first secret information with the apparatuses in the group;

performing a predetermined first function on the first secret information by employing the apparatuses, and broadcasting obtained output values to all of the apparatuses in the group;

sharing the first secret information from each of the apparatuses among the apparatuses in the group, and adding the first secret information;

sharing the output values among the apparatuses in the group for multiplication, and performing a predetermined second function on a result that is obtained by multiplication and a message;

sharing second secret information among the apparatuses in the group and computing the second secret information by employing a result that is obtained by performing the second function, a result that is obtained by sharing and addition, and an element that becomes public; and decrypting, through a cooperative effort involving all the apparatuses in the group, the second secret information that is shared, and outputting the decrypted second secret information as a signature together with the result that is obtained by sharing and multiplication.

According to an additional aspect, the present invention that achieves these objectives relates to an authentication method for a communication system, wherein a plurality of apparatuses are connected and wherein apparatuses among those that belong to a specific group commonly provide authentication, the authentication method comprising the steps of:

transmitting an authentication request message, which includes identifiers for a testifier and for an authenticator, from an apparatus of the testifier, who transmits a request for authentication from an apparatus of the authenticator, to each of the apparatuses of the specific group;

generating an authentication element, which is encrypted with a secret key that is related to the authenticator, that is based on the authentication request message by employing a cooperative effort involving all of the apparatuses that belong to the specific group, and generating an authentication message by encrypting the authentication element with a secret key that is related to the testifier;

transmitting the authentication message from each of the apparatuses of the specific group to the apparatus of the testifier;

decrypting the authentication message at the apparatus of the testifier upon receipt of the authentication message, and transmitting the decrypted authentication element to the apparatus of the authenticator; and decrypting the authentication element at the apparatus of the authenticator and transmitting authentication to the testifier.

According to a further aspect, the present invention that achieves these objectives relates to a communication system that has a plurality of information processing apparatuses, secret communication channels, across which each of the apparatuses can exchange information secretly with the other apparatus while keeping the information secret from any remaining apparatuses, and broadcast communication channels, across which each of the apparatuses commonly transmits information to all other apparatuses, with a first information processing apparatus of the plurality of information processing apparatuses comprising:

first generation means, for generating a predetermined partial array from secret information, extraction means, for extracting, from the partial arrangement, first information segments for any remaining information processing apparatuses, and for transmitting the first information segments to the remaining information processing apparatuses, function processing means, for performing a predetermined function on the first information segments and broadcasting output values so obtained across the broadcast communication channels to the remaining information processing apparatuses, and second generation means, for generating a second information segment, which is in consonance with random numbers that are broadcast by the remaining information processing apparatuses, and for broadcasting the second information segment across the broadcasting communication channels; and with each of the remaining information processing apparatuses comprising:

random number generation means, for generating a random number and for broadcasting the random number across the broadcast communication channels, third generation means, for generating, in consonance with the first information segment and the random number, a third information segment that is to be generated as the second information segment by the first information processing apparatus, and verification means, for comparing the third information segment with the second information segment that is broadcast and for verifying the sharing of a secret that is performed by the first information processing apparatus.

According to still another aspect, the present invention that achieves these objectives relates to a communication system that has a plurality of information processing apparatuses, secret communication channels, across which each of the apparatuses can exchange information secretly with other apparatuses while keeping the information secret from any remaining apparatuses, and broadcast communication channels, across which each of the apparatuses commonly transmits information to all the other apparatuses, with each of the apparatuses, among the plurality of apparatuses, that belongs to a group of signers comprising:

sharing means, for selecting first secret information at random and for secretly sharing the first secret information among the apparatuses of the group;

broadcast means, for performing a predetermined first function on the first secret information and for broadcasting an obtained value to all remaining apparatuses of the group;

addition means, for sharing the first secret information held by each of the apparatus among the apparatuses of the group and for adding the first secret information;

processing means, for sharing the output value held by each of the apparatuses among the apparatuses of the group and multiplying the output value, and for performing a predetermined second function on a result, which is obtained by multiplication, and a message;

computation means, for employing the multiplication result, a result that is obtained by sharing and addition, and an element that is made public to share second information among the apparatuses of the group and to compute the second information; and decryption means, for decrypting the second secret informationby a joint effort of all of the apparatuses of the group among which the second secret information is shared, and for outputting decrypted second secret information as a signature together with the result obtained by sharing and multiplication.

Other objectives and advantages besides those discussed above shall be apparent to those skilled in the art from the description of the preferred embodiments of the invention that follows. In the description, reference is made to accompanying drawings, which form a part thereof, and which illustrate an example of the invention. Such example, however, is not exhaustive of the various embodiments of the invention, and therefore reference is made to the claims that follow the description for determining the scope of the invention.

BRIEF DESCRIPTION OF THE DRAWINGS

FIG. 7 is a diagram for explaining sharing and computation processing;

FIG. 9 is a block diagram illustrating the structure of a communication system where a digital signature is generated while being shared;

13

Figure 22:
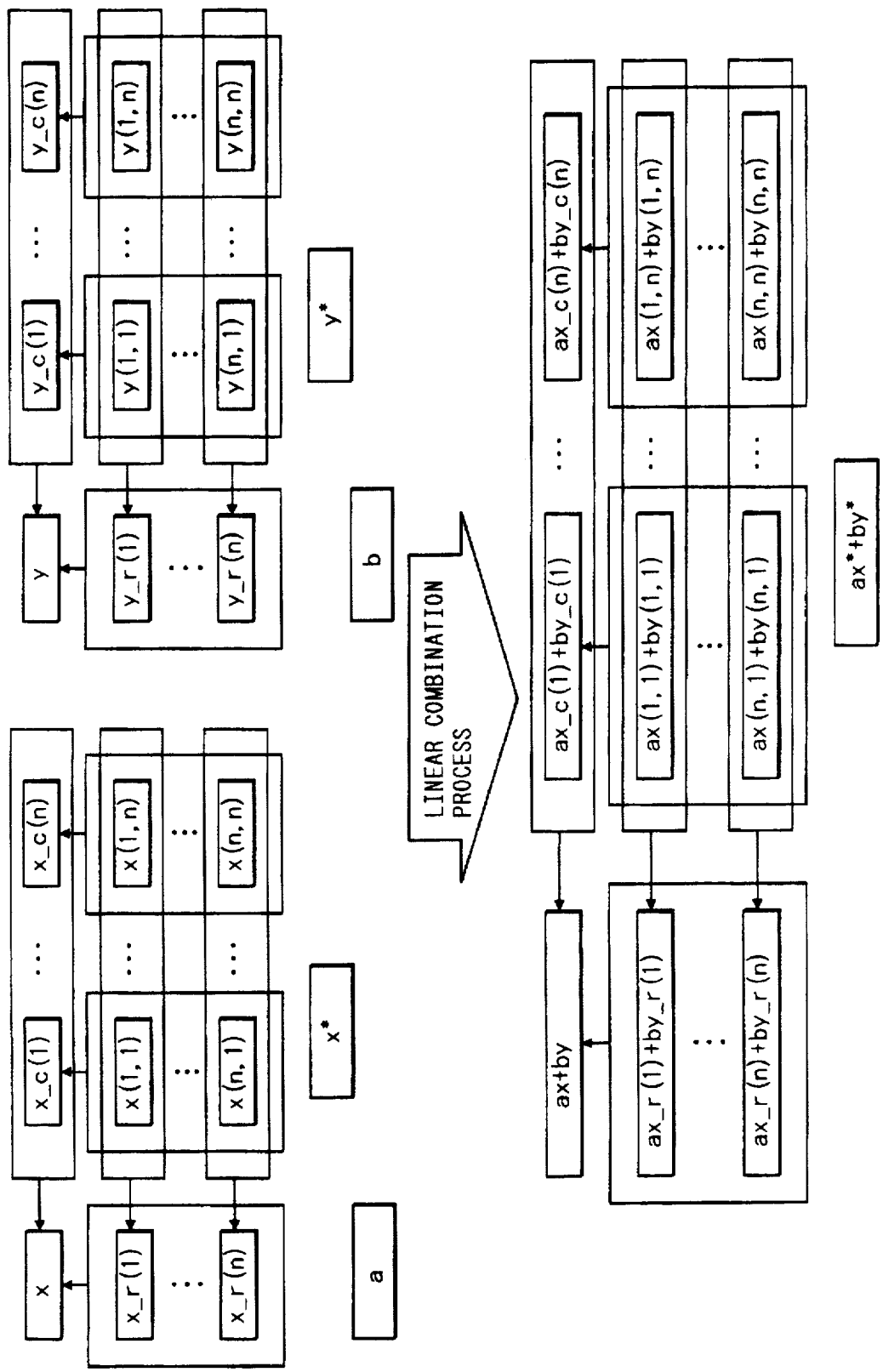
Figure 23A:
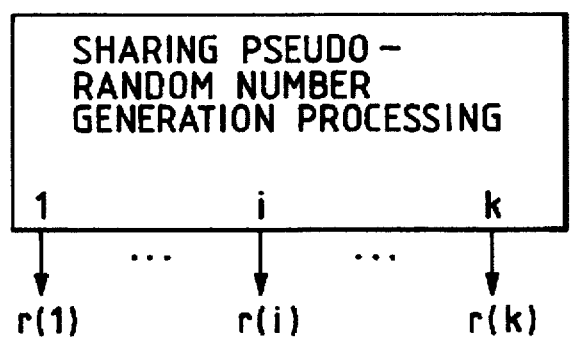
Figure 23B:
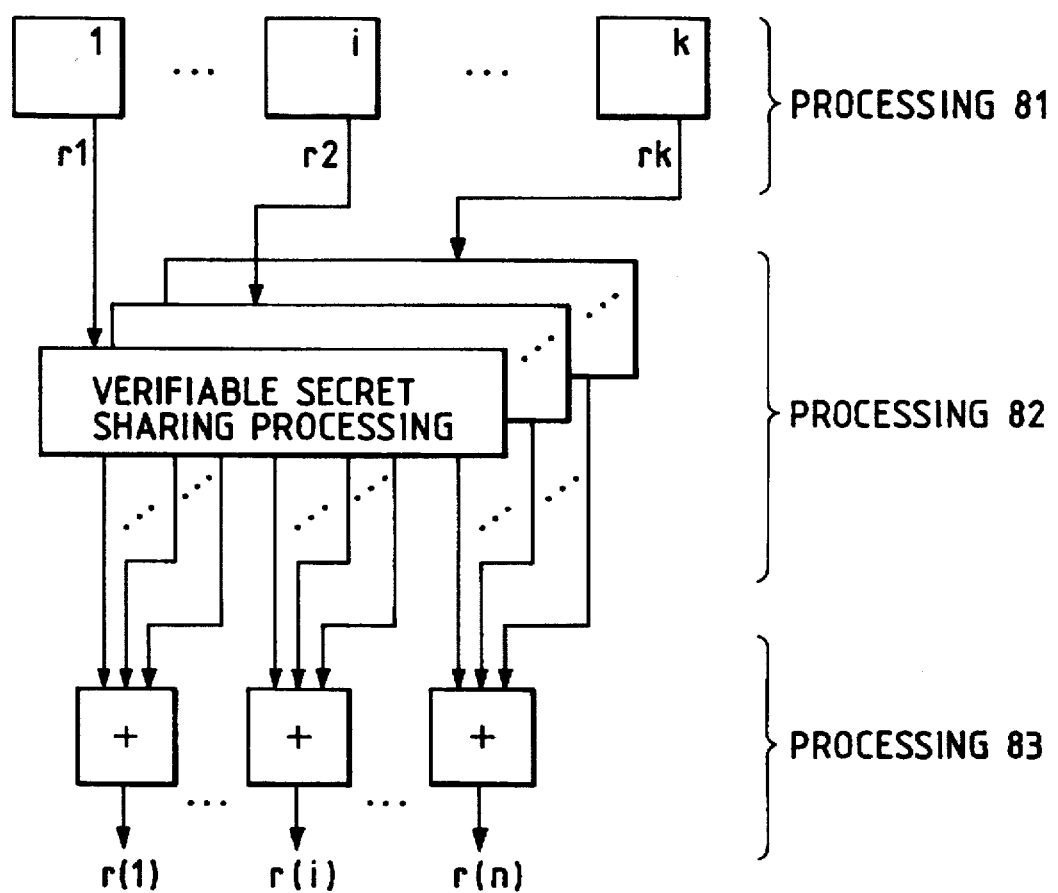
Figure 24A:
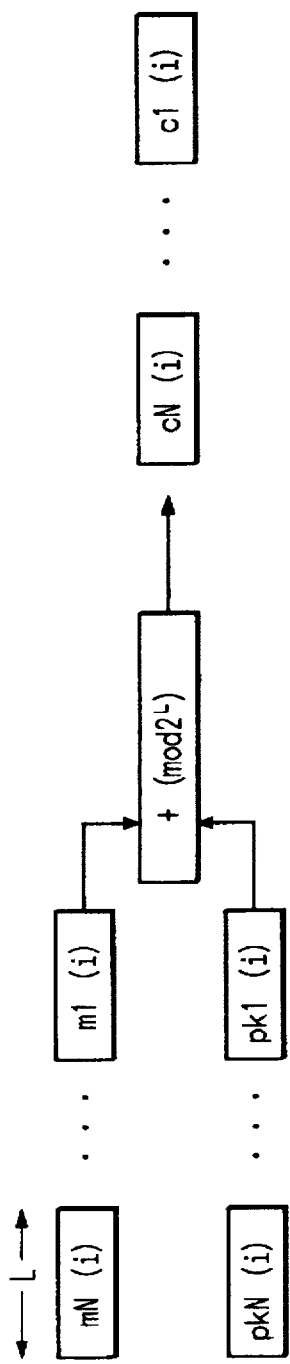
Figure 24B:
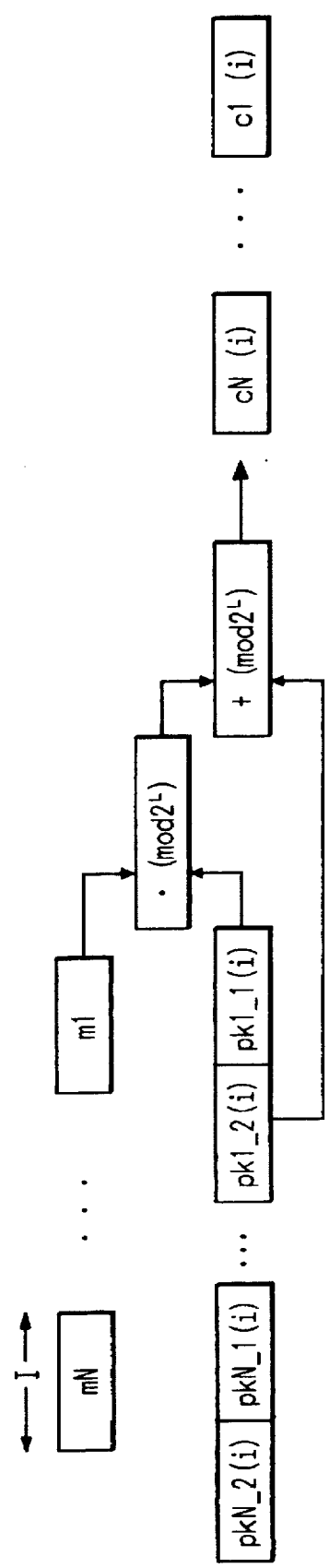
Figure 25A:
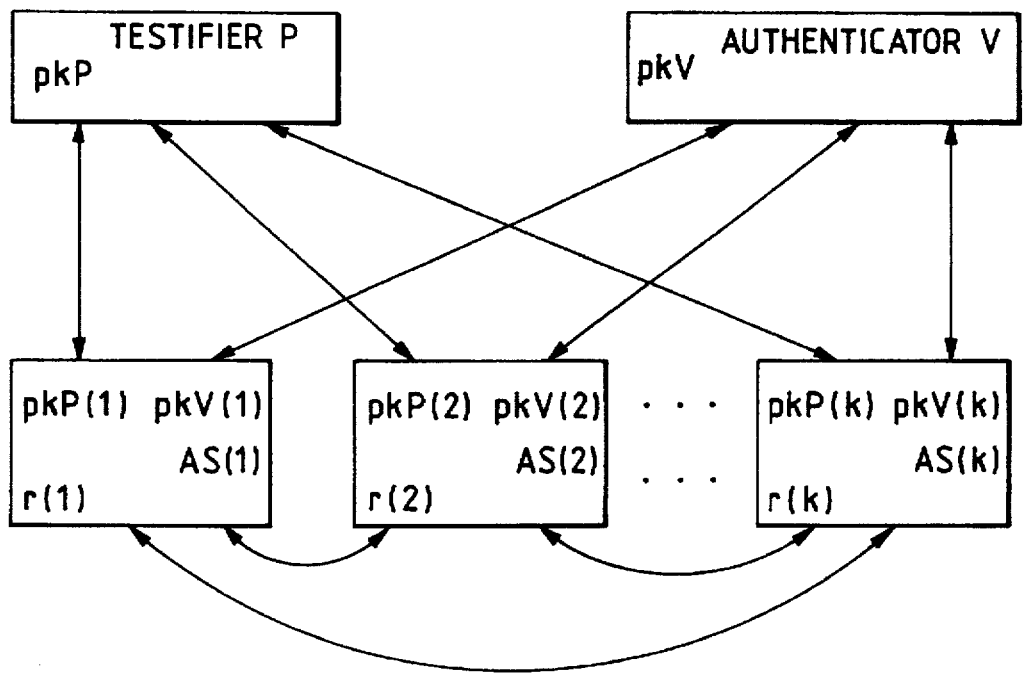
Figure 25B:
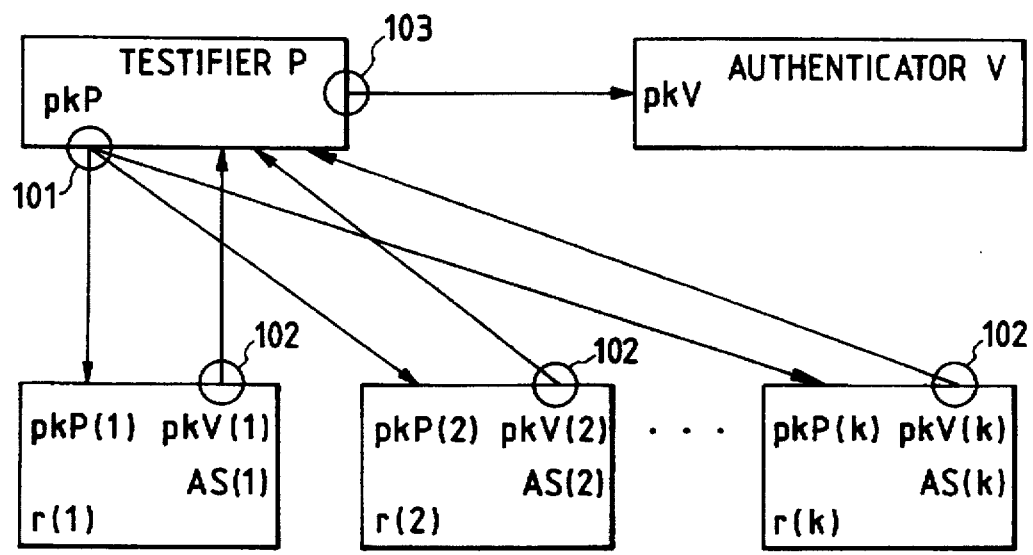
Figure 26:
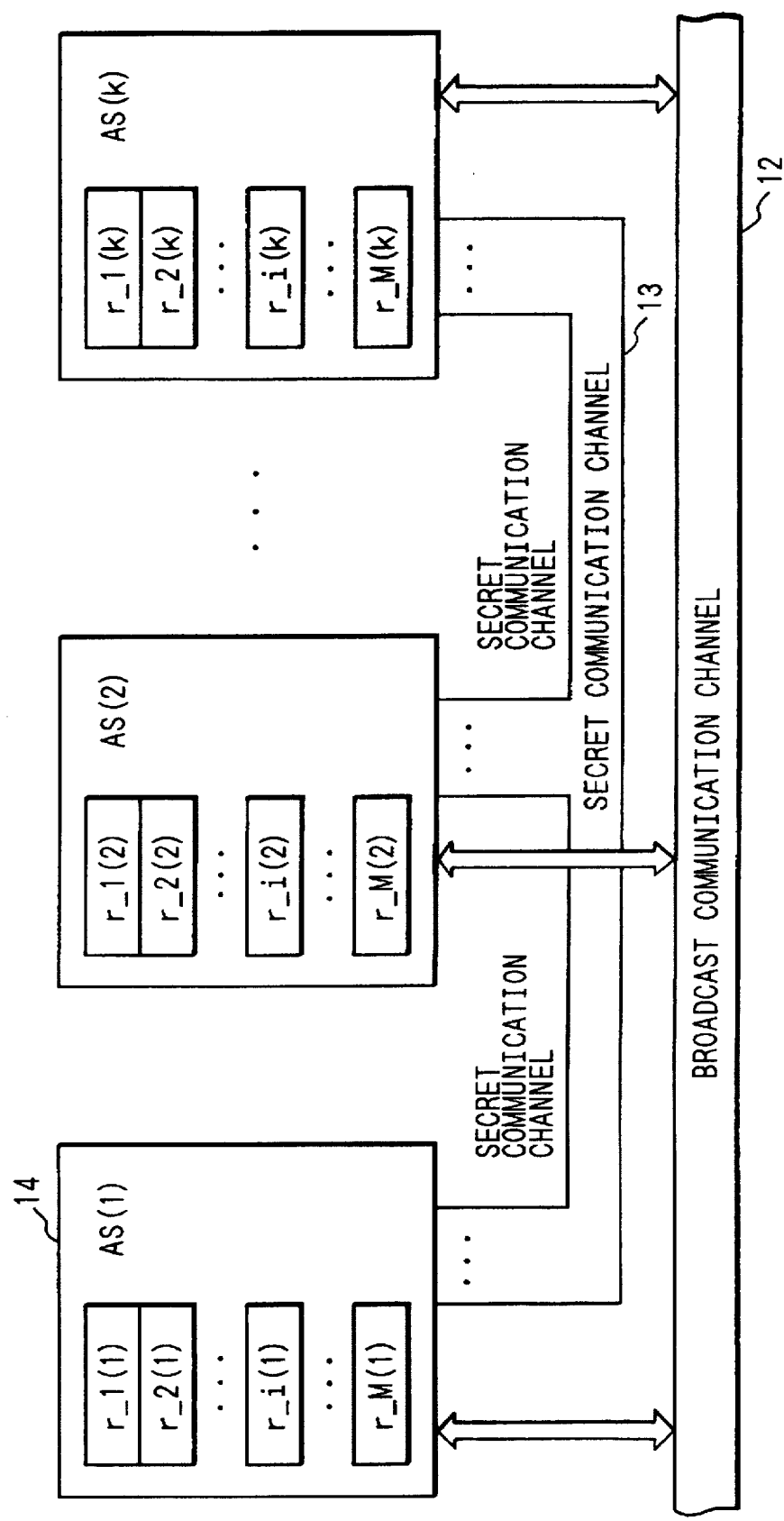
Figure 28A:
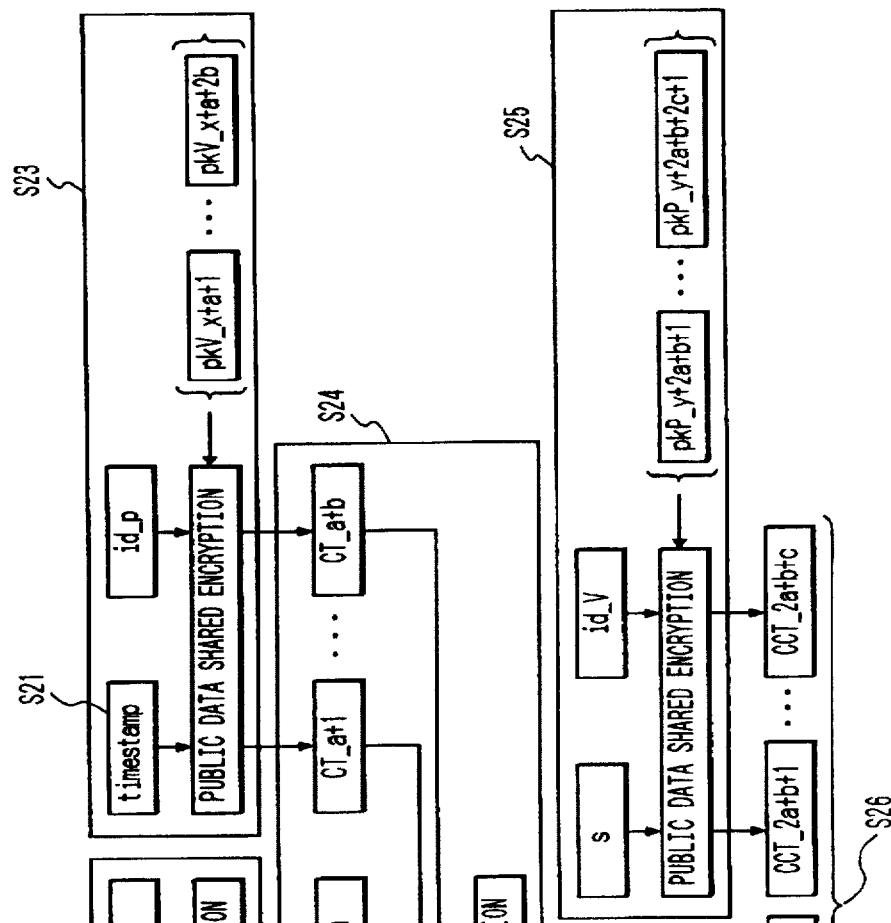
Figure 28B:
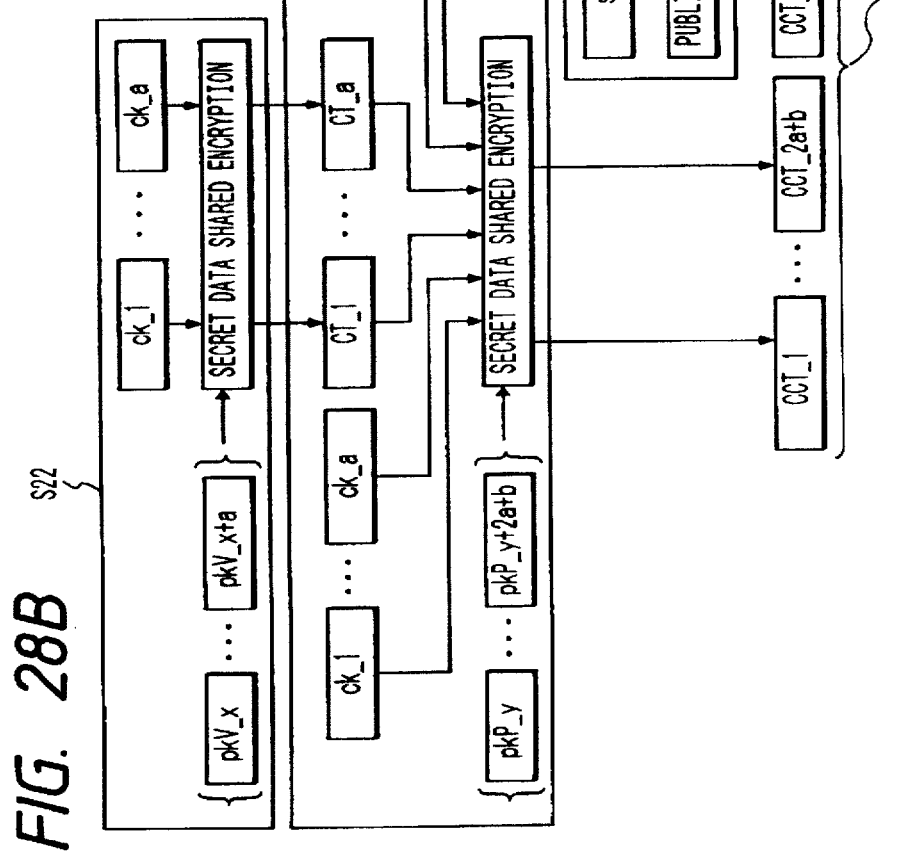
Figure 29A:
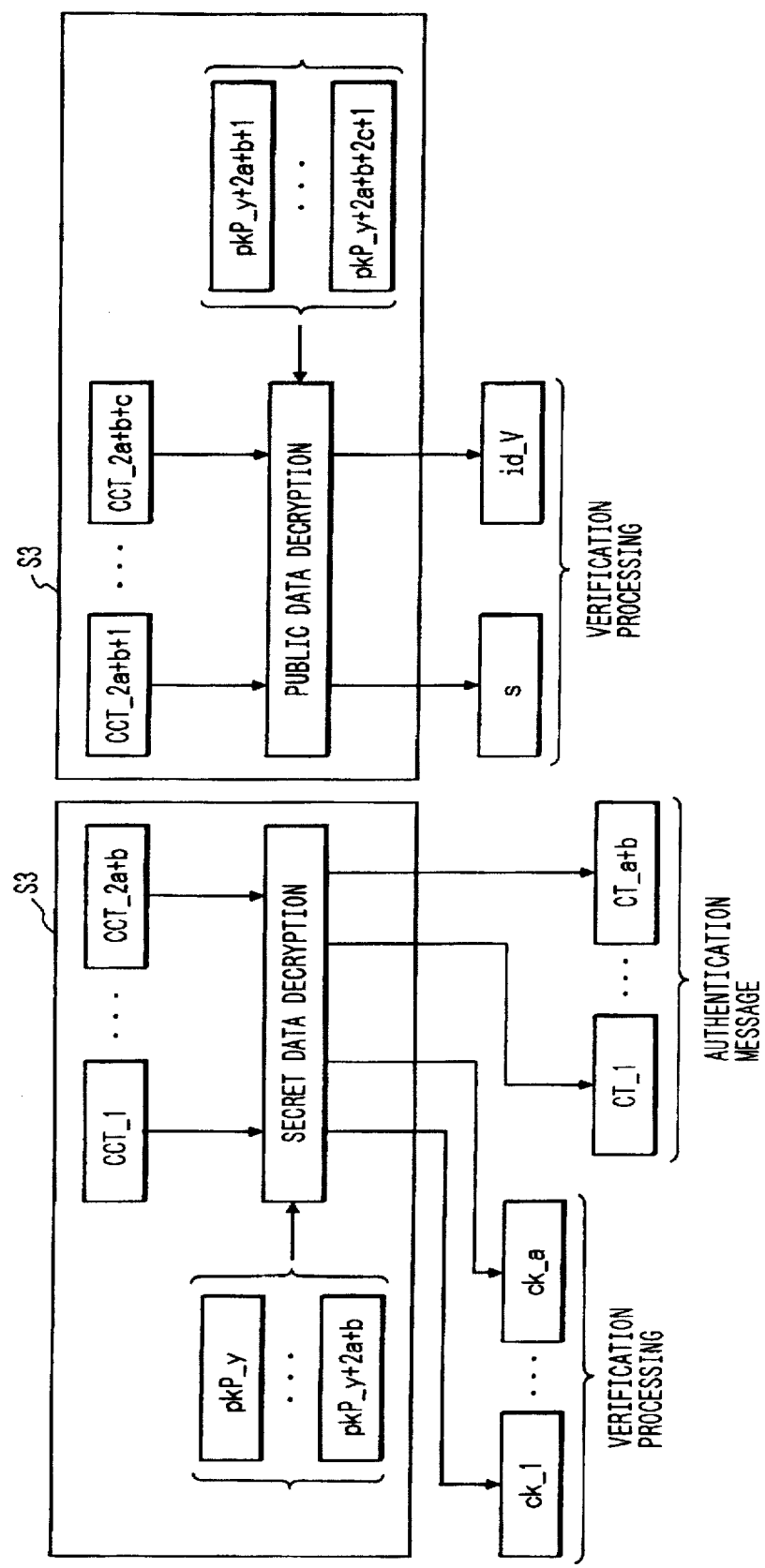
Figure 29B:
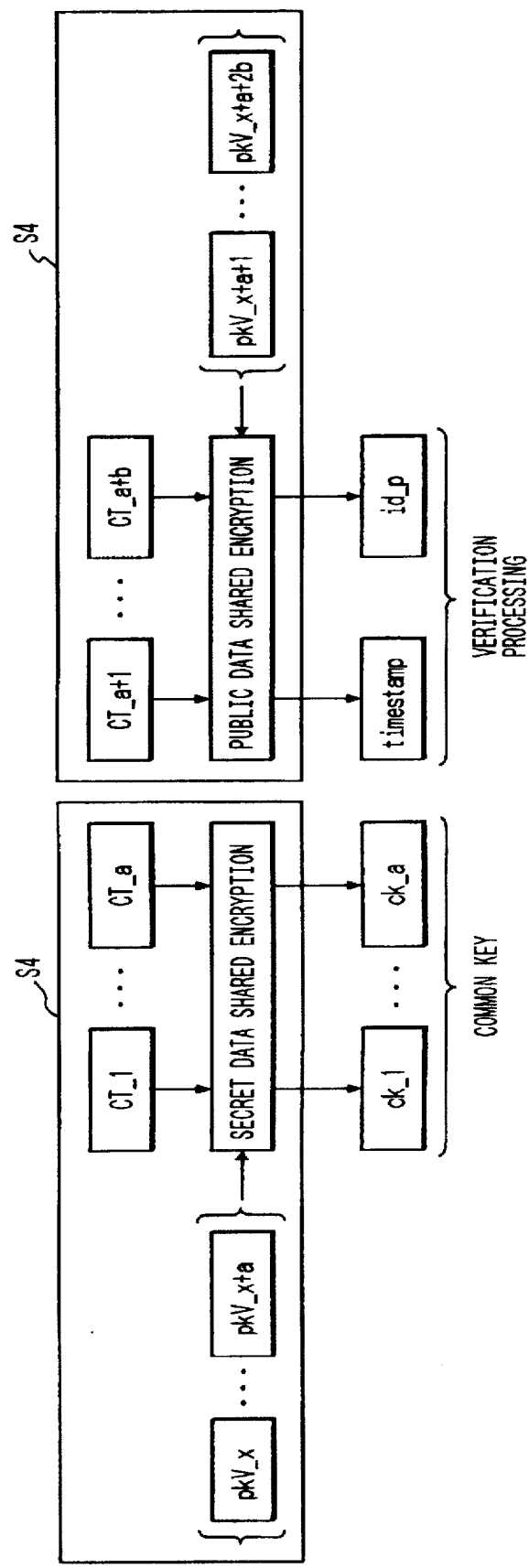
Figure 31A:
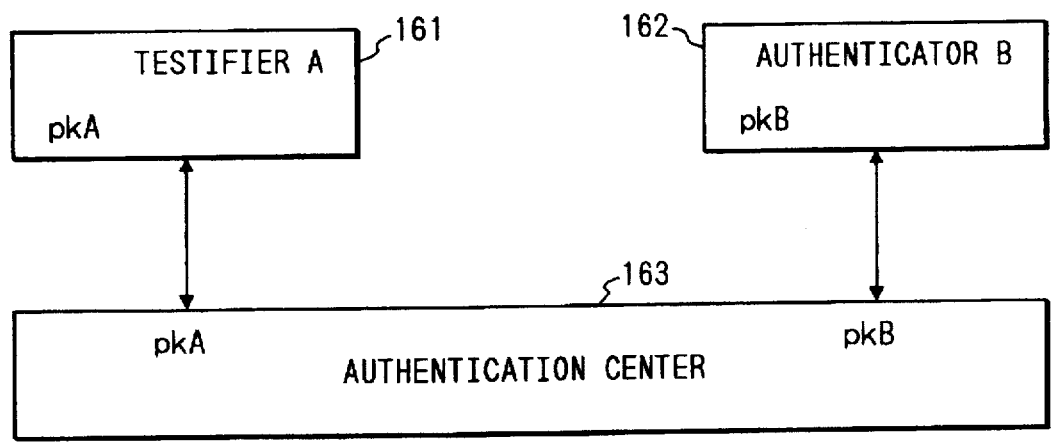
Figure 31B:
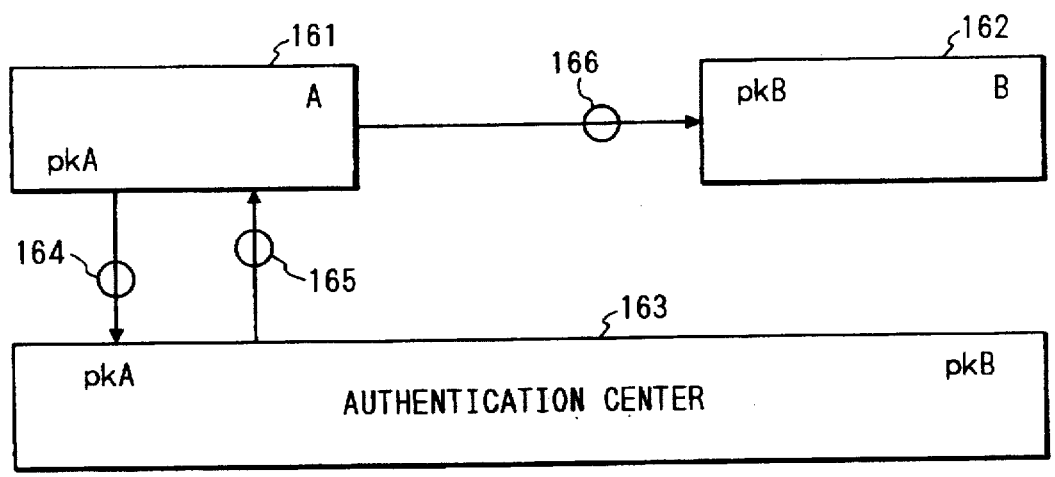

FIG. 22 is a diagram for explaining shared secret linear combination processing;

FIGS. 23A and 23B are diagrams showing the procedures for sharing pseudo-random number generation processing;

FIGS. 24A and 24B are diagrams showing the procedures for secret-key sharing and encryption processing;

FIGS. 25A and 25B are diagrams showing the procedures for shared authentication protocols;

FIG. 26 is a diagram showing the procedures for off-line pseudo-random number generation processing;

FIG. 27 is a diagram showing the procedures for on-line secret-key delivery processing;

FIGS. 28A and 28B are diagrams showing the procedures for shared authentication protocols;

FIGS. 29A and 29B are diagrams showing the procedures for shared authentication protocols;

FIGS. 30A and 30B are diagrams showing the procedures for shared authentication protocols; and FIGS. 31A and 31B are diagrams showing the procedures for conventional shared authentication protocols.

DETAILED DESCRIPTION OF THE PREFERRED EMBODIMENTS

The preferred embodiments of the present invention will now be described while referring to the accompanying drawings.

[Embodiment 1]

First, the principle of the present invention will be described.

Figure 3:
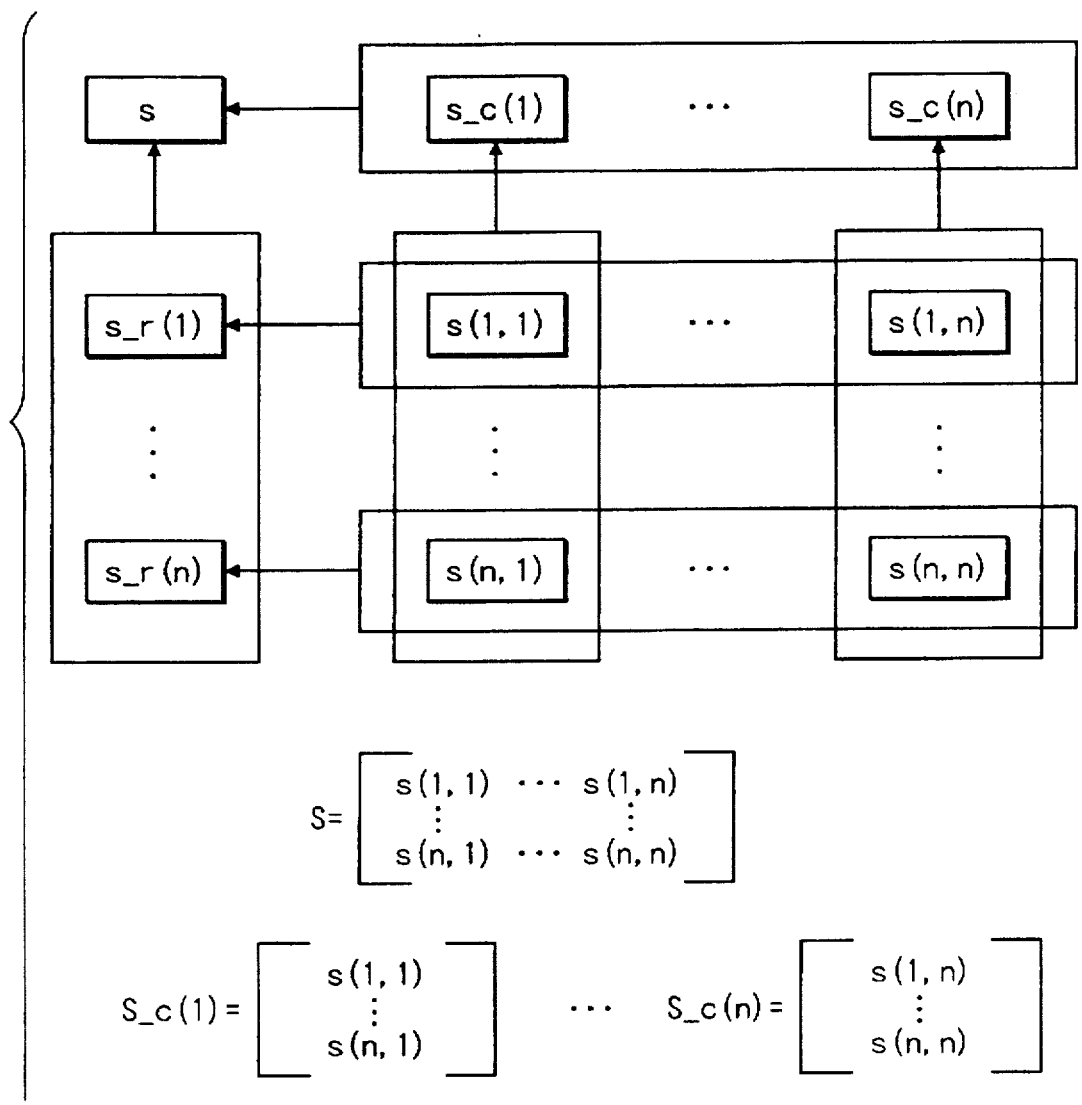
FIG. 3 is a diagram showing the relationship between a secret and a partial matrix.

FIG. 3 is a diagram showing the relationship between secret s and partial matrix S.

In this embodiment, the partial matrix S for the secret s is a secret segment n×n matrix $S=[s(i, j)]$ $(i, j=1, \ldots, n)$, that is obtained by, as will be described later, adding requirements to a partial matrix that is employed for a conventional dialogue type verifiable secret sharing system.

First, the vector for each column, $S\_r(i)=[s(i,1), \ldots, s(i,n)]$ $(i=1, \ldots, n)$, is a secret portion vector for secret $s\_r(i)$ (a vector whose element j is a secret portion of subscriber j in the sharing method of a certain secret), and the vector for each row, $S\_c(j)=[s(1,j), \ldots, s(n,j)]$ $(j=1, \ldots, n)$, is a secret portion vector for secret $s\_c(j)$.

The vectors $[s\_r(1), \ldots, s\_r(n)]$ and $[s\_c(1), \ldots, s\_r(n)]$ respectively, for secret $s\_r(i)$ and $S\_c(j)$, are secret portion vectors for the secret elements. In secret sharing processing, the row vector i $(i=1, \ldots, n)$ of the thus structured partial matrix, and the secret $s\_r(i)$ are transmitted to subscribers i as a secret information segment for each subscriber i. Therefore, in secret decryption processing, as long as the subscriber who received the information segment does not perform an unauthorized act, it is possible to verify with very high probability whether or not information segments that are broadcast by the individual subscribers are correct.

In addition in this embodiment, in order to verify whether or not the information segments to be broadcast in the secret decryption process are correct even when a subscriber that holds original secret information and has distributed secret information segments performs an unauthorized act, a value that serves as an authentication element for the secret $s\_r(i)$ that corresponds to each subscriber i $(i=1, \ldots, n)$ is generated by the one-way hash function (see "Modern Cryptological Theory," by Ikeno and Koyama, pp. 224–225, IEEE, 1986) before secret information segments are distributed.

14

The one-way hash function will be explained.

The one-way hash function is a function with which a data compression scramble is performed, and with this function the computation by which an output value is acquired from an input value is easy, but the inverse computation by which an input value is acquired from an output value is difficult. In this embodiment, however, compared with the one-way function that is employed for a conventional non-dialogue type verifiable secret sharing system, a specific algebraic property is not necessary, and thus the one-way hash function that provides high speed calculation can be used.

As a specific example of the one-way hash function, R. Merkel has proposed a one-way hash function that uses block cryptology, such as DES (Data Encryption Standard) (see "One-Way Hash Functions And DES," Advances in Cryptology—Crypro '89, Lecture Notes In Computer Science, Vol. 435, Springer-Verlag, 1990).

Figure 8A:
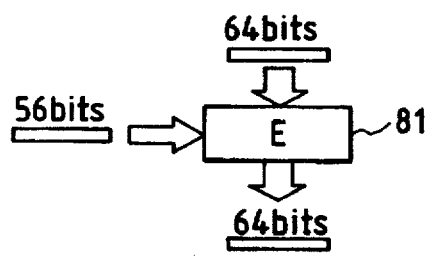
FIGS. 8A to 8C are diagrams illustrating processing for obtaining a hash value from an input message.
Figure 8B:
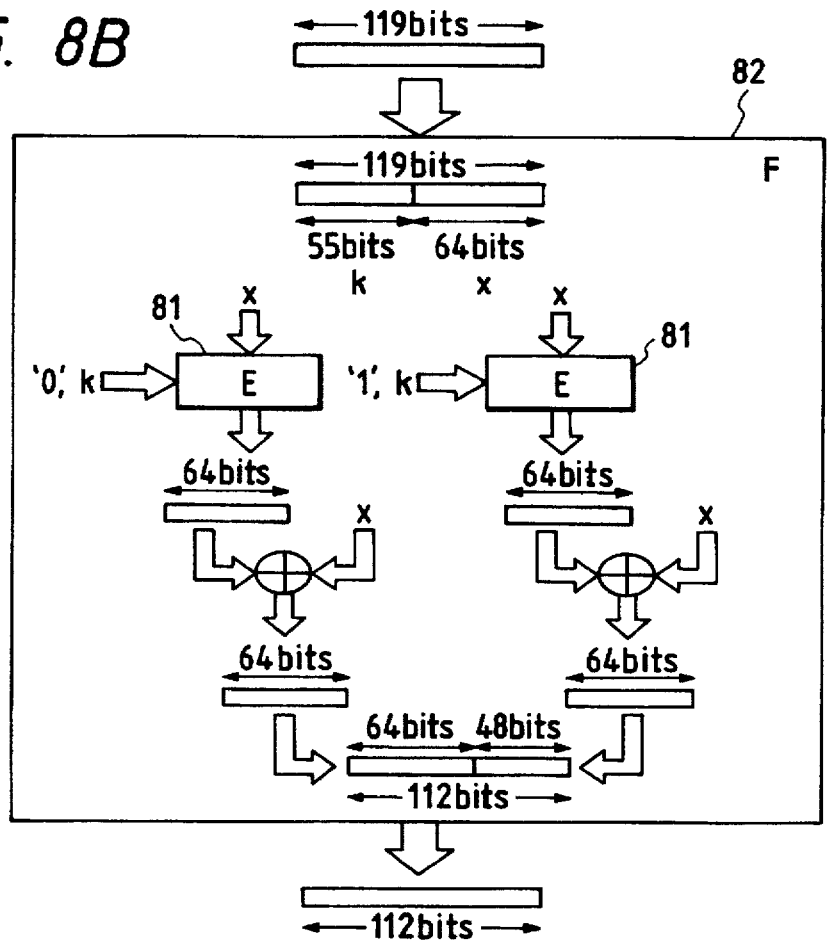
Figure 8C:
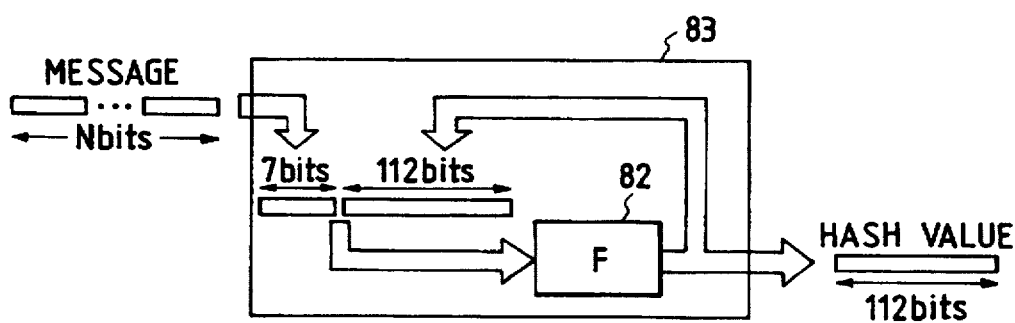

FIGS. 8A to 8C are diagrams for explaining a specific structure of the one-way hash function.

In FIG. 8A indicates block encryption that is performed by using DES, and an encryption circuit 81 provides a 64-bit output from either a 64-bit input or a 56-bit key (DES is represented by E in FIGS. 8A to 8C).

Then, FIG. 8B indicates the processing for function F in which the input length is 119 bits and the output length is 112 bits, while DES is employed for partial processing. Reference number 82 denotes a function operation circuit. This processing is defined as follows.

First, the input is divided into two portions k and x (it should be noted that the length of the portion k is 55 bits and the length of the remaining portion x is 64 bits). Then, the portion x is employed as the input for DES, while a value '0', k, which is obtained by combining the portion k and '0', is employed as a 56-bit key. An EXOR operation is performed with the obtained output and x, and the acquired result is regarded as 64 bits on the left side of the output for the function F. In the same manner, the same portion, x, is employed as an input, and a value '1', k, which is obtained by combining the remaining portion k and '1', is employed as a key. An EXOR operation is performed with the obtained output and x. Of the resultant 64 bits, 48 bits are employed as the remaining portion (the 48 bits on the right) for the function F. Then, the result that is provided by combining the two thus obtained outputs is the 112-bit output of function F.

Following this, FIG. 8C indicates processing where a given message is an input and the one-way hash function value is an output, and reference number 83 denotes a hash function operation unit. This processing is performed as follows.

The first 119 bits of a given message are employed as the input from the above described function F, and the first 112-bit output is obtained. Then, that output is again employed as the 112-bit input, and hereafter the remaining 7 bits of the message are repeatedly input to the function F. Finally, the 112-bit output obtained when all the message has been input ('0' is added as needed if there are too few bits to input the last 7 bits of the message) is employed as a hash value for the message.

R. Merkel stated in the previous paper that the one-way hash function (i.e., the factor that makes it very difficult when one hash value is given for the same hash value to be obtained when a different input message is acquired) that is calculated as above, is provided for safety (when an input is given, an output is a random variable that is obtained from a key, and when an output is given, an input is a random variable that is obtained from a key) of block encryption, such as DES that is employed above.

Further, in the same paper, a one-way hash function that is more efficient than the above described hash function is also proposed. In addition, R. Rivest has proposed an efficient one-way hash function that does not use block encryption (see "The MD4 Message Digest Algorithm," Advances In Cryptology—Crypro '90, Lecture Notes In Computer Science, Vol. 537, Springer-Verlag, 1991. Nist Federal Information Processing Standard For Secure Hash, American National Standard X9.30-199x).

Cut and Choose processing in this embodiment will now be described.

In order to verify whether the secret information segments that all the subscribers have received in the secret sharing processing can be information segments for a verifiable shared secret like Cut and Choose, as performed in a conventional dialogue type secret sharing system, partial matrixes and hash values for the secret element s are distributed, and at the same time, partial matrixes and hash values for k secrets 11, . . . , 1k, which are randomly selected, are distributed. All the secret information relating to k/2 secrets (1i(1), . . . , 1i(k/s)) that are randomly determined by all the subscribers are broadcast. As for the remaining k/2 secrets (1j(1), . . . , 1j(k/2)), all the secret information relating to 1j(1)+s, . . . , 1j(k/2)+s is broadcast. When the number of portions that have errors in all the broadcast information exceed t, it is determined that the secret sharing processing is not correct.

In this manner, a secret sharing method can be provided that satisfies the following requirements (c') and (d') instead of the requirements (c) and (d) of the conventional verifiable secret sharing method, and by employing this method, a method and a communication system for safely carrying out the sharing calculation can be realized.

(c') When incorrect information segments are mixed with correct information segments, the original secret information may not be decrypted even with t+1 correct information segments, but a subscriber that has performed an unauthorized act can be identified.

(d') When the individual subscribers have received information segments for a secret and the content of the information segments is not correct for the decryption of secret information x, a subscriber who performs an unauthorized act can be identified during the decryption processing.

These requirements enable identification of offending subscribers, i.e., error detection, even though as with the conventional method, a secret can not be decrypted, i.e., error correction can not be performed when there is an offending subscriber. With the requirements (c) and (d), a sharing operation can be performed (fault tolerance for propriety is realized) even when there is an offending subscriber. However, detection of an offending subscriber is possible by switching to the requirement (c'). The processing is again performed after a warning is released, and a correct output can be obtained and fault tolerance for propriety can be realized.

In this embodiment, therefore, a verifiable secret sharing method is proposed that can identify a subscriber who performs an unauthorized act, even though shared secrets may not be decrypted when such a subscriber is present. Thus, it is possible to provide a verifiable secret sharing method that is positioned between the dialogue type method (1) and the cryptological method (2) described above, and that requires for an amount of calculation and an amount of communication that are within a practical order of magnitude.

Figure 1:
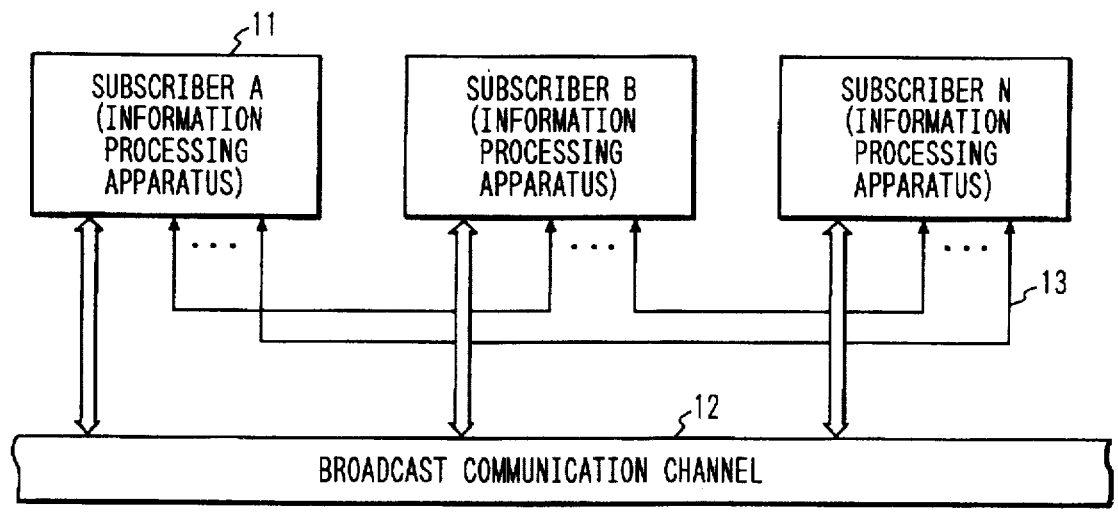
FIG. 1 is a block diagram illustrating the structure of a communication system according to one embodiment of the present invention.

FIG. 1 is a diagram illustrating an information processing system, according to one, embodiment of the present invention, that includes shared information processing apparatuses.

In FIG. 1, information processing apparatuses 11 are employed by subscribers of a system. In the following explanation, each apparatus and a subscriber that uses it are regarded as the same, and the apparatus 11 is called a subscriber. A broadcast communication channel 12 is used to open information to all the subscribers 11, and secret communication channels 13 are used for secret communication with each subscriber 11.

Figure 2:
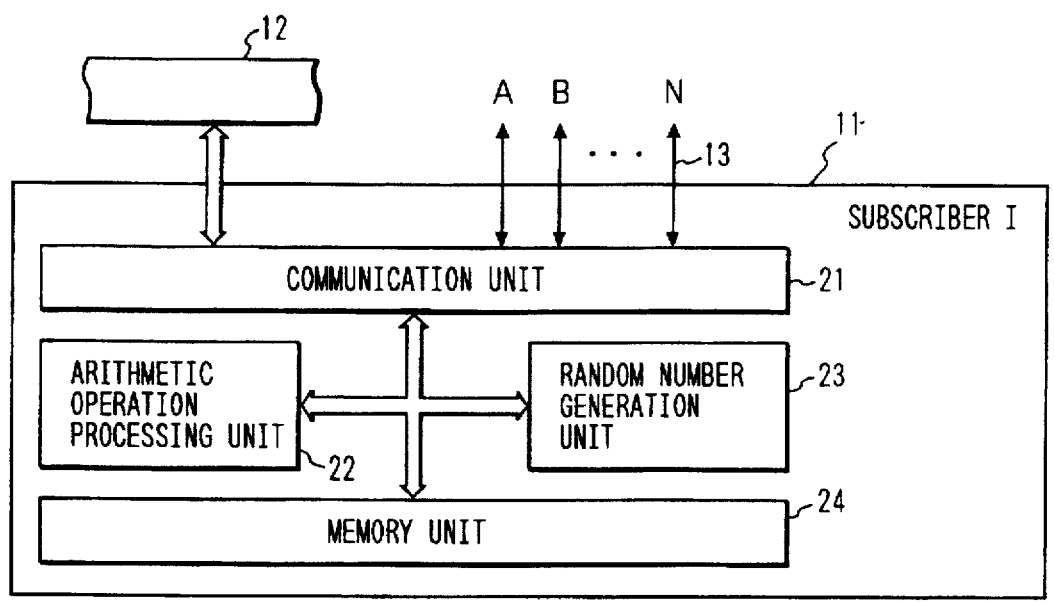
FIG. 2 is a block diagram illustrating the structure of an information processing apparatus that each subscriber uses.

FIG. 2 is a block diagram illustrating the structure of the information processing apparatus 11. In FIG. 2, a communication unit 21 is employed for communication with other apparatuses 11 across the broadcast communication channel 12 or the secret communication channels 13. An arithmetic operation processing unit 22 performs various arithmetic operations, such as the one-way hash function, and a decision process according to a program in a memory unit 24, and controls the individual sections. A random number generation unit 23 is, for example, a pseudo random number generator, and is employed to generate a random value. The memory unit 24 is employed to store a program that is to be executed by the arithmetic operation processing unit 22, information, such as arithmetic operation results that are generated during the processing, information that is received from the other apparatus, and various parameters.

A method for performing the verifiable sharing of a secret in a given finite set F will now be described specifically.

First, partial matrix X for secret s will be explained specifically.

In partial matrix $S=[s(i,j)]$ $(i,j=1, \ldots, n)$ for secret element s in a given finite set, elements of each row vector $S\_r(i)=[s(i,1), \ldots s(i,n)]$ $(i=1, \ldots, n)$ are values $fi(i1), \ldots , fi(in)$ for n different values, $i1, \ldots , in$, of polynomial fi to the $t^{th}$ power that has $sr(i)$ as a constant term. The elements of each column vector $S\_c(j)=[s(1,j), \ldots , s(n,j)]$ $(j=1, \ldots , n)$ are values $gj(j1), \ldots , gj(jn)$ for n different values, $j1, \ldots , jn$, of polynomial gj to the $t^{th}$ power that has $s\_c(j)$ as a constant term. Further, both vectors $[s\_r(1), \ldots , s\_r(n)]$ and $[s\_c(1), \ldots , s\_c(n)]$ are values $f(i1, \ldots , in)$ and $g(j1, \ldots , jn)$ of respective polynomials f and g to the $t^{th}$ power that have the secret element s as a constant term.

The processing for this embodiment will be explained while being classified as two processes: a secret sharing process, for distributing a secret in a given finite set to all the subscribers so that the secret is shared and held among the subscribers; and a secret decryption process, for decrypting a secret shared by all the subscribers or for identifying a subscriber that has performed an unauthorized act (if such a unauthorized act has occurred).

(1) Secret Sharing Process

Figure 5:
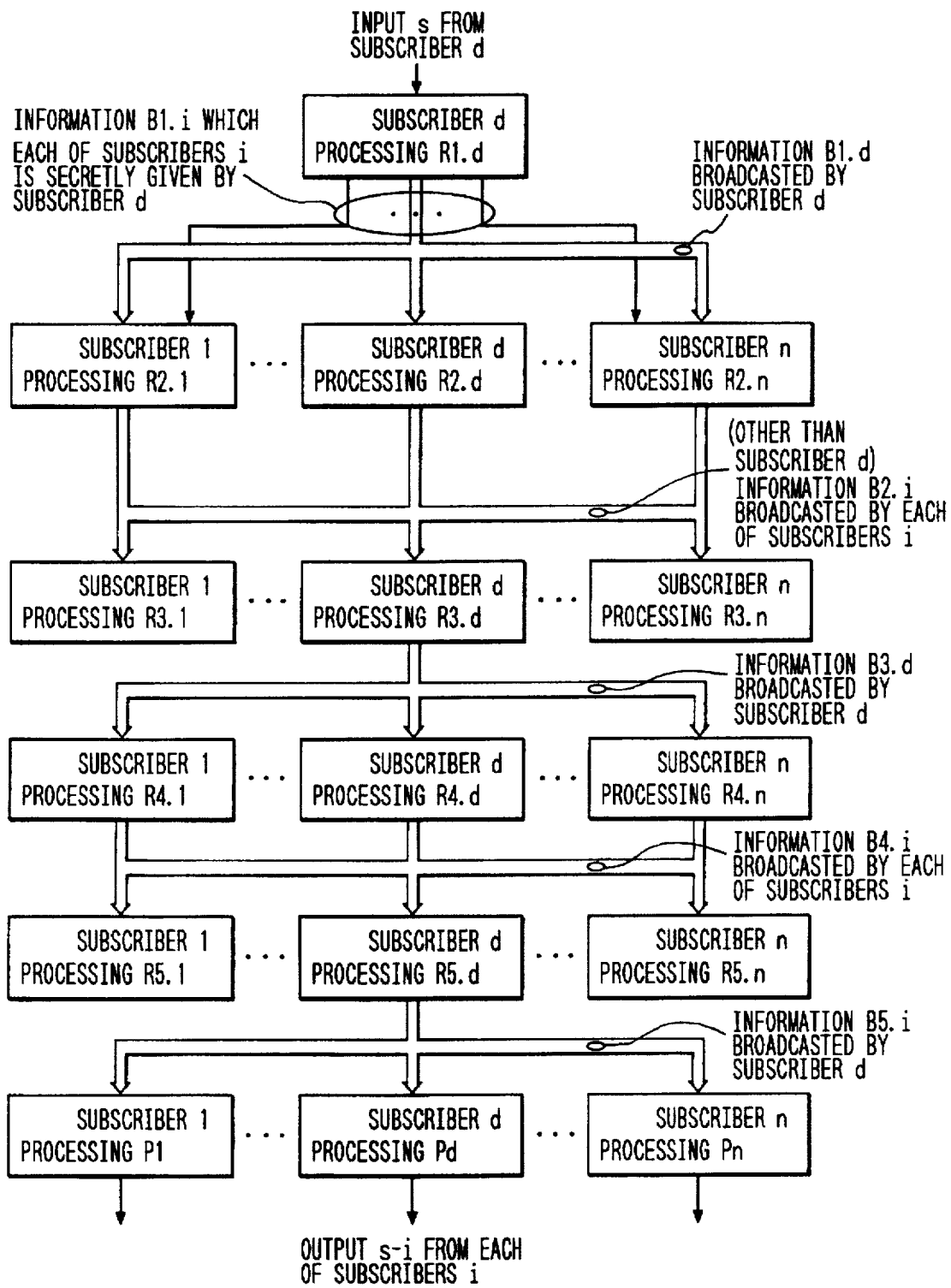
FIG. 5 is a diagram showing the procedures for secret sharing processing.

A secret sharing process is a process where a subscriber d that holds a secret element s distributes its secret portion. FIG. 5 is a diagram showing the procedures for this process. In FIG. 5, processing Rj,i is processing that is performed by a subscriber i in Round j.

Hereafter, h denotes the one-way hash function that is efficient (includes a high-speed calculation method). The hash function (see aforementioned "Modern Cryptological Theory") that is formed by a high-speed block encryption function is employed, for example. Safety parameter k satisfies k=nk' for a given constant k'. In this case, the probability that verification of the secret sharing processing will fail is $2^{(-k'(t+1))}$ according to Cut and Choose processing (see the aforementioned "Verifiable Secret Sharing And Multiparty Protocols With Honest Majority," T. Rabin and M. Ben-Or).

Figure 4:
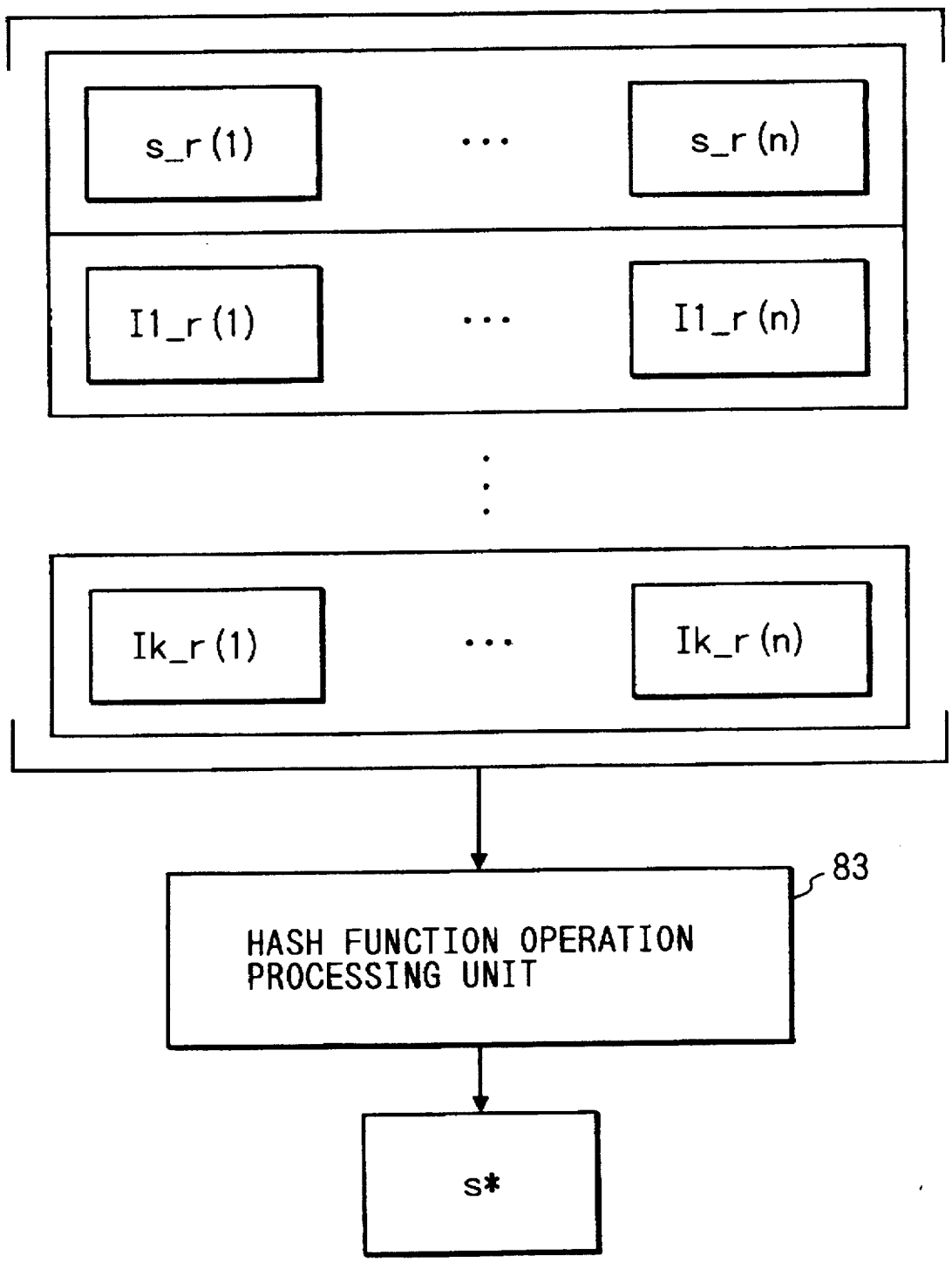
FIG. 4 is a diagram showing processing for a one-way hash function operation.

(Round 1) Subscriber d employs the random number generation unit 23 to generate partial matrixes S, L1, ..., Lk respectively for secret element s, and secret elements l1, ..., lk that are randomly selected in a given finite set. As is shown in FIG. 4, one-way hash function values s* for secret values s_r(1), ..., s_r(n), l1_r(1), ..., l1_r(n), ..., lk_r(1), ..., lk_r(n) are acquired by a hash function operation processing unit 83.

The subscriber d transmits the column vectors S_c(i), L1_c(i), ..., Lk_c(i) and secrets s_r(i), l1_r(i), ..., lk_r(i) (information B1.i) of each generated partial matrix across the secret communication channels 13 to each subscriber i (i–1, ..., n, excluding himself). And the hash values s* (information B1.d) are broadcast across the broadcast communication channel 12 to all the subscribers (processing R1.d).

(Round 2) Each subscriber i (i–1, ..., n) employs the random number generation unit 23 to broadcast k' bits (information B2.i) that are randomly selected (processing R2.i). The randomly selected k' bits are each called Bi_1, ..., Bi_k', and the bits to the total n subscribers are each called B1, ..., Bk.

(Round 3) If each bit Bj (j=1, ..., k) that is broadcast in Round 2 is 1, the subscriber d broadcasts the partial matrix Lj that is generated by the subscriber d in Round 1. If Bj is 0, the subscriber d broadcasts the result (written as S+Lj) obtained by adding each element of the generated partial matrixes S and Lj in the finite set (processing R3.d). The information that is broadcast by the subscriber d is represented as B3.d in FIG. 5.

(Round 4) For each value j (j=1, ..., k) of information B1.i that has been secretly received in Round 1, each subscriber i (i=1, ..., n) verifies whether or not column vector Lj_c(i) and Lj_r(i) (when bit Bj that is broadcast in Round 2 is 1), or Lj_c(i)+S_c(i) and lj_r(i)+s_r(i) (when Bj is 0) are equal to the column vector and the secret value of the partial matrix that is broadcast in Round 3. When they are not equal relative to a certain value j, a decision message (information B4.i) of the subscriber d is broadcast (processing R4.i).

(Round 5) When the decision message (information B4.i) is broadcast in Round 4, the subscriber d broadcasts information B1.j, which he has secretly transmitted in Round 1, to the individual subscribers that have broadcasted the decision message (processing R5.d).

(Post-processing) When the information that is broadcast in Round 5 is not correct, or when the number of the decision messages that are broadcast in Round 4 is greater than threshold value t, each subscriber i (i=1, ..., n) determines that the subscriber d has performed an unauthorized act (processing Pi).

The total information that each subscriber i has received in Round 1 through Round 5 is expressed as s_i.

(2) Secret Decryption Process

Figure 6:
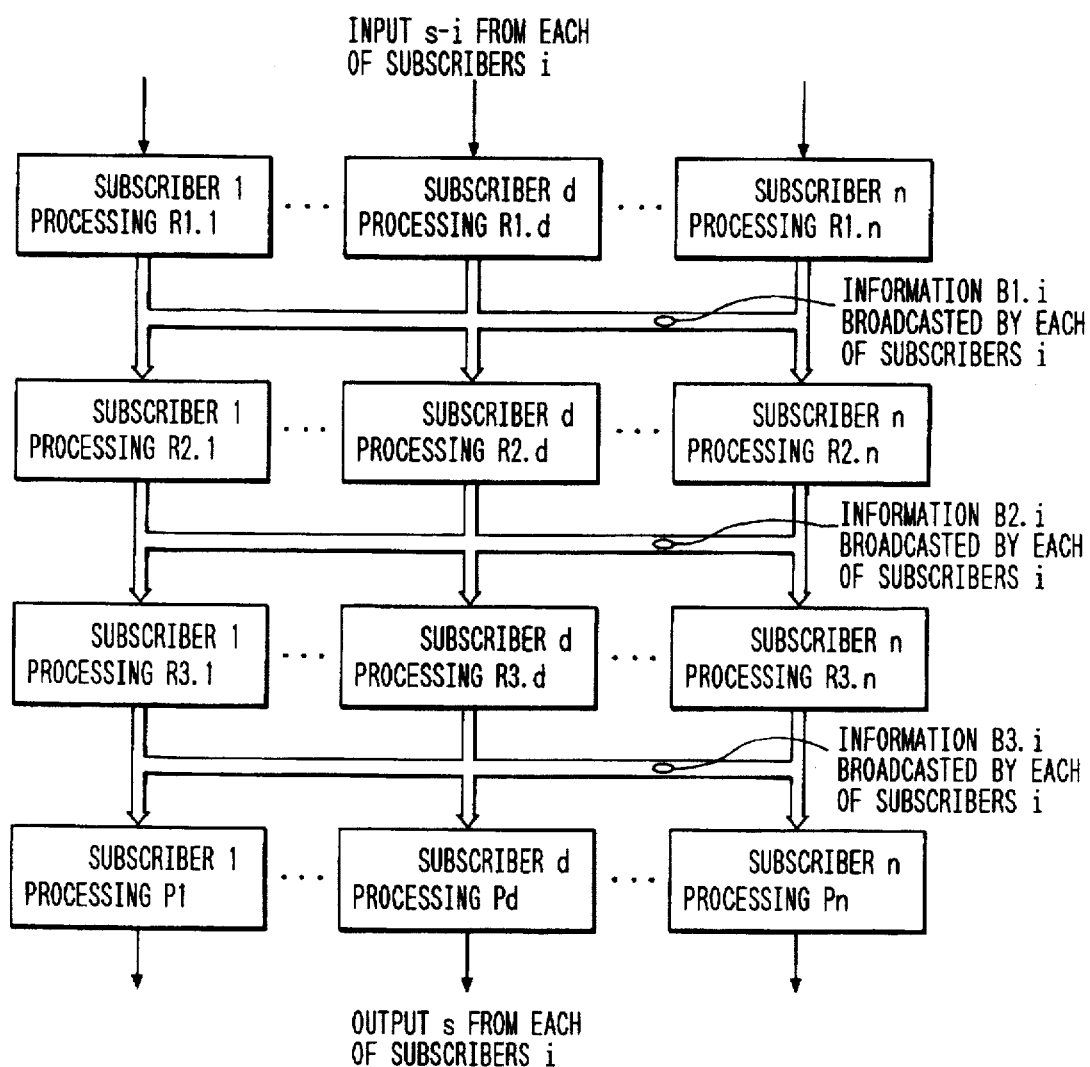
FIG. 6 is a diagram showing the procedures for secret decryption processing.

A secret decryption process is a process for acquiring the secret element s by all the subscribers, from information s_i that is held by the individual subscribers, through the above described secret sharing process. FIG. 6 is a diagram showing the procedures for this process.

(Round 1) Each subscriber i (i=1, ..., n) broadcasts secret values s_c(i) and s_r(i) that are included in the information segment s_i (processing R1.i).

(Round 2) Each subscriber i (i=1, ..., n) selects t+1 values s_c(i,1), ..., s_c(i, t+1) and s_r(i,1), ..., s_r(i, t+1) from the values that are broadcast in Round 1. Then, the results s(c) and s(r) are acquired by interpolation of polynomials. The subscriber i verifies whether or not the two results are equal and the remaining broadcast values are correct values for the polynomial that corresponds to the value s(c)=(r). When all the values are correct, it is determined that the secret element s equals s(c)=s(r), and the decryption process is terminated. When the values that do not correspond to the same polynomial are broadcast, the column.vector S_c(i) (information B2.i) that is included in the information segment s_i is broadcast (processing R2.i).

(Round 3) Each subscriber i (i=1, ..., n) generates partial matrix S' from the column vector S_c(j) (j=1, ..., n) that is broadcast in Round 2. Then, the subscriber i selects column vector sets, T1, ..., Tm relative to all the sets t1, ..., tm (m=$_n C_{T+1}$=n!/(t+1)!(n–t–1)!) sets in total that include t+1 different values that consist of 1, ..., n. The results s'_r(1), ..., s'_r(n) and s'_c(1), ..., s'_c(n) are acquired for the respective rows and columns by interpolation of polynomials. Further, the results s'(r) and s'(c) are acquired by the interpolation of polynomials for the above values. The subscriber i verifies whether or not the two of these results are equal and all the elements of these column vectors are correct values for the polynomial that corresponds to the values s'_c(1), ..., s'_c(n) and s'_r(1), ..., s'_r(n).

Among the sets T1, ..., Tm that include t+1 column vectors thus verified, the number of sets that correspond to different correct partial matrixes is t+1 at the maximum, and the partial matrixes are called S_1, ..., S_T (wherein T<t+1). When there is only one correct partial matrix (T=1), it is determined that the secret s for that matrix is equal to the original secret, and a non-corresponding column vector represents a subscriber that performed an unauthorized act. When there are two or more correct partial matrixes, each subscriber i (i=1, ..., n) broadcasts all the information segments (information B3.i) that he is holding (processing R3.i).

(Post processing) Each subscriber i (i=1, ..., n) employs the information s_3 (j=1, ..., n) that is broadcast in Round 3 to calculate the same one-way hash function as is employed in the above secret sharing process. Then, the subscriber i verifies whether or not all the broadcast information is correct and corresponds to the value s* that is broadcast in Round 1 in the sharing process. It is thus determined that the secret s' that corresponds to a correct partial matrix (there can be only one at the maximum) is equal to the secret element s. On the other hand, when no correct partial matrix is found, it is determined that the secret sharing subscriber d has performed an unauthorized act (processing Pi).

As is described above, according to the embodiment, an amount of communication on the order of n^2k (wherein n is the number of subscribers and k is a safety parameter) is required, while an amount of communication on the order of n^3k^2 is required for the conventional dialogue type method (1) described above. Further, only a one time calculation of the one-way hash function is required in this embodiment, while calculations on the order of n of a specific one-way function is required for the conventional non-dialogue type method (2). Thus, a method by which the amount of communication and the amount of calculation are practical compared with those required for the conventional method can be provided.

19

[Embodiment 2]

The verifiable secret sharing process and the secret decryption process, as in Embodiment 1, are employed as partial processing for a conventional safe shared computation method (see, for example, "Secure Multiparty Protocols And Zero-Knowledge Proof Systems Tolerating A Faulty Minority", D. Beaver, Journal Of Cryptology, 1991, or "A Note On Multiparty Protocols To Compute Multiplicative Inverses", M. Cerecedo, T. Matsumoto, and H. Imai, SCIS '94, Biwako, Japan, January 1994), so that a more efficient shared operation processing system can be provided.

In the sharing operation system, a sharing and multiplication process and a sharing and addition process are employed for fundamental partial processing, and a partial addition process is used as partial processing for a partial multiplication process. The general arithmetic operation in a given finite set can be also performed by using both the sharing and multiplication process and the sharing and addition process. The sharing and addition process, which is the fundamental partial processing for all the processes, will be explained while referring to FIG. 7 for a case where the operation is performed by using the processing in Embodiment 1.

When two secret elements x and y in a given finite set are shared (at this time, each subscriber i holds secret portions x_i and y_i that correspond to the secret elements x and y, respectively), communication is not performed, and secret portion (x+y)_i that corresponds to sum x+y in the given finite set is calculated as follows.

First, the elements of the column vectors X_c(i) and Y_c(i) and the elements of secret values x_r(i) and y_r(i) (see Embodiment 1) of the partial matrix that each subscriber holds are added. It is apparent from the definition of a partial matrix (the elements of the rows and columns are values of a polynomial) that the addition results X_c(i)+Y_c(i) and x_r(i)+y_r(i) are a column vector and a secret value for a partial matrix relative to x+y.

The one-way hash function values x* and y*, which are employed to verify an information segment in the secret decryption process, are stored. These values are used as needed when the decryption process is performed on the addition result x+y, and thus partial matrix X+Y that corresponds to the secret x+y is verified.

A general shared arithmetic operation system can be provided by employing the above described sharing and addition process as partial processing.

The present invention is not limited to the number of dimensions of the partial matrix described in the above embodiment, and may be a multiple dimensional partial array. Further, a function employed may be a function, other than a one-way hash function, that ensures the acquisition of the one way characteristic. As for the Cut and Choose technique, it is not limited to the procedures specifically explained in Embodiment 1, but may involve the use of any method for verifying propriety without leaking the secret.

As is described above, according to this embodiment, a method and a system for processing secret information, where a subscriber who performs an unauthorized act can be identified (an error can be detected) can be provided by an efficient amount of communication and an efficient amount of calculation.

In addition, since the amount of communication and calculation can be smaller than those required for the conventional case, for a process, such as a safe sharing operation process, which requires repetitive performance of a secret sharing process, the traffic within a communication system can be reduced, and the communication costs can be decreased because of the small amount of communication, while the processing is performed at high speed because of the small amount of calculation.

A method for digital signature shared generation performed by a plurality of subscribers that belong to a group of signers will be described by employing the above described secret sharing method.

In this embodiment, the above described verifiable secret sharing method is employed. The subscribers that belong to a group of signers share a secret element that is randomly selected from among all of them in the group, and employ the shared secret as an input to generate a signature during the processing for the decrypting of the shared output, which is obtained by the execution of the shared arithmetic operation.

In this embodiment, therefore, a shared digital signature system can be provided, with which a subscriber who performs an unauthorized act can be identified and both the amount of calculation and the amount of communication are of a practical order of magnitude.

FIG. 9 is a diagram showing a communication system for this embodiment.

In FIG. 9, the information processing apparatus 11 that subscribers in the system use, the broadcast communication channel 12, and the secret communication channels 13 are the same as those in FIG. 1. Here, subscribers A, B, and C consist of a group of signers. The block structure of the information processing apparatus 11 is as shown in FIG. 2.

With this arrangement, the method for realizing a shared digital signature will be specifically explained.

[Embodiment 3]

In this embodiment, a specific structure for realizing a shared digital signature method, which employs the above described digital signature method that is proposed by C. P. Schnorr, will now be described.

First, secret element s from among $\{1, \ldots, p-1\}$ is shared by the above described verifiable secret sharing method. The secret elements $l1, \ldots, lk$ are selected at random from $\{1, \ldots, p-1\}$. In this manner, processing can be carried out where the secret element that a certain subscriber of a group of signers holds is shared and is held by all the subscribers of the group.

An explanation will now be given of a process, for a shared digital signature system, for employing the secret sharing method to generate secret information (which is the equivalent of a secret key that is shared by all the subscribers in a group of signers) of the group and public information that corresponds to the secret information (public information that is equivalent to a public key and that is employed for verifying a generated signature).

Figure 10A:
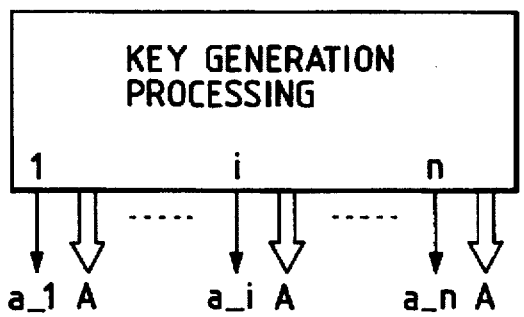
FIGS. 10A and 10B are diagrams for explaining the procedures for secret-key and public-key generation processing.
Figure 10B:
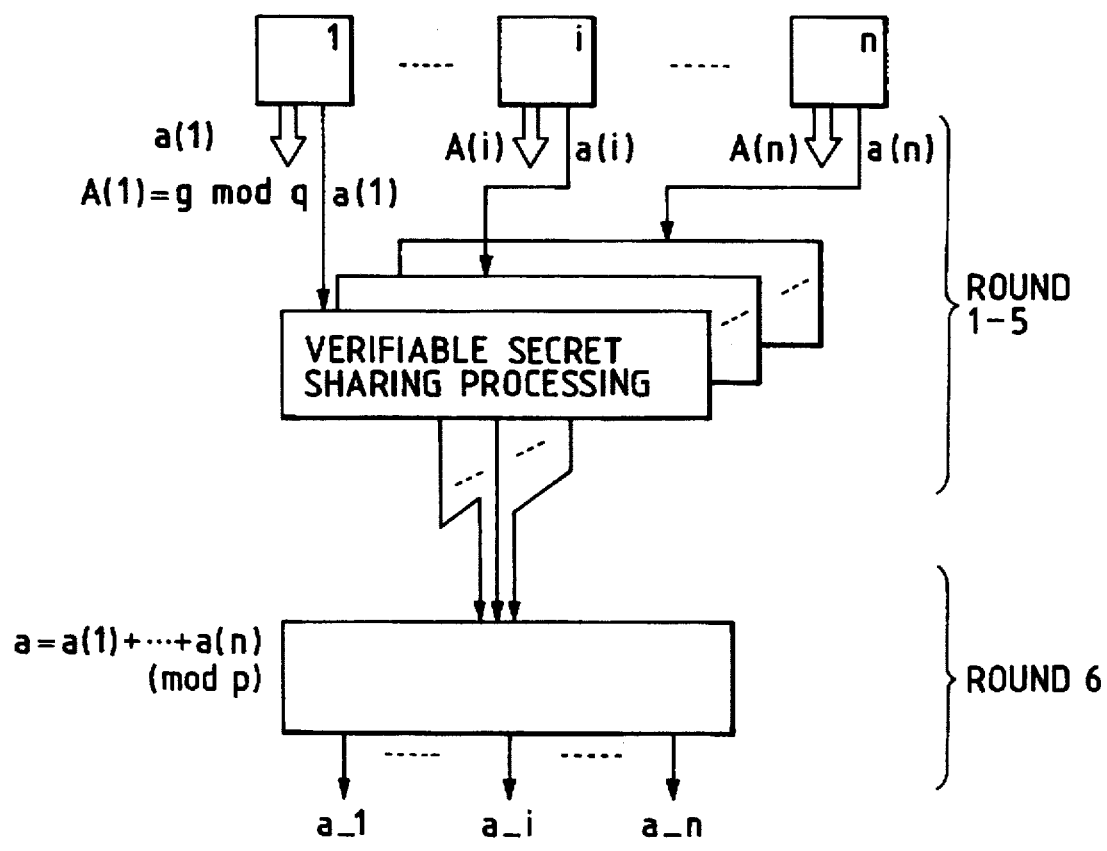

Key generation processing (see FIGS. 10A and 10B)

(Rounds 1 through 5) Each subscriber i selects secret element a(i) at random from $\{1, \ldots, p-1\}$, and is shared among all the subscribers of the group of signers by performing the above described secret sharing process. Further, each subscriber i calculates $G^\wedge(r(i))$ mod q (wherein q is a prime number selected in the above described manner), and broadcasts it across the broadcast communication channel.

(Round 6) The post processing of the secret sharing process is performed. By employing the correctly shared secret element $r(i)$ ($i=1, \ldots, n$) as an input, a shared output that is acquired by shared addition, which is explained by referring to FIG. 7, is defined as secret information a. Further, value $A(i)=G^\wedge(a(i))$ mod q, which is broadcast in Rounds 1 through 5 of the pre-processing relative to the correctly shared secret element a(i), is multiplied. The acquired result $A=g^a \mod q$ is employed as public information (public key) for verifying a signature generated by the group.

In order to perform shared multiplication of one shared secret element x and public element a in the same manner as shared addition, the results acquired by multiplying a by each element of the partial matrix that the subscriber holds are elemehts of the partial matrix relative to x*a.

Figure 11:
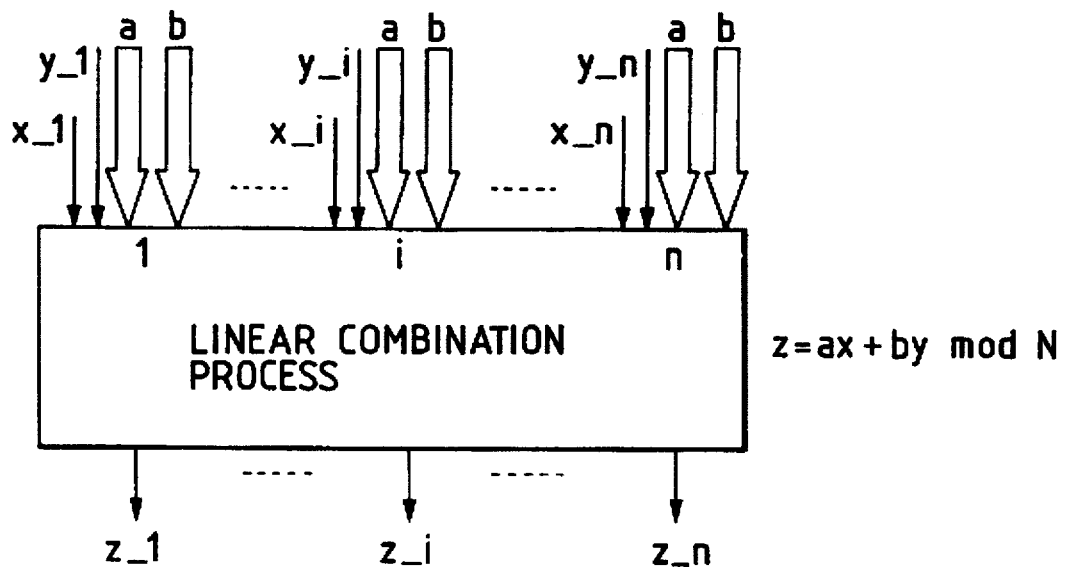
FIG. 11 is a diagram for explaining the input and output relationship for shared secret linear combination processing.

Therefore, shared calculation of linear combination $a*x+b*y$ of two shared secret elements x and y and the public element a can be performed without requiring a dialogue between the subscribers of the group. The linear combination processing is shown in FIG. 11. It should be noted that in FIG. 11, the title of the processing to be performed and the input and output for each subscriber for this processing are shown. The inputs of the subscriber i (i=1, . . . , n) are information segments x_i and y_i relative to the shared secret elements x and y, and public elements a and b. The output is information segment z_i relative to the result x of the linear combination processing.

Figure 12:
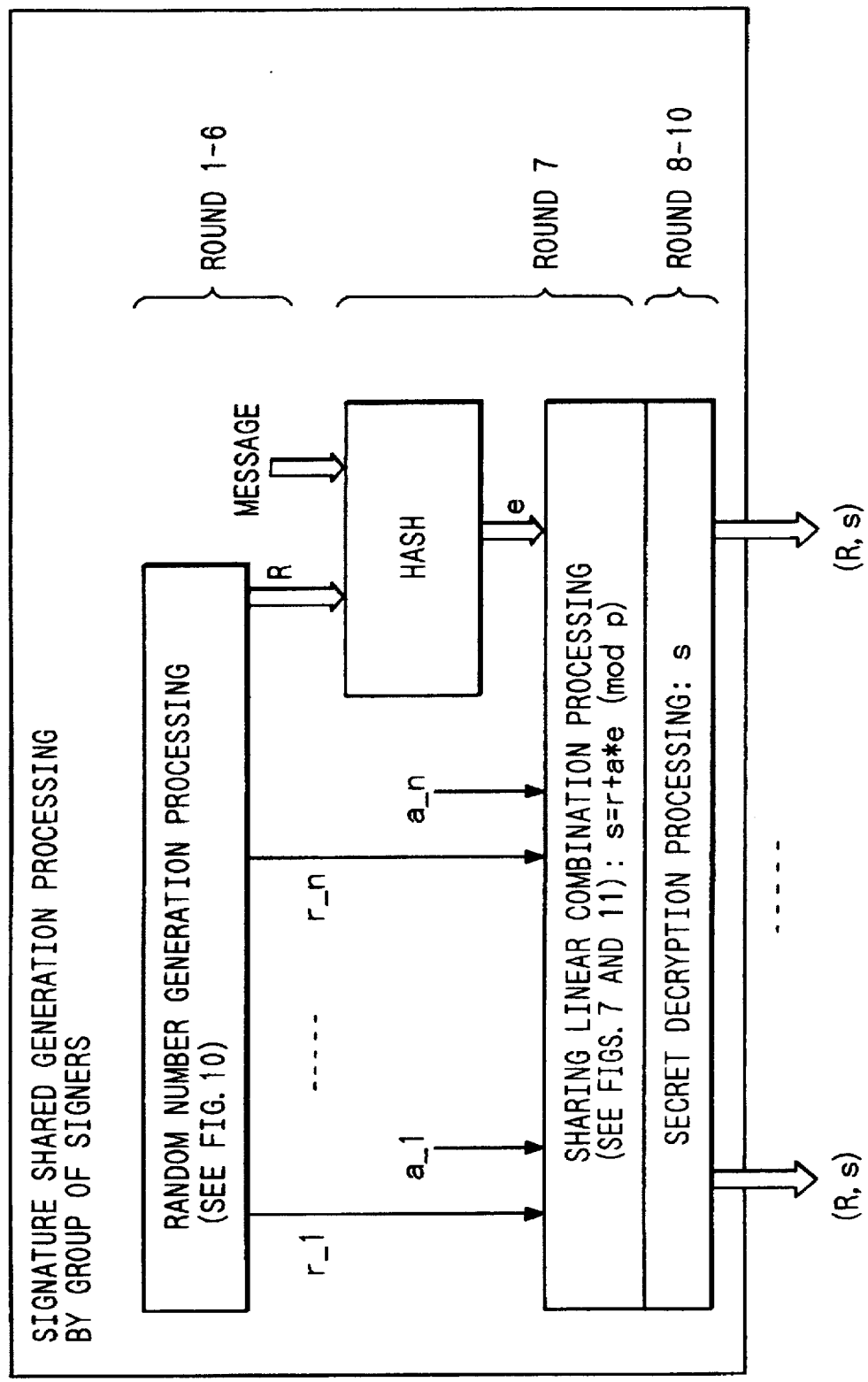
FIG. 12 is a diagram for explaining the procedures for shared signature generation processing.

By using a secret key that is obtained through the above processing, a digital signa. ture of given message m is generated by the group while being shared as follows.
Signature generation processing (see FIG. 12)

(Rounds 1 through 5) Each subscriber i selects secret element r(i) at random from {1, . . . , p–1}, and the selection is shared with all the subscribers of the group of signers by performing the above described secret sharing process. Further, each subscriber i calculates $g^{(r(i))} \mod q$ (wherein q is a prime number selected in the above described manner), and broadcasts it across the broadcast communication channel.

(Round 6) The post processing of the secret sharing process is performed. With the correctly shared secret element r(i) (i=1, . . . , n) as an input, shared result r is acquired by performing the shared addition. Further, $R=g^r \mod q$, which is the multiplication of value $R(i)=g^{r(i)} \mod q$ that is broadcast in Rounds 1 through 5 relative to the correctly shared secret element r(i), is calculated.

(Round 7) Each subscriber employs, as an input, a value R|m obtained by combining a given message m and value R that is acquired in Round 6, and calculates output $e=h(R|m)$ of the predetermined function h described above. Then, $s=r+h(R|m)*a$ is shared and calculated among all the subscribers of the group of signers by performing the shared linear combination processing.

(Rounds 8 through 10) The shared secret s is decrypted by the secret decryption processing for the secret sharing method. A signature for the given message is defined as (R, s). The generated signature is verified by using the public key a and by performing the signature verification processing for the digital signature method. When the signature is not correct, it is determined that there is a subscriber who has performed an unauthorized act. The secret decryption process of the secret sharing method is performed to identify such a subscriber.

[Embodiment 4]

A specific structure for realizing a shared digital signature method, which employs the previously described digital signature method that is proposed by A. Fiat and A. Schamir, will now be described. First, a specific arrangement for verifiably sharing a secret element in {1, . . . , N–1}.

A partial matrix for a given secret s will be specifically explained (see FIG. 3). Partial matrix S=[s(i,j)] (i,j=1, . . . , n) relative to a certain secret s from among {1, . . . , N–1} is the one where the elements of each row vector (S_r(i)= [s(i,1), . . . , s(i,n)], i=1, . . . , n) are defined as follows:

$$s(i,j)=s\_r(i)*q\_r(i,1)^{(j)}*q\_r(i,2)^{(j^2)} \ldots *q\_r(i,t)^{(j^t)} \mod N$$
$(j=1, \ldots, n).$ The elements q_r(i,1), . . . , q_r(i,t) are selected from {1, . . . , N–1} so as to satisfy the following requirements. The elements of each column vector (S_c(j)=[s(1,j), . . . , s(n,j)], j=1, . . . , n) are defined as follows:

$$s(i,j)=s\_c(j)*q\_c(j,1)^{(k)}*q\_c(j,2)^{(i^2)} \ldots *q\_c(j,t)^{(i^t)} \mod N$$
$(i=1, \ldots, n).$ The elements q_c(j,1), . . . , q_c(j,t) are selected from {1, . . . , N–1} so as to satisfy the following requirements. In addition, both vectors [s_r(1) . . . . . s_r(n)] and (s_c(1), . . . , s_c(n)] that have the above values satisfy the following requirements for q_r(1), . . . , q_r(t), q_c(1), . . . , q_c(t), which are from among {1, . . . , N–1}:

$$s\_r(j)=s*q\_r(1)^{(j)}*q\_r(2)^{(j^2)} \ldots *q\_r(t)^{(j^t)} \mod N \; (j=1, \ldots, n),$$

and $$s\_c(i)=s*q\_c(1)^{(i)}*q\_c(2)^{(i^2)} \ldots *q\_c(t)^{(i^t)} \mod N \; (i=1, \ldots, n),$$

where s denotes an original secret.

The secret sharing process for distributing a secret portion so that the secret element s can be shared and held by all the subscribers who belong to a group of signers, and the secret decryption process for decrypting the thus shared secret or for identifying a subscriber who performs an authorized act (if such an act occurs) are performed in the same manner as the processes (1) and (2) in Embodiment 1 are performed. In the secret decryption process (2), instead of polynomial interpolation, the following is calculated to acquire value s_r(i) from t+1 elements (s(i,j0), . . . , s(i,jt)), which is included in each row vector (S_r(i)=[s(i,1), . . . , s(i,n)], i=1, . . . , n):

$$s\_r(i)^{(n!)}=Prod\_k(s(i,jk)^{(Prod\_1(1*n!/(1-k))))} \mod N$$

wherein Prod_k(f(k)) denotes multiplication of value f(k) for k=j0, . . . , jt, and Prod_1(g(1)) denotes multiplication of value g(1) to 1=j0, . . . , jt (1 ≠k).

Likewise, to acquire value s_c(j) from t+1 elements (s(i0,j), . . . , s(it,j)) in each column vector (S_c(i)=[s(1,j), . . . , s(n,j)], j=1, . . . , n), the following calculation is performed.

$$s\_c(j)^{(n!)}=Prod\_k(s(ik, j)^{(Prod\_1(1*n!/(1-k))))} \mod N$$

To acquire the secret s from t+1 elements (s_r(i0)^(n!), . . . , s_r(it)^(n!)) or (s_c(j0)^(n!), . . . , s_c(jt)^(n!)) of the partial vector [s_r(1)^(n!), . . . , s_r(n)^(n!)] or [s_c(1)^(n!), . . . , s_c(n)^(n!)], the following calculation is performed (when s r(i)^(n!)).

$$s^{(n!*n!)}=Prod\_k(s\_r(k)^{(n!*Prod\_1(1*n!/(1-k))))} \mod N$$

$$s=(s^{(n!*n!)})^u*(s^{11})^v \mod N.$$

It should be noted, however, that 1, which is employed for the digital signature method proposed by A. Fiat and A. Shamir, is selected so that u and v that satisfy $u*n!*n!+v*1=1$ are present. Value $s^1 \mod N$ for the shared secret s is calculated in signature generation processing which will be described later.

In this manner, processing can be provided where the secret element that a certain subscriber in the group of signers holds can be shared and held by all the subscribers in the group. Next, an explanation will be given of processing, of a shared digital signature system, for employing this secret sharing method to generate secret information for a group of signers (which is equivalent to a secret key and which is shared by all the subscribers of the group) and public information for the secret information (which is equivalent to a public key and which is employed for verifying a signature that is generated by the group).

Figure 13A:
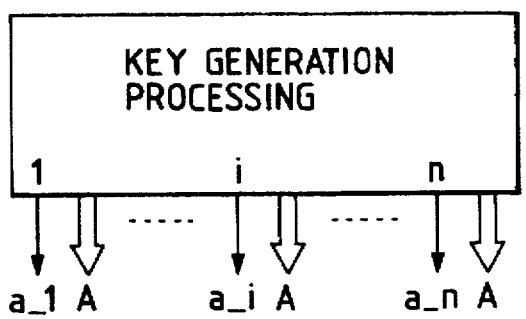
FIGS. 13A and 13B are diagrams for explaining the procedures for secret-key and public-key generation processing.
Figure 13B:
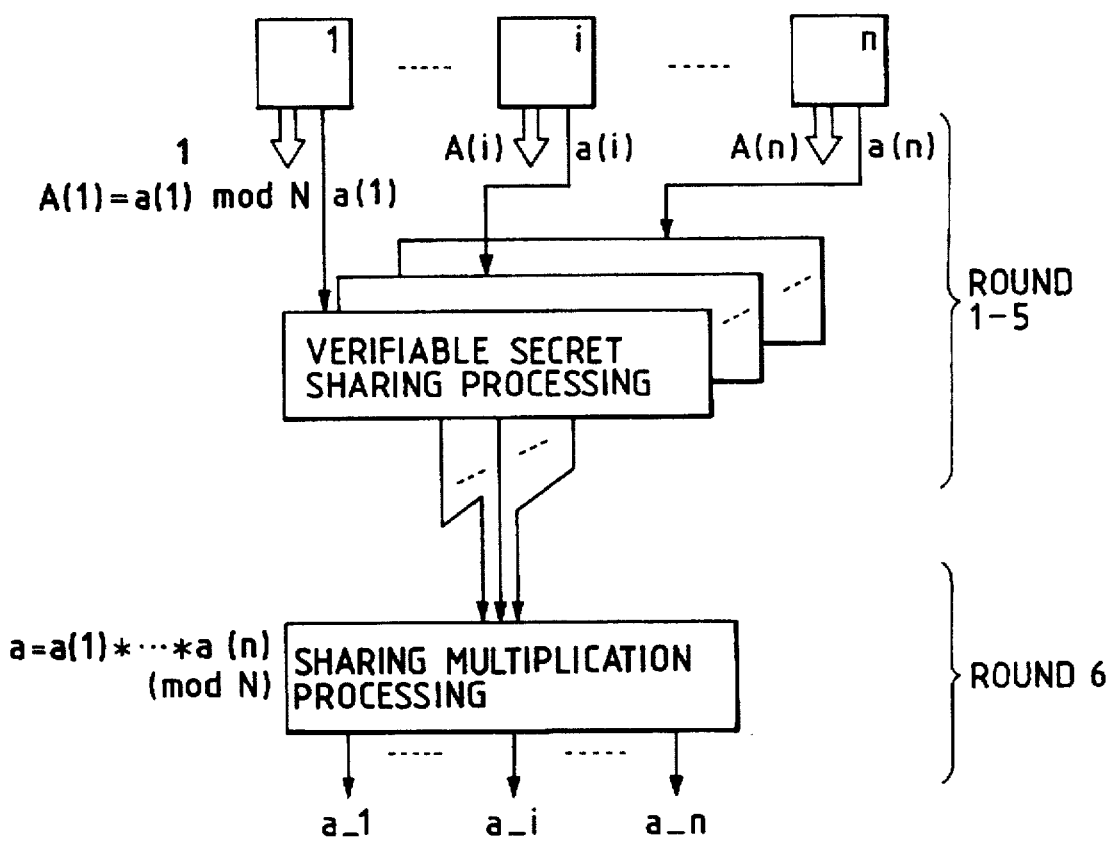

Key generation processing (see FIGS. 13A and 13B)

(Rounds 1 through 5) Each subscriber i selects secret element $a(i)$ at random from $\{1, \ldots, N-1\}$, and the selection is shared with all the subscribers of the group of signers by performing the above described secret sharing process. Further, each subscriber i calculates $a(i)^{\wedge}1 \bmod N$ (wherein 1 is an element selected in the above described manner), and broadcasts it across the broadcast communication channel.

(Round 6) The post processing of the secret sharing process is performed. By employing the correctly shared secret element $a(i)$ ($i=1, \ldots, n$) as an input, a shared output that is acquired by the following shared multiplication is defined as secret information a. Further, value $A(i)=a(i)^{\wedge}1 \bmod N$, which is broadcast in Rounds 1 through 5 of the pre-processing relative to the correctly shared secret element $a(i)$, is multiplied. The acquired result $A=a^{\wedge}1 \bmod N$ is employed as public information (public key) for verifying a signature generated by the group.

Figure 14:
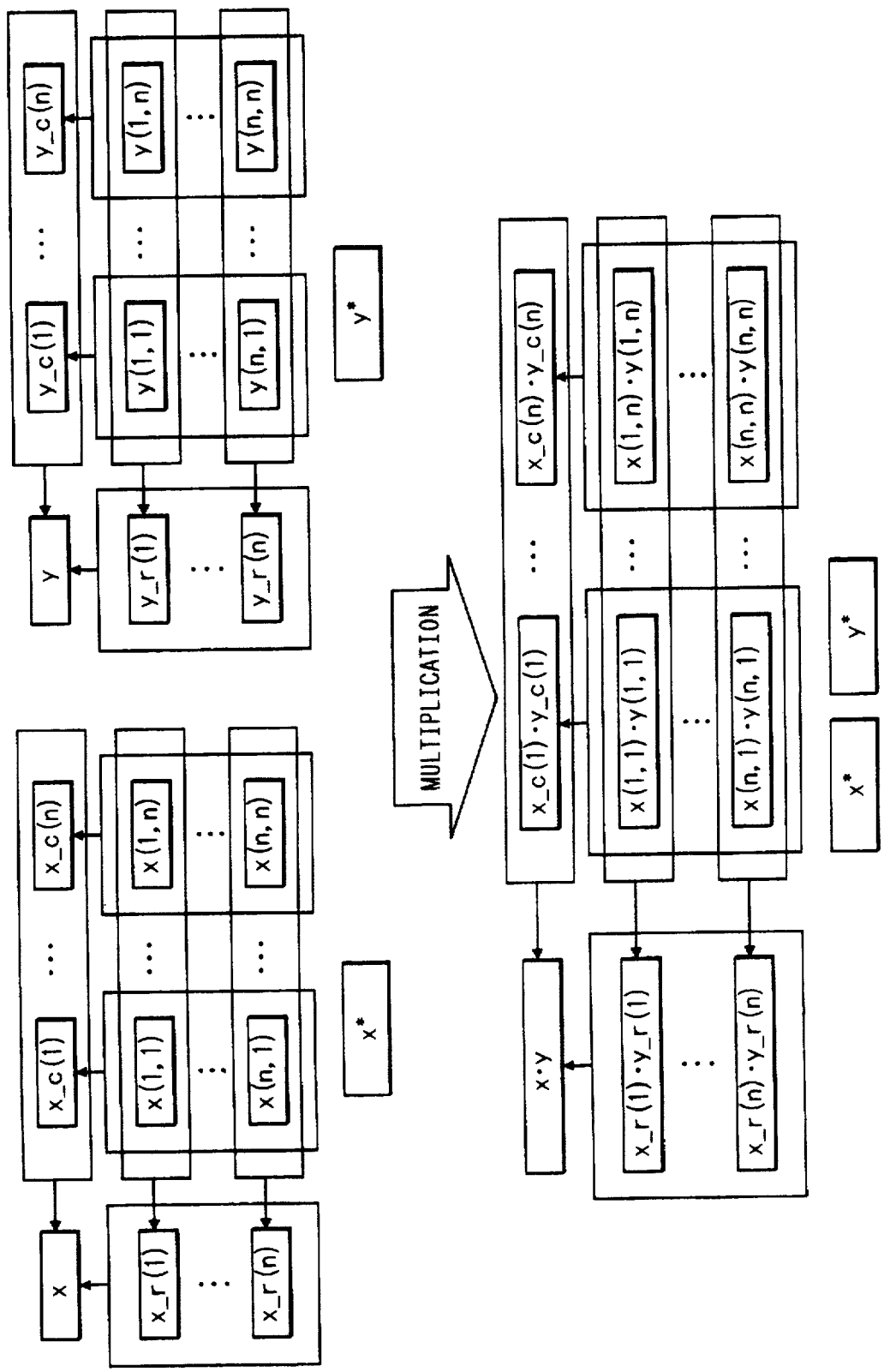
FIG. 14 is a diagram for explaining secret shared multiplication processing.

The shared multiplication processing employed in Round 6 will be explained while referring to FIG. 14.

When two secret elements x and y in $\{1, \ldots, N-1\}$ are shared by the secret sharing process (each subscriber i holds secret portions $x\_i$ and $y\_i$ relating to the secret elements x and y), communication is not performed, and the secret portion $(x^*y)\_i$ for product $x^*y$ that is included in $\{1, \ldots, N-1\}$ is calculated as follows.

It is apparent from the definition of a partial matrix that the results $X\_c(i)^*Y\_c(i)$ and $x\_r(i)^*y\_r(i)$, which are obtained by multiplication of the column vectors $X\_c(i)$ and $Y\_c(i)$ and the secret values $x\_r(i)$ and $y\_r(i)$ of the partial matrix that each subscriber holds, are a column vector and a secret value of the partial matrix for $x^*y$. Both of the one-way hash function values $x^*$ and $y^*$, which are employed for verification of information segments in the secret decryption process, are stored. In the decryption process for the multiplication result $x^*y$, both of them are employed as needed to verify partial matrix $X^*Y$ that is consonant with the secret $x^*y$.

Figure 15:
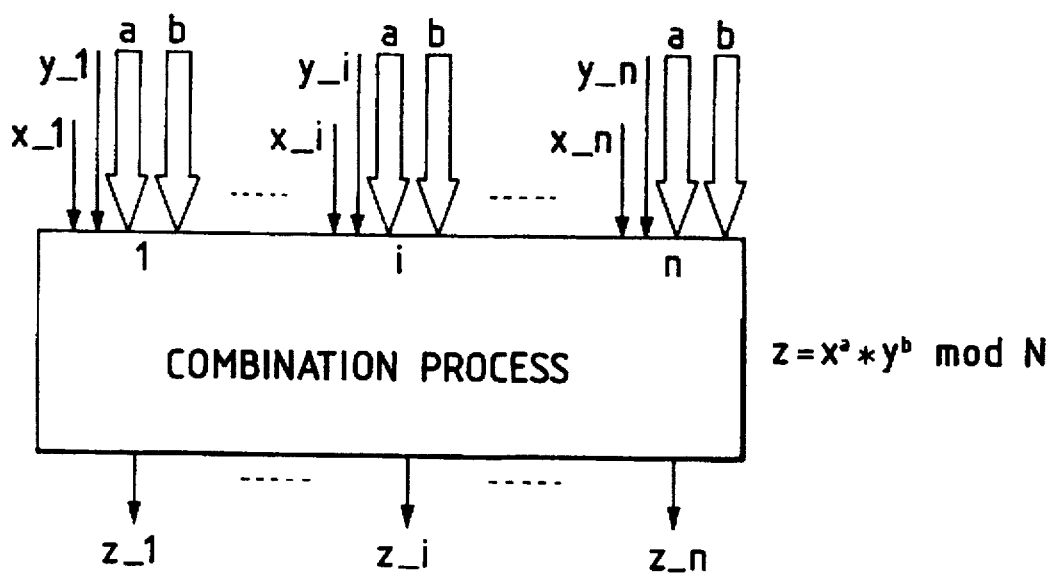
FIG. 15 is a diagram for explaining the input and output relationship for shared secret linear combination processing.

Likewise, since the exponential multiplication of one shared secret element x and the public element a is shared, the results obtained by exponential multiplication of the elements of the partial matrix, which each subscriber has, and the public element a are the elements of a partial matrix for $x^{\wedge}a$. Thus, combination $x^{\wedge}a^*y^{\wedge}b$ of the two secret elements x and y, which are shared in the above process, and the public elements ab can be shared and calculated without requiring a dialogue among the subscribers who join the group. This processing is shown in FIG. 15 as it is in FIG. 11.

A secret key that is obtained through the above processing is employed by the group to generate a shared digital signature for a given message m as follows.

Figure 16:
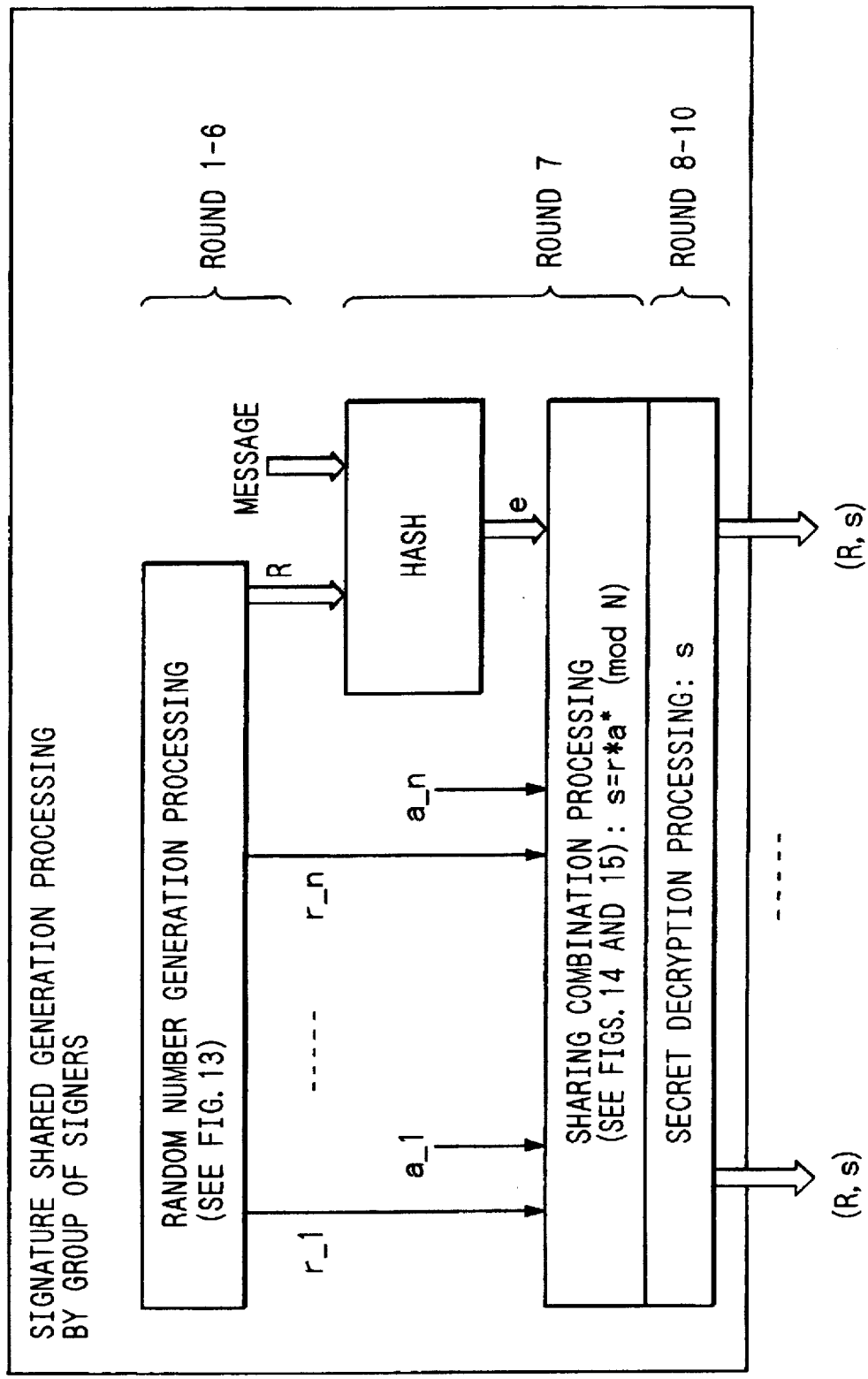
FIG. 16 is a diagram for explaining the procedures for shared signature generation processing.

Signature generation processing (see FIG. 16)

(Rounds 1 through 5) Each subscriber i selects secret element $r(i)$ at random from $\{1, \ldots, N-1\}$, and the selection is shared with all the subscribers of the group of signers by performing the above described secret sharing process. Further, each subscriber i calculates $r(i)^{\wedge}1 \bmod N$ (wherein 1 is an element selected in the above described manner), and broadcasts it across the broadcast communication channel.

(Round 6) The post processing of the secret sharing process is performed. With the correctly shared secret element $r(i)$ ($i=1, \ldots, n$) as an input, shared result r is acquired by performing the previously described shared multiplication. Further, $R=r^{\wedge}1 \bmod N$, which is the multiplication of value $R(i)=r(i)^{\wedge}1 \bmod n$ that is broadcast in Rounds 1 through 5 relative to the correctly shared secret element $r(i)$, is calculated.

(Round 7) Each subscriber employs, as an input, a value R|m that is obtained by combining a given message m and value R that are acquired in Round 6, and calculates output $e=h(R|m)$ of the predetermined function h described above. Then, $s=r^*a^{\wedge}(h(R|m))$ is shared and calculated among all the subscribers of the group of signers by performing the shared linear combination processing.

(Rounds 8 through 10) The shared secret s is decrypted by the secret decryption processing for the secret sharing method. A signature for the given message is defined as (R, s). The generated signature is verified by using the public key a and by performing the signature verification processing for the digital signature method. When the signature is not correct, it is determined that there is a subscriber who has performed an unauthorized act. The secret decryption process of the secret sharing method is performed to identify such a subscriber.

[Embodiment 5]

In this embodiment, a specific structure that realizes a shared digital signature method, which employs the digital signature method that is proposed by T. ElGamal (American National Standard, Digital Signature Algorithm), will be described.

The method as stated in Embodiment 1 is used as a specific method for sharing a secret element that is selected by a certain subscriber in a group of signers and for holding it by all the subscribers of the group. An explanation will now be given of a process, of a shared digital signature system, for employing the secret sharing method to generate secret information (which is the equivalent of a secret key that is shared by all the subscribers of a group of signers) of the group and public information for the secret information (public information that is equivalent to a public key and that is employed for verifying a generated signature).

Key generation processing (see FIGS. 10A and 10B)

(Rounds 1 through 5) Each subscriber i selects secret element $a(i)$ at random from $\{1, \ldots, p-1\}$, and the selection is shared with all the subscribers of the group of signers by performing the above described secret sharing process. Further, each subscriber i calculates $g^{\wedge}(a(i)) \bmod q$ (wherein q is a prime number that is selected in the above described manner), and broadcasts it across the broadcast communication channel.

(Round 6) The post processing of the secret sharing process is performed. By employing the correctly shared secret element $a(i)$ ($i=1, \ldots, n$) as an input, a shared output that is acquired by the following shared addition is defined as secret information a. Further, value $A(i)=g^{\wedge}(a(i)) \bmod q$, which is broadcast in Rounds 1 through 5 of the pre-processing relative to the correctly shared secret element $a(i)$, is multiplied. The acquired result $A=g^{\wedge}a \bmod q$ is employed as public information (public key) for verifying a signature generated by the group.

When two secret elements x and y in $\{1, \ldots, p-1\}$ are shared by the secret sharing process (each subscriber i holds secret portions x_i and y_i relating to the secret elements x and y), communication is not performed, and the secret portion (x+y)_i for sum x+y that is included in {1, ..., p−1} is calculated in the same manner as is described in Embodiment 1.

When two secret elements x and y in {1, ..., p−1} are shared by the secret sharing process (each subscriber i holds secret portions x_i and y_i relating to the secret elements x and y), communication is not performed, and the secret portion (x*y)_i for product x*y that is included in {1, ..., p−1} is calculated as follows.

While a specific subscriber d performs verifiable sharing of the secret s in {1, ..., p−1}, he safely calculates shared product s*x of the secret s and the previously shared x. This process is called a verifiable secret sharing and multiplication process.

Figure 17:
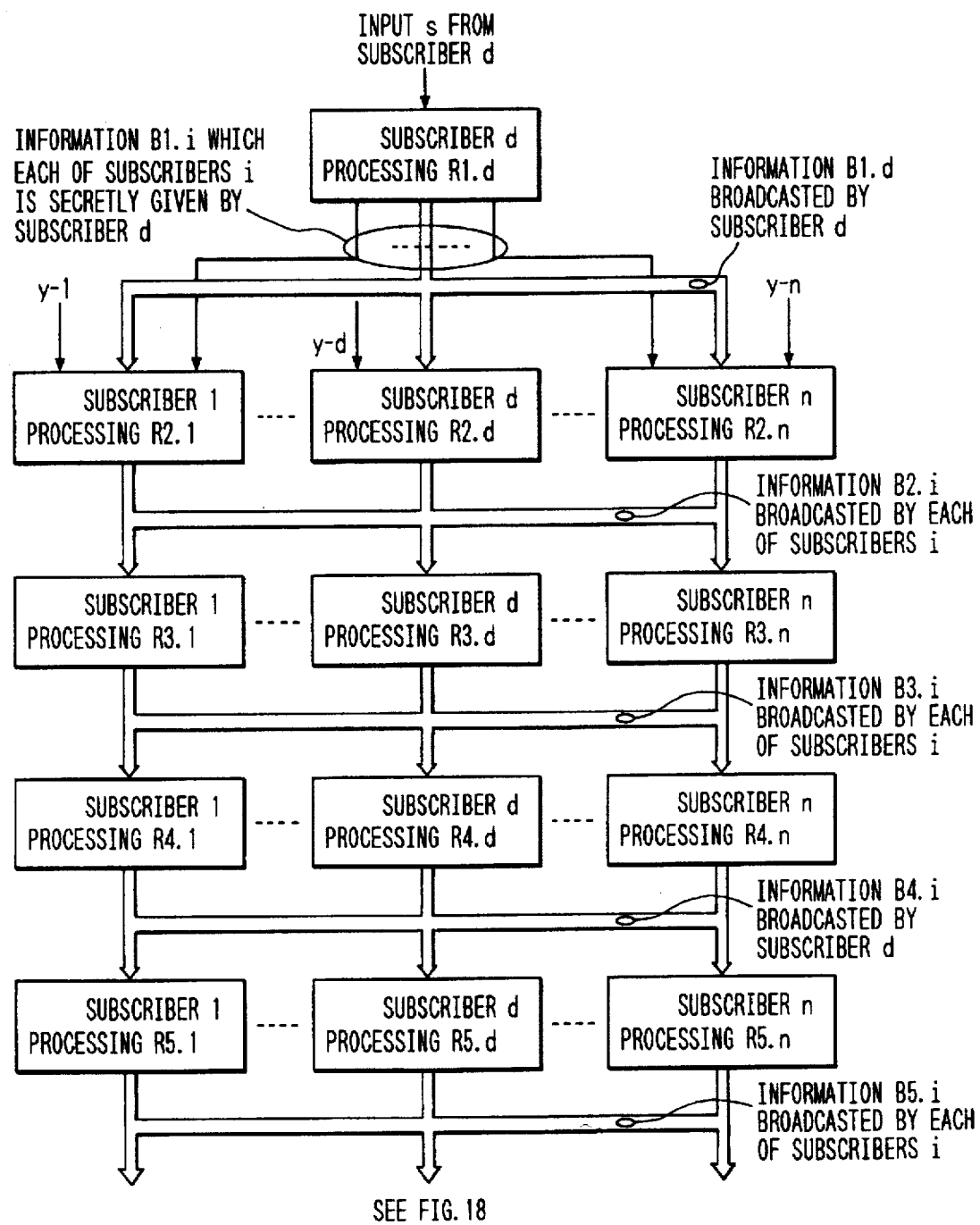
FIG. 17 is a diagram for explaining the procedures for verifiable secret shared multiplication processing.
Figure 18:
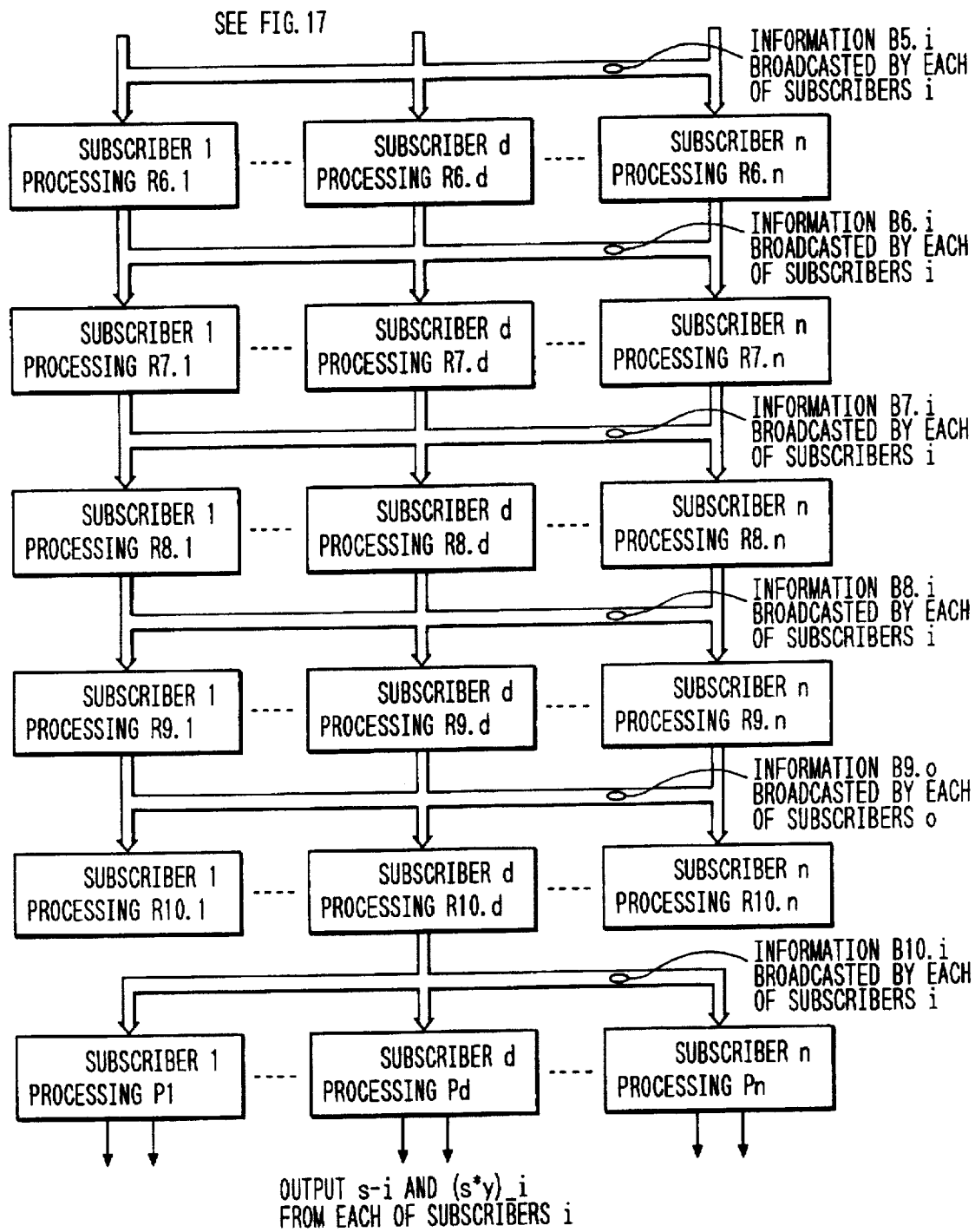
FIG. 18 is a diagram for explaining the procedures for verifiable secret shared multiplication processing.

Verifiable secret sharing and multiplication process (see FIGS. 17 and 18)

Hereafter, h denotes an efficient one-way hash function as in Embodiment 1. Safety parameter k satisfies k=nk' for a specific constant k'.

(Round 1) Subscriber d employs the random number generation unit 23 to generate secret element s and partial matrixes for secret elements l1, ..., lk that are randomly selected from {1, ..., p−1}. One-way hash function values s* for secret values s_r(1), ..., s_r(n), 11_r(1), ..., 11_r(n), ..., 1k r(1), ..., 1k_r(n) are calculated (see FIG. 4).

The subscriber d transmits the column vectors S_c(i), L1_c(i), ..., Lk_c(i) and secrets s_r(i), 11_r(i), ..., 1k_r(i) of each generated partial matrix across the secret communication channels to each subscriber i (i=1, ..., n, excluding himself). And the hash values s* (B1.d in FIG. 17) are broadcast across the broadcast communication channel to all the subscribers (represented as processing R1.d in FIG. 17).

(Round 2) Each subscriber i (i=1, ..., n) employs, as inputs, secrets s_r(i), 11_r(i), ..., 1k_r(i), which are received in Round 1, and x_r(i), which is previously shared for x, so that t_r(i)=s_r(i)*x_r(i), ml_r(i)=11_r(i)*x_r(i), ..., mk_r(i)*x_r(i) mod N is calculated. The random number 23 is employed to generate a partial matrix (which is called T(i), Ml(i), ..., Mk(i), while the partial matrix for the portion x_r(i) of the previously shared secret x is called X(i)) for the obtained result. Then, the hash function values s* for secret values t(i)_r(1), ..., t(i)_r(n), ml(i)_r(1), ..., ml(i)_r(n), ..., mk(i)_r(1), ..., mk(i)_r(n) are calculated (see FIG. 4). Each subscriber i transmits the column vectors T_c(j), M1_c(j), ..., Mk_c(j) and secrets t(i)_r(j), ml(i)_r(j), ..., mk(i)_r(j) of each generated partial matrix across the secret communication channels to each subscriber j (j=1, ..., n, excluding himself). And the hash values s* are broadcast across the broadcast communication channel to all the subscribers (represented as processing R2.i in FIG. 17). The information that the subscriber i has broadcasted is represented as Bs.i in FIG. 17.

(Round 3) Each subscriber i (i=1, ..., n) employs the random number generation means to broadcast bits that are randomly selected (processing R3.i in FIG. 17). The randomly selected k' bits are each called Bi_1, ..., Bi_k', and the bits to the total n subscribers are each called B1, ..., Bk. The information that the subscriber i has broadcasted is represented as B3.i in FIG. 17.

(Round 4) If each bit Bj (j=1, ..., k) that is broadcasted in Round 3 is 1, the subscriber d broadcasts the partial matrix Lj that is generated by the subscriber d in Round 1. If Bj is 0, the subscriber d broadcasts the result (written as S+Lj) that is obtained by adding each element of the generated partial matrixes S and Lj in the finite set (processing R4.d in FIG. 17). The information that is broadcast by the subscriber d is represented as B4.d in FIG. 17.

(Round 5) For each value j (j=1, ..., k) of information B1.i that has been secretly received in Round 1, each subscriber i (i=1, ..., n) verifies whether or not column vectors Lj_c(i) and lj_r(i) (when the bit Bj broadcast in Round 2 is 1) or Lj_c(i)+S_c(i) and lj_r(i)+s_r(i) (when Bj is 0) are equal to the column vector and the secret value of the partial matrix that are broadcast in Round 4. When they are not equal relative to a certain value j, a decision message is broadcast by the subscriber d (processing R5.i in FIG. 17). The information that is broadcast by the subscriber i is represented as B5.i in FIGS. 17 and 18.

(Round 6) If each bit Bj (j=1, ..., k) that is broadcast in Round 3 is 1, each subscriber i broadcasts the partial matrix Mj(i) that is generated by the subscriber i in Round 2. If B3 is 0, the subscriber d broadcasts the result (written as T(i)+Mj(i)), which is obtained by adding each element of the generated partial matrixes T(i) and Mj(i) in the finite set (mod p) (processing R6.i in FIG. 18). Further, the subscriber d broadcasts the column vectors from the subscriber i that are determined in Round 5. The information that is broadcast by the subscriber d is represented as B6.i in FIG. 18.

(Round 7) For each j (j=1, ..., k), the subscriber i verifies the information that is broadcast in Rounds 5 and 6. When the number of correct matrixes is greater than the threshold value t and bit Bj (j=1, ..., k) that is broadcast in Round 3 is 1, the following partial matrix is broadcast:

$$(lj\_r(i))^\wedge(-1) * Mj(i) - X(i).$$

When Bj is 0, a partial matrix below is broadcast:

$$(s\_r(i) + lj\_r(i))^\wedge(-1) * (T(i) + Mj(i)) - X(i)$$

(processing R7.i in FIG. 18). The linear combination of partial matrixes is performed as described previously (for each element). The information that the subscriber i has broadcasted is represented as B7.i in FIG. 18.

(Round 8) For each j,o (j,o=1, ..., k), each subscriber i (i=1, ..., n) employs the information that is broadcast in Round 4. When Bo is 1, lj_r(o) is decrypted, a column vector below is calculated, and it is verified that the result obtained by calculating the column vector is identical and corresponds to value 0:

$$(lj\_r(o))^\wedge(-1) * Mj(o)\_r(i) - X(o)\_r(i).$$

When Bo is 0, (s_r(o) +lj_r(o)) is decrypted and a column vector below is calculated to verify that the vector calculation result is the same and corresponds to value 0:

$$(s\_r(o) + lj\_r(o))^\wedge(-1) * (T(o)\_r(i) + Mj(o)\_r(i)) - X(o)\_r(i).$$

When the result can not be verified as corresponding to given value o, a decision message for the subscriber o is broadcast (processing R8.i in FIG. 18). The information that the subscriber i has broadcasted is represented as B8.i in FIG. 18.

(Round 9) When the decision message is broadcast to the subscriber o in Round 8, he broadcasts its column vector (processing R9.o in FIG. 18). The information that the subscriber i has broadcasted is represented as B9.i in FIG. 18.

(Round 10) Each subscriber i verifies all the broadcast information, and broadcasts a decision message for the subscriber o that has performed an unauthorized act (processing R10.i in FIG. 18). The information that the subscriber i has broadcasted is represented as B10.i in FIG. 18.

(Post processing) The shared linear combination of the correctly shared partial matrixes $S(i)*X(i)$ is performed by all the subscribers (the process of each subscriber i is represented as processing Pi in FIG. 18), and thus the correct partial matrix $S*X$ is shared and calculated. When that matrix can not be generated due to the unauthorized act, the offending subscriber is identified and the result is broadcast.

Figure 19:
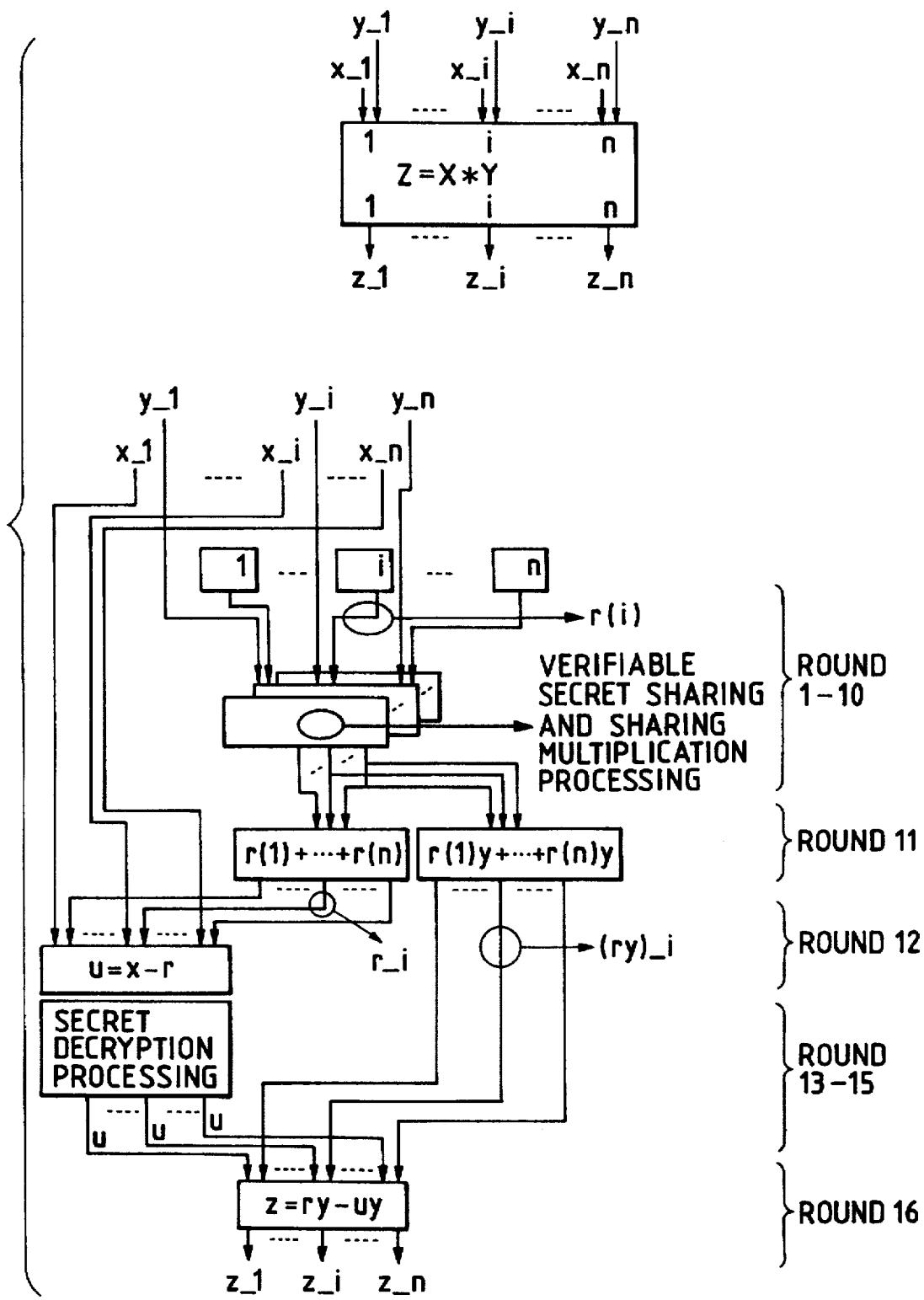
FIG. 19 is a diagram for explaining the procedures for secret sharing and multiplication processing.

Through the above processing, the secret element s that a specific subscriber i has selected at random from $\{1, \ldots, p-1\}$ is verifiably shared, and at the same time, product $s*x$ of the secret s and the previous, verifiably shared secret x is calculated. Next, the calculation process for obtaining a product of two shared secrets x and y by performing the above processing will be described. This process is shown in FIG. 19.

(Rounds 1 through 10) Each subscriber i randomly selects secret element $r(i)$ from $\{1, \ldots, p-1\}$, and performs the above verifiable sharing process on the selected element, while at the same time calculating $r(i)*y$.

(Round 11) The calculations of $r=r(j1)+r(j1)+\ldots+r(jm)$ and $r*y=r(j1)*y+r(j2)*y+\ldots+r(jm)*y$, of secrets for all the subscribers jl (l=1, ..., m), for which verifiable sharing is correctly performed, are performed by using the previous shared addition.

(Round 12) Shared addition is performed on secret addition $u=x-r$.

(Rounds 13 through 15) The secret u is decrypted by all the subscribers.

(Round 16) The shared calculation is performed on secret linear combination $z=r*y-u*y=x*y$.

Figure 20:
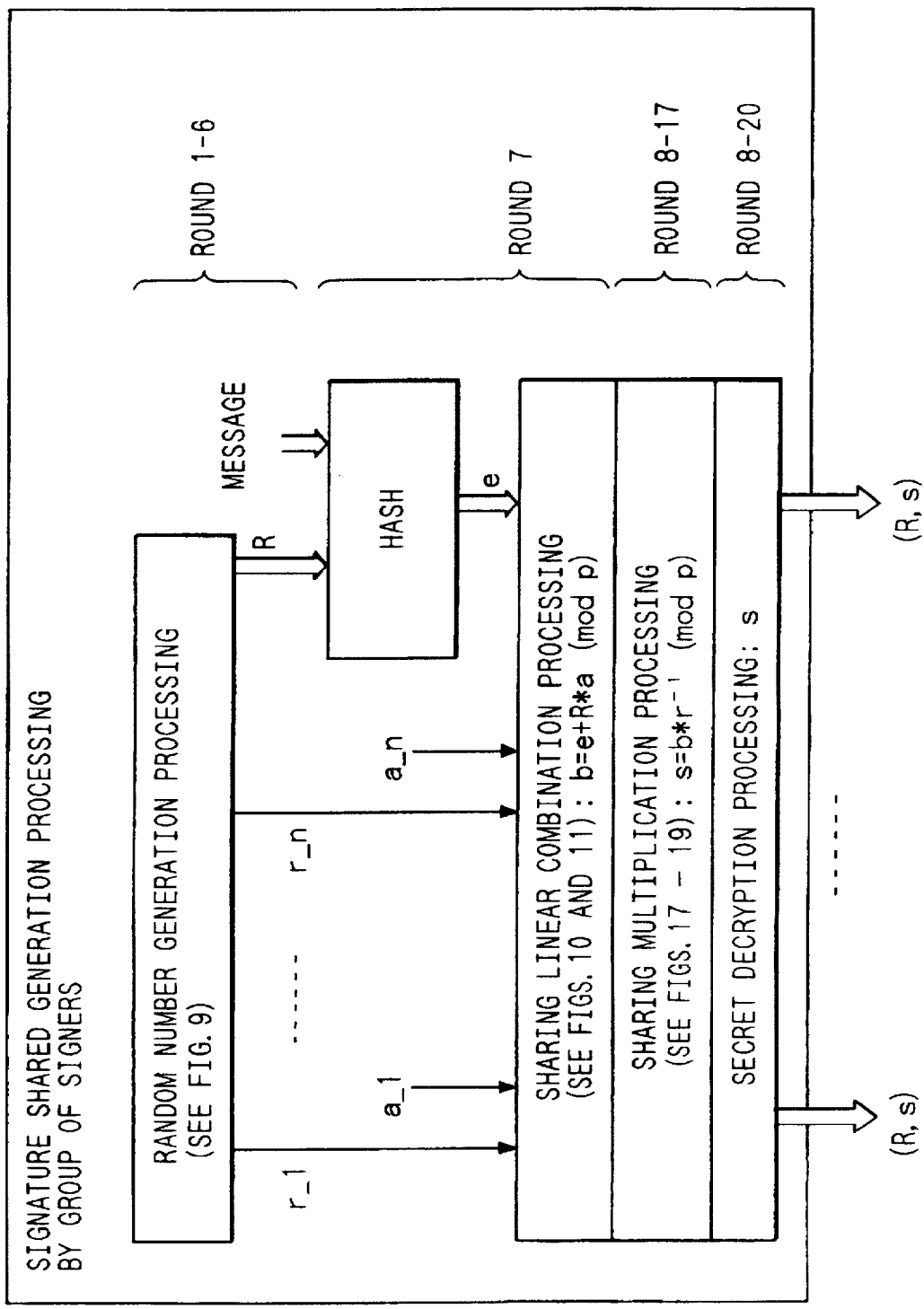
FIG. 20 is a diagram for explaining the procedures for shared signature generation processing.

Through the above process, product $x*y$ of the two shared secret elements x and y can be shared and calculated by the subscribers that join the group. By using a secret key that is obtained by the above process, a digital signature for a given message m is shared and generated by the group as follows. Signature generation processing (see FIG. 20)

(Rounds 1 through 5) Each subscriber i selects secret element $r(i)$ at random from $\{1, \ldots, p-1\}$, and this selection is shared with all the subscribers of the group of signers by performing the above described secret sharing process. Further, each subscriber i calculates $g^{\wedge}(r(i))$ mod q (wherein q is a prime number selected in the above described manner), and broadcasts it across the broadcast communication channel.

(Round 6) The post processing of the secret sharing process is performed. With the correctly shared secret element $r(i)$ (i=1, ..., n) as an input, sharing result r is acquired by performing the shared addition. Further, $R=g^{\wedge}r$ mod q, which is the multiplication of value $R(i)=g^{\wedge}(r(i))$ mod q that is broadcast in Rounds 1 through 5 relative to the correctly shared secret element $r(i)$, is calculated.

(Round 7) Each subscriber employs a given message m as an input to calculate output $e=h(m)$ of the predetermined function h described above. Then, $b=(e+R*a)$ is shared and calculated among all the subscribers of the group of signers by performing the shared linear combination processing.

(Rounds 8 through 17) Here, $s=b*r^{\wedge}(-1)$ is shared and calculated among all the subscribers of the group of signers using the above described shared multiplication. To avoid the shared inverse element processing for $r^{\wedge}(-1)$, $g^{\wedge}((r(i))^{\wedge}(-1))$ mod q is calculated, instead of $g^{\wedge}(r(i))$ mod q, in the random number generation processing (see Rounds 1 through 5).

(Rounds 18 through 20) The shared secret s is decrypted by the secret decryption processing of the secret sharing method. A signature for the given message is defined as (R, s). The generated signature is verified by using the public key a and by performing the signature verification processing for the digital signature method. When the signature is not correct, it is determined that there is a subscriber who has performed an unauthorized act. The secret decryption process of the secret sharing method is performed to identify such a subscriber.

The present invention is not limited to the number of dimensions for a partial matrix as is described in the above embodiments 3 to 5, and may be a multiple dimensional partial array. Further, a function employed may be a function, other than a one-way hash function, that ensures the acquisition of the one way characteristic. As for the Cut and Choose technique, it is not limited to the procedures specifically explained in Embodiment 1, but may be any method for verifying the propriety without leaking the secret.

As is explained above, according to the present invention, a shared digital signature method can be provided by which, when the number of correct signers of a group, which consists of a plurality of computers (signers) that are connected via a communication system, are greater than a threshold value t, a signature can be generated by the group, and when a signer performs an unauthorized act, such signer can be identified. Compared with a conventional shared digital signature method by which a correct signature is generated even if an unauthorized act occurs, the method in this embodiment needs only an efficient amount of communication and calculation.

Further, compared with the conventional shared digital signature method that can neither identify an offending subscriber nor generate a signature, the method of the present invention is safer because by this method an offending signer can be identified.

More specifically, since the processing that needs the largest amount of calculation is exponential multiplication, the amount of calculation that is required for each signer who joins a group of signers is assumed to be substantially the same as that required for the latter conventional digital signature method. The amount of communication required for each signer is $1*n^{\wedge}2*k$ order (wherein n denotes the number of subscribers, k denotes a safety parameter, and 1 denotes the length of an integer employed), and is more practical than that required for the former conventional digital signature method.

It is assumed that, in consonance with the number of sets that includes t+1 different column vectors of $m=n!/((t+1)!(n-t-1)!)$ in the secret decryption processing (see Round 3 of the secret sharing process in Embodiment 1), if n is not very small (n<20), the identification of an offending subscriber is practically difficult. Therefore, the secret sharing method according to this embodiment is effective when the number of subscribers is small. The conventional verifiable secret sharing method however requires unpractical amount of communication and calculation even when the number of subscribers is small.

As is described above, the required amount of communication and calculation can be reduced by employing a signature generation method of this embodiment. In addition, because of a small amount of communication, the traffic in a communication system and communication costs can be reduced, and because of a small amount of calculation, high speed processing can be performed.

[Embodiment 6]

An embodiment where shared authentication is performed by a plurality of apparatuses in a communication system will now be described.

Figure 21:
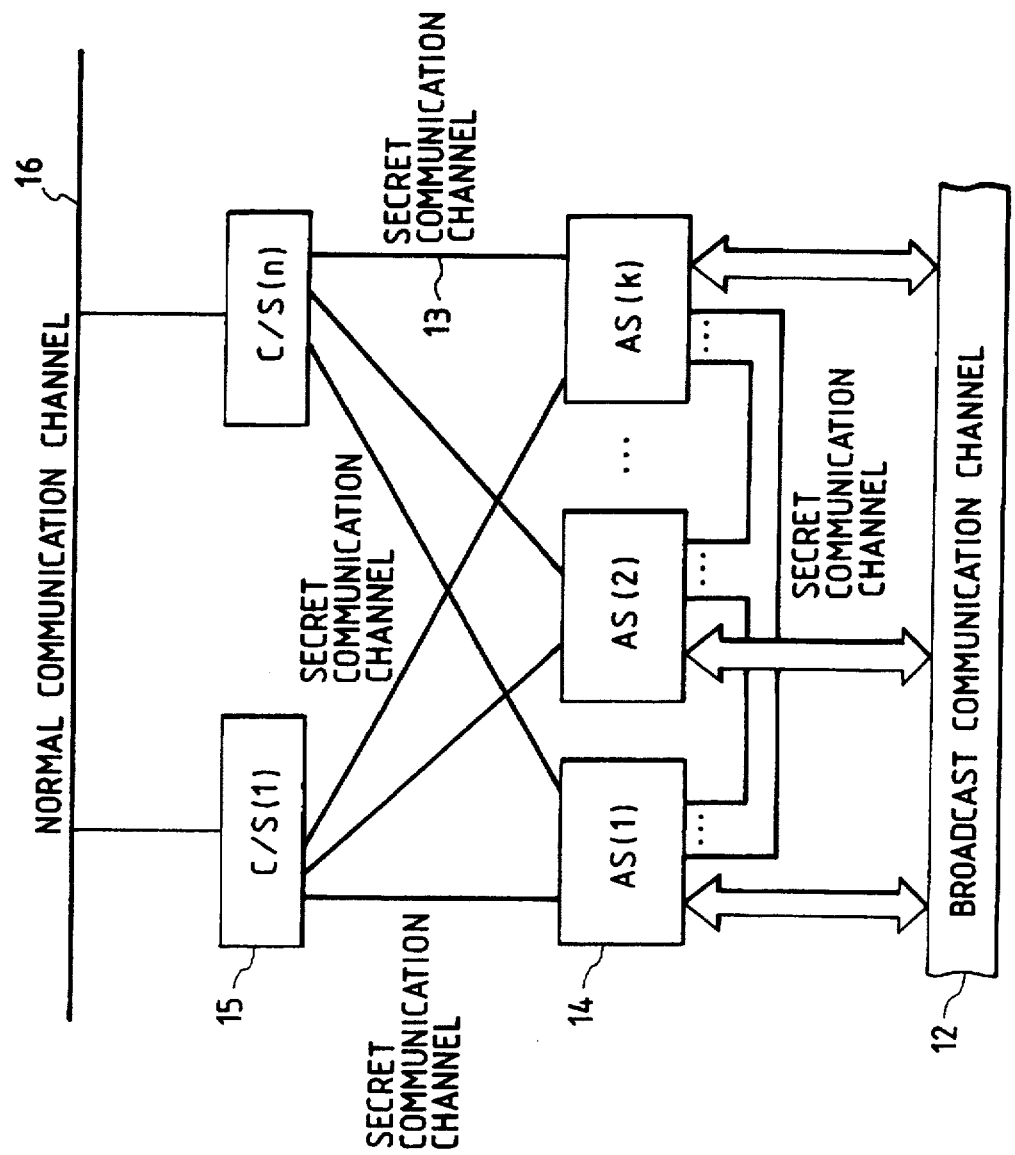
FIG. 21 is a block diagram showing the structure of a communication system in which sharing is performed for authentication.

FIG. 21 is a diagram illustrating a communication system, according to one embodiment of the present invention, that has information processing apparatuses that share and perform authentication.

In FIG. 21, the broadcast communication channel 12 and the secret communication channels 13 have the same functions as those in FIG. 1. Apparatuses 14 are apparatuses AS(1) . . . , AS (k) (hereafter called as "members") that are shared authentication servers. The number of the members in this case is defined as a comparatively small number, 20 or less, for efficiency.

The number of the total apparatuses that constitute the communication system may be considerably greater than the number of members, and are connected to the members across the secret communication channels 13. Communication between the apparatuses is performed across a normal (nonreliable) communication channel 16. Hereafter, when one apparatus transmits a request for service (e.g., a file transfer, a remote procedure call, etc.) that the other apparatus has, the apparatus that makes a request is called a "client", and the apparatus that receives the request and provides the service is called a "server". In FIG. 21, apparatuses 15 are apparatuses C/S(1), . . . , C/S(n) that serve as such a client and a server. It should be noted that a member can be a client or a server.

In this embodiment, the client and the server are employed for mutual authentication and the authentication of the communication contents. Further, the client and the server share a secret key for performing secret communication. In addition, since secret information is shared among the members to control and calculate the information, the authentication server in this embodiment is more reliable than a conventional authentication server. When a client asks authentication to identify himself in order to request a server for a service, a client who asks the authentication is called a "testifier," and a server who gives authentication is called an "authenticator". The individual apparatuses of the communication system with the members inclusive are arranged in the block structure shown in FIG. 2.

The fundamental part of shared authentication protocol is the above described VSS (Verifiable Secret Sharing) protocol.

[Shared secret linear combination processing]

When two secret elements x and y in a given finite set are shared by the above verifiable secret sharing processing (at this time, each subscriber i holds secret portions $x\_i$ and $y\_i$ that correspond to the secret elements x and y, respectively), communication is not performed, and secret portion $(x+y)\_i$ that corresponds to sum $x+y$ in the given finite set is calculated as follows.

First, the elements of the column vectors $X\_c(i)$ and $Y\_c(i)$ and the elements of secret values $x\_r(i)$ and $y\_r(i)$ of the partial matrix that each subscriber holds are added. It is apparent from the definition of a partial matrix (the elements of the rows and columns are values of a polynomial) that the addition results $X\_c(i)+Y\_c(i)$ and $x\_r(i)+y\_r(i)$ are a column vector and a secret value for a partial matrix relative to $x+y$.

The one-way hash function values $x^*$ and $y^*$, which are employed to verify an information segment in the secret decryption process, are stored. These values are used as needed when the decryption process is performed on the addition result $x+y$, and the thus partial matrix $X+Y$ that corresponds to the secret $x+y$ is verified.

further, in order to perform shared multiplication of one shared secret element x and public element a, the results acquired by multiplying a by each element of the partial matrix that the subscriber holds are elements of the partial matrix relative to $x*a$. Therefore, through the above process, shared calculation of linear combination $a*x+b*y$ of the two shared secret elements x and y and the public elements a and b can be performed without requiring a dialogue between the subscribers of the group.

In the above described manner, a secret can be shared among the members by using a verifiable method.

Next, the shared pseudo-random secret generation protocol for shared generation of pseudo random numbers among the members will be explained.

[Shared pseudo-random secret generation protocol]

The members AS(1), . . . AS(k) that serve as the shared authentication servers output the secret portions r(i) (i=1, . . . , k) of shared pseudo-random secret r to the member AS(i) to control r. The protocol is realized as is shown in FIGS. 23A and 23B.

Each member AS(i) generates pseudo-random secret ri that is represented as an element in a finite set (processing 81).

The AS(i) secretly shares the pseudo-random secret ri by performing the verifiable secret sharing process described above. Since each member performs this process, each member AS(j) (j=1, . . . , k) holds the secret portions rl(j), . . . , rm(j) of the individual members. It should be noted that m ($\leq$k) is the number of members that are approved that secret sharing has been correctly performed (processing 82).

Each member AS(j) adds the secret portion together, and generates r(j)=rl(j)+. . .+rm(j), which is the secret portion of the pseudo-random secret r relative to the AS(j) (processing 83).

The pseudo-random secret r is a number that anybody can not know unless the majority of the members plot together. The shared pseudo-random secret is generated in the above described manner, and the generated pseudo-random secret can be employed as a conversation key for a testifier and an authenticator.

A protocol for performing shared secret key encryption processing among the members will now be explained. The processing varies depending on a case where data for secret key encryption are shared secret data and where the data are public data.

[Shared secret key encryption/decryption for shared secret data]

FIG. 24A is a diagram for explaining this protocol. A message that is formed with N blocks, m1, . . . , mN, which has the length N, is defined as m. It should be noted that the VSS protocol is executed in finite set $GF(2^L)$. Secret portions m1(i), . . . , mN(i) are assumed to be secretly shared among the members AS(i). Further, secret key pk that has the same length as the message m is also divided into N blocks, pk1, . . . , pkN that each have the length L. These blocks are secretly shared among the above members, so that the members AS(i) have the individual secret portions pk(i), . . . , pkN(i).

To perform secret key encryption processing for the messape m by using the secret key pk, each member AS(i) performs addition for each block in a given finite set as follows:

$$c1(i)=m1(i)+pk1(i), \ldots, cN(i)=mN(i)+pkN(i).$$

Since the formation of the VSS protocol is semi-identical, c1(i), . . . cN(i) correspond to the secret portions of c1, . . . , cN that are obtained by dividing encrypted statement c into N blocks each length L. Therefore, the encrypted statement c is decrypted by performing the previously mentioned secret decryption process, and becomes public.

The apparatuses of the communication system that have secret keys pk can decrypt the original message m from the public encrypted statement c. It should be noted that the secret key pk is used only once and never used again.

[Shared secret key encryption/decryption for public data]

For public message m, when the above encryption protocol is employed, the secret key pk might be known to the third person by subtracting a message m from the encrypted statement c that has become public. Therefore, the protocol as is shown in FIG. 24B is employed for the public data.

As well as the previous case, the message m is formed of N blocks m1, ..., mN that each have length L. The contents of the message m are public data that are known to members. The secret key pk is twice as long as the message m, and is divided into 2N blocks $pk1\_1, pk1\_2, \ldots, pkN\_1, pkN\_2$ of the length L. The pk is secretly shared among the members, and the members AS(i) individually hold the secret portions $pk1\_1(i), pk1\_2(i), \ldots pkN\_1(i), pkN\_2(i)$.

To realize the secret key pk encryption processing for the message m by using the secret key pk, each member AS(i) performs the following arithmetic operation in a given finite set for each block. In the following expression, • denotes multiplication and + denotes addition:

$$cl(i)=ml \cdot pkl\_1(i)+pkl\_2(i), \ldots, cN(i)=mN \cdot pkN\_1(i)+pkN\_2 \ (i).$$

Since the formation of the VSS protocol is the semi-identical for linear combination, cl(i), ..., cN(i) corresponds to the secret portions cl, ..., cN, which are obtained by dividing the encrypted statement c into N blocks for each length L. Therefore, the encrypted statement c is decrypted by performing the previously described secret decryption processing, and becomes public.

As is described above, since the protocol employs two types of keys, $pkj\_1$ and $pkj\_2$ (j=1, ..., N), there is no chance to leak the secret key pk regardless of whether or not the message m is public data. Although the encryption is easier with short length L, the probability where an offending person alters the encrypted statement c to false encrypted statement c' to provide false message m' is $2^{-L}$, so that L can not be very small for the safety reason. Thus, appropriate L is about 32.

As for decryption, the apparatuses of the communication system that use the secret key in common disassemble the secret key pk and the encrypted statement c for each length L, and performs arithmetic operation of $pkj\_1, pkj\_2$ and $cj(cj-pkj\_2)/pkj\_1$ to obtain mj. Through this process, the original message m can be decrypted. The secret key pk is used only once and never used again also in this case.

[Authentication protocol]

The authentication with a common key is realized using the above protocols by a shared authentication server, instead of a conventional centralized authentication server, as follows.

The authentication protocol includes communication through which a testifier receives an authentication message from a shared authentication server and communication through which a testifier provides authentication data for an authenticator. This is called "on-line processing."

As the premise for the performance of the on-line process, a secret key sharing process between the shared authentication server and an apparatus that serves as a testifier or an authenticator and a conversation key generation process by the shared authentication server are necessary. This is called "off-line processing." The off-line processing may be performed each time a secret key or a conversation key is necessary during the on-line processing, but the time required for on-line processing and the communication period are extended.

When the off-line processing is performed in advance to the on-line processing, the on-line processing can be efficiently performed. "The off-line processing" and the "on-line processing" will now be described while referring to FIGS. 25A and 25B, respectively.

[Off-line processing]

Information that must be shared in advance among the members that are the shared authentication servers is information that is related to the secret key for all the apparatuses. As is explained in the shared secret key encryption/decryption protocol, however, the secret key that is employed between a testifier and the shared authentication server must be disposed after the encryption or decryption of the message is completed. Thus, many keys have to be generated. This process is performed by the following secret key delivery processing. The generation process of shared pseudo-random secret that is employed as a conversation key between a testifier and an authenticator is also performed during the off-line processing as follows.

[Secret key delivery processing]

Apparatus j of the communication system that requests authentication performs the secret sharing process in advance to share, among the members, sufficiently large number M of pseudo random secrets $pkj\_1, \ldots, pkj\_M$, which are arbitrarily selected. The members AS(i) thus receive the secret portions $pkj\_1(i), \ldots, pkj\_M(i)$ of the pseudo-random secret. If the apparatus j has not correctly shared the secret, merely the apparatus j does not receive authentication service using its own secret key pkj. Therefore, the post processing for verifying whether or not the shared information is correct is not necessarily performed in this case. Further, a broadcast communication channel across which all the members verify that j does not make a false statement is not necessarily provided between the apparatus j and the members (see FIG. 27).

During this process, j holds, as a list, sufficiently large secret key $pkj\_i$(i=1, ..., M), while each member h (h=1, ..., k) holds the secret portion $pk3\_i(h)$ (i=1, ..., M) as a list. Since the secret key is used only once as is described above, j and each member h hold respective indexes pkj and pkj(h) that indicate the position on the list of a key that is used next. The apparatus j generates a new secret key when it can afford to it, shares the secret of the key when the communication system is unused, and continues updating.

[Pseudo-random secret generation processing]

As is shown in FIG. 26, as in the secret key delivery processing, shared pseudo-random secrets r1, ..., rQ that are conversation keys employed between testifiers and authenticators are generated during the off-line processing and held in a list. For the generation of the shared pseudo-random secret, as is described in the shared pseudo-random secret generation protocol, all the members must perform the sharing processing for pseudo-random secret. However, since all the members do not have to perform that processing at the same time, they may perform the processing when no processing is performed and the communication system is not unused, and share the generated pseudo-random secret to the other members. Then, each member holds, as a list, the shared pseudo-random secret r1(j), ..., rQ(j) together with the index that indicates its position for use.

[On-line processing]

The on-line authentication protocol for acquiring, from a shared authentication server, an authentication element that client P (testifier) of the communication system transmits to server V (authenticator) will be performed by the following steps S1 thorough S4.

(Step 1) The client P transmits, across a normal communication channel to a member that is the shared authentication server, a request message 101 (see FIG. 28A) that includes information {id_P, id_V, s}, which is indicated as AUTH_REQUEST. It should be noted that id_P denotes the client P, id_V denotes data that specifies server V, and s denotes a random number that is arbitrarily selected.

(Step 2) A member that has received AUTH_REQUEST performs the procedures at the following steps S21 through S26 (see FIG. 28B).

(Step 21) A time stamp that indicates the current time is broadcast and the common time is confirmed.

(Step 22) While the shared secret key encryption protocol for the shared secret data is employed, pseudo-random secrets rz, . . . , rz+a−1 that are used as conversation keys ck1, . . . , cka between a testifier and an authenticator are encrypted by defining pkV_x, . . . , pkV_x+a−1 as secret encryption keys. It should be noted that a denotes the number of pseudo-random secrets, and z and x denote indexes that represent the beginnings of a pseudo-random list and a secret key pk list. At this time, z and x are updated to z=z+a and x=x+a, respectively. The results obtained by encryption are CT_1, . . . , CT a.

(Step 23) The shared secret key encryption protocol for public data are employed, and the public time stamp and id_P, which is the identifier of a testifier, are encrypted by 2b secret keys, pkV_x, . . . , pkV_x+2b from the secret key pk list, which is used at step S22. Then, the index x is updated to x=x+2b+1. The results obtained by encryption are CT−a+1, . . . , CT_a+b. This result and the result at step S22 are added together to provide CT_1, . . . , CT_a+b, which are then added to the index x that is before updating is performed at step S22. The obtained result is defined as an authentication element.

(Step S24) The shared secret key encryption protocol for the shared secret data is employed, and the encrypted statements CT_1, . . . , CT_a+b, for an authenticator, that is obtained at step S23 and the common keys ck1, . . . , cka, which are employed at step S22, are encrypted by employing 2a+b secret keys pkP_y, . . . , pkP_y+2a+b as encryption keys. It should be noted that y denotes an index that indicates the beginning of a secret key list for a testifier, and is updated y=y+2a+b+1. The thus encrypted results are CCT_1, . . . , CCT_2a+b.

(Step S25) The shared secret key encryption protocol for public data is employed, and pseudo-random secret s, which has become public at step S1, and id_V, which is the identifier of an authenticator, are encrypted by 2c secret keys pkP_y, . . . , pkP_y+2c from the secret key list that is employed at step S24. The index y is updated to y=y+2c+1. The thus encrypted results are CCT_2a+b+1, . . . , CCT_2a+b+c. These results are added to the result at step S24 and the final results are CCT_1, . . . , CCT 2a+b+c.

(Step S26) The secret decryption processing is performed to decrypt the secretly shared CCT_i, . . ., CCT_2a+b+c. The result obtained by decryption is transmitted as an authentication message 102, together with the index y before it is updated at step S24, across the normal communication channel to the client P who is a testifier.

(Step 3) The testifier P refers to received index Y and secret keys pkP_y, . . . , pkP_y+2a;b;2c, which are included in his secret key list, and employs the shared secret key decryption protocol for public data to decrypt pseudo-random secret ck from the received data CCT_1, . . ., CCT_2a+b+c. Then, the testifier P verifies that the decrypted s and id_V are correct. When they are verified, the decrypted pseudo-random secret ck is stored as a common key with the authenticator, and transmits a decrypted authentication element 103 to the authenticator V (see FIG. 29A).

(Step 4) By referring to index x, which is included in the authentication element, and secret keys pkV_y, . . . , pkV_y+a;2b, which are included in his secret key list, the authenticator V employs the shared secret key decryption protocol for public data to decrypt the time stamp and the identirier id_P of the testifier from the received authentication element, and employs the shared secret key decryption protocol for shared secret data to decrypt pseudo-random secret ck. The authenticator then verifies that the decrypted time stamp and the decrypted identifier id_P are correct. When they are verified, the authentication is given to the testifier P, and the decrypted pseudo-random secret ck is stored as a common key with the authenticator (see FIG. 29B).

[Embodiment 7]

In Embodiment 6, when an offending person performs wiretapping on an authentication element that a testifier transmits to an authenticator and stores the authentication element, the offending person submits the authentication element to the authenticator and can request the authenticator for a service that the testifier does not intend to. Therefore, the testifier becomes confused. This act is called a replay attack.

In this embodiment, therefore, to prevent the replay attack, time information that is exchanged is additionally provided to an authentication element that the testifier transmits to the authenticator at step S3 of the on-line processing in Embodiment 6. These procedures are shown in FIGS. 30A and 30B. The processing in this embodiment is the same as that in Embodiment 6, except that the procedures at steps S3' and S4' are performed in addition to the procedures at steps S3 and S4 of the on-line processing. Only the procedures at steps S3' and S4' will be explained.

(Step S3') After the procedure at step S3 in Embodiment 6 is performed, the testifier employs the obtained conversation key ck and encrypts new time stamp T2 and identifier id_P of the testifier to obtain {T2, id_P}^ck. The testifier transmits to the authenticator {T2, id_P}^ck with the authentication element.

(Step S4') The authenticator performs the procedures at step S4 in Embodiment 6 to decrypt the authentication element, and employs the obtained conversation key ck to decrypt accessory message {T2, id_P}^ck. The authenticator then verifies the time stamp T2 and the identifier id_P of the testifier, and when T2 is the old one, he does not accept the request for a service.

As is described above, according to this embodiment, it is possible to provide an authentication server that has higher reliability and safety than those of a conventional centralized management authentication server.

When the majority of apparatuses that are shared authentication servers are reliable, the following can be provided.

By the shared authentication protocol, the same authentication function as that of the authentication protocol that is provided by a conventional centralized management is provided for a testifier and an authenticator, and high fault tolerance is realized.

Since the on-line processing of the shared authentication protocol ensures, for testifiers and authenticators, the same interface (data format) as that of a conventional authentication protocol, a conventional authentication server can be easily replaced by the authentication.server in this embodiment.

For testifiers and authenticators, the on-line processing of the shared authentication protocol can be provided with the same amount of calculation as required for a conventional authentication protocol.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A secret information processing method for a communication system, wherein a plurality of information processing apparatuses are connected by secret communication channels, across which each of said apparatuses exchanges information with other of said apparatuses while keeping said information secret from any remaining apparatuses, and by broadcast communication channels, across which said apparatuses commonly exchange information with all other included apparatuses, said secret information processing method comprising the steps of:

generating from secret information, by employing for such generation a first apparatus that is a member of said plurality of apparatuses and that possesses said secret information, a secret array for a number of second apparatuses;

extracting first information segments from said secret array for said second apparatuses by employing said first apparatus, and transmitting said first information segments across said secret communication channels to said second apparatuses;

performing a predetermined function on a part of said secret array by employing said first apparatus, and broadcasting an obtained output value across said broadcast communication channels;

generating random numbers by employing said second apparatuses, and broadcasting said random numbers across said broadcast communication channels;

generating, from said secret array and in consonance with said random numbers that are broadcast, second information segments for said second apparatuses by employing said first apparatus, and broadcasting said second information segments across said broadcast communication channels;

generating, by employing said second apparatuses, third information segments, which are generated as said second information segments for said second apparatuses by employing said first apparatus, that are in consonance with said first information segments that are received and said random numbers that are generated by said second apparatuses; and comparing, by employing said second apparatuses, said third information segments with said second information segments for said second apparatuses that are broadcast, and verifying that said secret information is shared by said first apparatus.

2. A secret information processing method according to claim 1, wherein, at said step for verification, when said results of comparison do not match, said second apparatuses broadcast a message across said broadcast communication channels, and performs verification based on the sum of said message that is broadcast.

3. A secret information processing method according to claim 1, further comprising the step of decrypting said secret information by all of said second apparatuses based on said first information segment that is transmitted to said second apparatuses.

4. A secret information processing method according to claim 3, wherein at said step for decryption, said second apparatuses individually perform computation based on said received first information segment and perform decryption based on the computation result.

5. A secret information processing method according to claim 1, wherein said secret array is a matrix that is determined for said secret information and randomly selected secret elements, and a row vector and a column vector of said matrix are defined as said first information segment.

6. A secret information processing method according to claim 1, wherein said predetermined function is a one-way function.

7. A secret information processing method according to claim 1, wherein said secret information is an element in a finite set, and at said step for generation, computation of said element in said finite set is performed.

8. A signature generation method for a communication system, wherein a plurality of apparatuses are connected by secret communication channels across which said apparatuses exchange information with other apparatuses while keeping said information secret from any remaining apparatuses, and by broadcast communication channels, across which each of said apparatuses commonly exchanges information with all other apparatuses, said signature generation method comprising the steps of:

randomly selecting first secret information by employing each of said apparatuses that belongs to a group of signers, and secretly sharing said first secret information with said apparatuses in said group;

performing a predetermined first function on said first secret information byemploying said apparatuses, and broadcasting obtained output values to all of said apparatuses in said group;

sharing said first secret information from each of said apparatuses among said apparatuses in said group, and adding said first secret information;

sharing said output values among said apparatuses in said group for multiplication, and performing a predetermined second function on a result that is obtained by multiplication and a message;

sharing second secret information among said apparatuses in said group and computing said second secret information by employing a result that is obtained by performing said second function, a result that is obtained by sharing and addition, and an element that becomes public; and decrypting, through a cooperative effort involving all said apparatuses in said group, said second secret information that is shared, and outputting said decrypted second secret information as a signature together with said result that is obtained by sharing and multiplication.

9. A signature generation method according to claim 8, wherein at said step for computation, linear combination processing for said second secret information is performed.

10. A signature generation method according to claim 8, wherein at said step for computation, combination processing by using a product that includes exponential multiplication of said second secret information is performed.

11. A signature generation method according to claim 8, wherein at said step for computation, linear combination processing and multiplication of said second secret information is performed.

12. A signature generation method according to claim 8, wherein said second function is a one-way function.

13. A signature generation method according to claim 8, wherein said first secret information is an element in a finite set and addition in said finite set is performed at said step for addition.

14. A signature generation method according to claim 8, wherein said step of sharing said first secret information includes the steps of:
- generating from said first secret information, by employing for such generation a first apparatus that belongs to said group of signers and that possesses said first secret information, a secret array for a number of second apparatuses;
- extracting first information segments from said secret array for said second apparatuses by employing said first apparatus, and transmitting said first information segments across said secret communication channels to said second apparatuses;
- performing a predetermined function on a part of said secret array by employing said first apparatus, and broadcasting an obtained output value across said broadcast communication channels;
- generating random numbers by employing said second apparatuses, and broadcasting said random numbers across said broadcast communication channels;
- generating, from said secret array and in consonance with said random numbers that are broadcast, second information segments for said second apparatuses by employing said first apparatus, and broadcasting said second information segments across said broadcast communication channels;
- generating, by employing said second apparatuses, third information segments, which are generated as said second information segments for said second apparatuses by employing said first apparatus, that are in consonance with said first information segments that are received and said random numbers that are generated by said second apparatuses; and
- comparing, by employing said second apparatuses, said third information segments with said second information segments for said second apparatuses that are broadcast, and verifying that said secret information is shared by said first apparatus.

15. An authentication method for a communication system, wherein a plurality of apparatuses are connected and wherein apparatuses among those that belong to a specific group commonly provide authentication, said authentication method comprising the steps of:
- transmitting an authentication request message, which includes identifiers for a testifier and for an authenticator, from an apparatus of said testifier, who transmits a request for authentication from an apparatus of said authenticator, to each of said apparatuses of said specific group;
- generating an authentication element, which is encrypted with a secret key that is related to said authenticator, that is based on said authentication request message by employing a cooperative effort involving all of said apparatuses that belong to said specific group, and generating an authentication message by encrypting said authentication element with a secret key that is related to said testifier;
- transmitting said authentication message from each of said apparatuses of said specific group to said apparatus of said testifier;
- decrypting said authentication message at said apparatus of said testifier upon receipt of said authentication message, and transmitting said decrypted authentication element to said apparatus of said authenticator; and
- decrypting said authentication element at said apparatus of said authenticator and transmitting authentication to said testifier.

16. An authentication method according to claim 15, further comprising the step of cooperatively transmitting, from said apparatuses in said specific group to said apparatuses of said testifier and of said authenticator, a common key that is employed for encrypted communication between both of said apparatuses.

17. An authentication method according to claim 15, wherein at said step of transmitting said authentication message, a common key that is employed for encrypted communication between said apparatuses of said testifier and of said authenticator and that is included in said authentication message is transmitted to said apparatus of said testifier.

18. An authentication method according to claim 15, wherein at said step of transmitting said authentication element, a common key that is employed for encrypted communication between said apparatuses of said testifier and of said authenticator and that is included in said authentication message is transmitted to said apparatus of said authenticator.

19. An authentication method according to claim 15, further comprising the step of employing verifiable secret sharing processing, and cooperatively generating, as shared pseudo-random secret, by said apparatuses of said specific group, a common key that is employed for encrypted communication between said apparatuses of said testifier and of said authenticator.

20. An authentication method according to claim 15, wherein at said step for generation, encryption by a secret key is performed by dividing data to be encrypted into a plurality of blocks and by adding different secret keys to said blocks in a predetermined finite set.

21. An authentication method according to claim 15, wherein at said step for generation, encryption by a secret key is performed by dividing data to be encrypted into a plurality of blocks, by multiplying different secret keys by said blocks in a predetermined finite set, and by further adding different secret key to the results of multiplication.

22. An authentication method according to claim 15, further comprising the step of performing secret sharing processing to share and distribute a secret key that is related to each apparatus of a communication system to said apparatuses of said specific group.

23. An authentication method according to claim 15, wherein at said step of generation, said authentication element is encrypted with a time stamp by using a common key that is for said apparatuses of said testifier and of said authenticator, and the result is transmitted, and wherein at said step for authentication, said apparatus of said authenticator decrypts information that is received from said apparatus of said testifier by using said common key, and verifies said time stamp.

24. A communication system that has a plurality of information processing apparatuses, secret communication channels, across which each of said apparatuses can exchange information secretly with the other apparatus while keeping said information secret from any remaining apparatuses, and broadcast communication channels, across which each of said apparatuses commonly transmits information to all other apparatuses, with a first information processing apparatus of said plurality of information processing apparatuses comprising:

first generation means, for generating a predetermined partial array from secret information, extraction means, for extracting, from said partial arrangement, first information segments for any remaining information processing apparatuses, and for transmitting said first information segments to said remaining information processing apparatuses, function processing means, for performing a predetermined function on said first information segments and broadcasting output values so obtained across said broadcast communication channels to said remaining information processing apparatuses, and second generation means, for generating a second information segment, which is in consonance with random numbers that are broadcast by said remaining information processing apparatuses, and for broadcasting said second information segment across said broadcasting communication channels; and with each of said remaining information processing apparatuses comprising:

random number generation means, for generating a random number and for broadcasting said random number across said broadcast communication channels, third generation means, for generating, in consonance with said first information segment and said random number, a third information segment that is to be generated as said second information segment by said first information processing apparatus, and verification means, for comparing said third information segment with said second information segment that is broadcast and for verifying the sharing of a secret that is performed by said first information processing apparatus.

25. A communication system according to claim 24, wherein said information processing apparatuses include message broadcasting means for broadcasting a message across said broadcast communication channels when said result of comparison does not match, and wherein said verification means performs verification based on the total of said message that is broadcast.

26. A communication system according to claim 24, wherein said information processing apparatuses have decryption means for decrypting said secret information by using all of said information processing apparatuses based on said first information segment that is transmitted.

27. A communication system according to claim wherein said information processing apparatuses have computation means for performing computation based on said first information segment that is transmitted, and wherein said decryption means decrypts said secret information based on the result of said computation.

28. A communication system acCording to claim 24, wherein said partial array is a partial matrix that is determined for said secret information and randomly selected secret elements, and a row vector and a column vector of said partial matrix are secret portions for corresponding secrets, and elements of said row vector and said column vector are secret portions of said row and column vectors.

29. A communication system according to claim 24, wherein said predetermined function is a one-way function.

30. A communication system according to claim wherein said secret information is an element in a finite set, and wherein said generation means performs computation in said finite set.

31. A communication system that has a plurality of information processing apparatuses, secret communication channels, across which each of said apparatuses can exchange information secretly with other apparatuses while keeping said information secret from any remaining apparatuses, and broadcast communication channels, across which each of said apparatuses commonly transmits information to all the other apparatuses, with each of said apparatuses, among said plurality of apparatuses, that belongs to a group of signers comprising:

sharing means, for selecting first secret information at random and for secretly sharing said first secret information among said apparatuses of said group;

broadcast means, for performing a predetermined first function on said first secret information and for broadcasting an obtained value to all remaining apparatuses of said group;

addition means, for sharing said first secret information held by each of said apparatus among said apparatuses of said group and for adding said first secret information;

processing means, for sharing said output value held by each of said apparatuses among said apparatuses of said group and multiplying said output value, and for performing a predetermined second function on a result, which is obtained by multiplication, and a message;

computation means, for employing said multiplication result, a result that is obtained by sharing and addition, and an element that is made public to share second information among said apparatuses of said group and to compute said second information; and decryption means, for decrypting said second secret information by a joint effort of all of said apparatuses of said group among which said second secret information is shared, and for outputting decrypted second secret information as a signature together with said result obtained by sharing and multiplication.

* * * * *

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.

It is certified that error appears in the above-identified patent and that said Letters Patent is hereby corrected as shown below:

On the title page, col. 1, item [30]

Insert: --[30] Foreign Application Priority Data
July 29, 1994   Japan   6-178483
Jan. 23, 1995   Japan   7-8184
Jan. 23, 1995   Japan   7-8185--.

Col. 1, item [56]

Other Publications
In ""Completeness...etc."", "M.Ben-OR" should read --M.Ben-Or--.
In ""One Way...etc."", "Has" should read --Hash--.
In ""The MD4...etc."", "In" should read --in--.
In ""Threshold..etc."", "cryptosystems" should read --Cryptosystems--.
In ""A Public...etc."", "On" should read --on--.
In ""Secure Communication"", "using" should read --Using--.

COLUMN 1

Line 11, "which." should read --which--.
Line 28, "a" should be deleted.
Line 30, "improve" should read --improves--.
Line 36, "addition,A. Shamir" should read --addition, A. Shamir--.
Line 41, "communications" should read --Communications--.
Line 52, "it" should read --it is--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LÓPEZ ET AL.

It is certified that error appears in the above-identified patent and that said Letters Patent is hereby corrected as shown below:

COLUMN 2

```
Line 10, "commu-" should read --Commu---.
Line 15, "above described" should read
   --above-described--.
Line 20, "above described" should read
   --above-described--.
Line 25, "above described" should read
   --above-described--.
Line 28, "can not" should read --cannot--.
Line 34, "above described" should read
   --above-described--.
Line 39, "occurs any" should read --incurs an--.
```

COLUMN 4

```
Line 1,  "packets." should read --packet.--
Line 33, "well known" should read --is a well known--.
Line 34, "is a" should be deleted.
```

COLUMN 5

```
Line 8,  "In" should read --in--.
Line 9,  "In" should read --in--.
Line 15, "{11," should read --{1,--.
Line 28, "among." should read --among--.
Line 43, "And" should read --and--.
Line 44, "A" should read --a-- and "On" should
   read --on--.
```

UNITED STATES PATENT AND TRADEMARK OFFICE
CERTIFICATE OF CORRECTION

PATENT NO. : 5,708,714

DATED : January 13, 1998

INVENTOR(S) : JOSÉ MANUEL CERECEDO LóPEZ ET AL.

It is certified that error appears in the above-identified patent and that said Letters Patent is hereby corrected as shown below:

COLUMN 6

Line 11, "above described" should read --above-described--.
Line 23, "Crypro '89," should read --Crypto '89,--.
Line 24, "Of" should read --of-- and "And" should read --and--.
Line 25, "In" should read --in--.
Line 29, "above described" should read --above-described--.
Line 39, "can not" should read --cannot--.
Line 43, "is" (second occurrence) should read --has--.
Line 44, "can not" should read --cannot--.
Line 59, "can not" should read --cannot--.

COLUMN 7

Line 10, "communications" should read --communication--.
Line 26, "G. Spafford/Edited And" should read --G. Spafford/edited and--.
Line 27, "Translated By" should read --translated by--.
Line 33, "In" should read --in--.
Line 34, "Of" should read --of--.
Line 51, "B7" should read --B,--.

COLUMN 8

Line 22, "can not" should read --cannot--.
Line 51, "above described" should read --above-described--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.   Page 4 of 10

It is certified that error appears in the above-identified patent and that said Letters Patent is hereby corrected as shown below:

COLUMN 9

Line 4, "above described" should read
--above-described--.

COLUMN 11

Line 67, "mationby" should read --mation by--.

COLUMN 14

Line 15, "And" should read --and--.
Line 16, "Crypro '89," should read --Crypto '89,--
and "In" should read --in--.

COLUMN 15

Line 4, "above described" should read
--above-described--.
Line 7, "In" (both occurrences) should read --in--
and "Crypro '90," should read --Crypto '90,--.
Line 8, "Nist" should read --NIST,--.
Line 9, "For" should read --for--.
Line 48, "can not" should read --cannot--.
Line 49, "can not" should read --cannot--.

COLUMN 16

Line 62, "Cryptologicai" should read --Cryptological--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.

It is certified that error appears in the above-identified patent and that said Letters Patent is hereby corrected as shown below:

COLUMN 17

Line 2, "And" should read --and-- and "With" should read --with--.

COLUMN 18

Line 11, "column.vector" should read --column vector--.

COLUMN 19

Line 6, "And" should read --and-- and "A" should read --a--.
    Line 7, "Of" should read --of--.
    Line 45, "above described" should read --above-described--.

COLUMN 20

Line 9, "above described" should read --above-described--.
    Line 35, "above" should read --above--.
    Line 39, "above described" should read --above-described--.
    Line 58, "above described" should read --above-described--.
    Line 59, "$G^{\wedge}(r(i))$" should read --$g^{\wedge}(r(i))$--.
    Line 60, "above described" should read --above-described--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.   Page 6 of 10

It is certified that error appears in the above-identified patent and that said Letters Patent is hereby corrected as shown below:

COLUMN 20, (CONTINUED)

Line 67, "A(i)=G^(a(i))" should read
--A(i)=g^(a(i))--.

COLUMN 21

Line 10, "elemehts" should read --elements--.
Line 24, "signa. ture" should read --signature--.
Line 30, "above described" should read
--above-described--.
Line 32, "above described" should read
--above-described--.

COLUMN 22

Line 57, "s r(i)^(n!))." should read
--s_r(i)^(n!)).--.
Line 60, "s=(s^(n!*n!))^u*(s^11)^v mod N." should read
--s=(s^(n!*n!))^u*(s^1)^u mod N.--

COLUMN 23

Line 16, "above described" should read
--above-described--.
Line 18, "above described" should read
--above-described--.
Line 33, "by,the" should read --by the--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.   Page 7 of 10

It is certified that error appears in the above-identified patent and that said Letters Patent is hereby corrected as shown below:

COLUMN 24

```
Line 1, "above described" should read
   --above-described--.
Line 3, "above described" should read
   --above-described--.
Line 10, R(i)=r(i)^1 mod n" should read
   --R(i)=r(i)^1 mod N--.
Line 51, "above described" should read
   --above-described--.
Line 53, "above described" should read
   --above-described--.
```

COLUMN 26

```
Line 18, "B3" should read --Bj--.
Line 55, "can not" should read --cannot--.
Line 57, "Fi_G. 18)." should read --Fig. 18).--.
```

COLUMN 27

```
Line 42, "above described" should read
   --above-described--.
Line 44, "above described" should read
   --above-described--.
Line 60, "above described" should read
   --above-described--.
```

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.

It is certified that error appears in the above-identified patent and that said Letters Patent is hereby corrected as shown below:

COLUMN 29

Line 41, "above described" should read
      --above-described--.
    Line 65, "further, should read --Further,--.

COLUMN 30

Line 7, ""above described" should read
      --above-described--.
    Line 32, "can" should read --can---.
    Line 34, "above" should read --above---.
    Line 57, "messape" should read --message--.

COLUMN 31

Line 24, "and+denotes" should read
      --and + denotes--.
    Line 40, "can" should read --can---.

COLUMN 32

Line 45, "to it," should read --to,--.

COLUMN 33

Line 57, "CCT_i," should read --CCT_1,--.

UNITED STATES PATENT AND TRADEMARK OFFICE
CERTIFICATE OF CORRECTION

PATENT NO. : 5,708,714

DATED : January 13, 1998

INVENTOR(S) : JOSÉ MANUEL CERECEDO LóPEZ ET AL.    Page 9 of 10

It is certified that error appears in the above-identified patent and that said Letters Patent is hereby corrected as shown below:

COLUMN 34

Line 66, "authentication.server" should read
       --authentication server--.

COLUMN 36

Line 33, "byemploying" should read --by employing--.

COLUMN 38

Line 30, "cormnon" should read --common--.
    Line 47, "of.a" should read --of a--.

COLUMN 39

Line 2, "information, extraction means," should
      read --information, ¶ extraction means,--.
    Line 12, "and second" should read
      --and ¶ second--.
    Line 45, "claim" should read --claim 24,--.
    Line 52, "acCording" should read --according--.

UNITED STATES PATENT AND TRADEMARK OFFICE
CERTIFICATE OF CORRECTION

PATENT NO. : 5,708,714
DATED : January 13, 1998
INVENTOR(S) : JOSÉ MANUEL CERECEDO LóPEZ ET AL.

It is certified that error appears in the above-identified patent and that said Letters Patent is hereby corrected as shown below:

COLUMN 40

```
Line 8, "claim" should read --claim 24,--.
Line 21, "that.be" should read --that be--.
```

Signed and Sealed this

Fifteenth Day of September, 1998

Attest:

BRUCE LEHMAN

Attesting Officer

Commissioner of Patents and Trademarks